US011161062B2

(12) United States Patent
Johnson et al.

(10) Patent No.: US 11,161,062 B2
(45) Date of Patent: Nov. 2, 2021

(54) FILTER SYSTEMS AND RELATED METHODS

(71) Applicants: Valdean Allen Johnson, West Jordan, UT (US); Celia Roberts Johnson, Eagle Mountain, UT (US)

(72) Inventors: Valdean Allen Johnson, West Jordan, UT (US); Celia Roberts Johnson, Eagle Mountain, UT (US)

(73) Assignee: WellspringPure, LLC, Eagle Mountain, UT (US)

( * ) Notice: Subject to any disclaimer, the term of this patent is extended or adjusted under 35 U.S.C. 154(b) by 48 days.

(21) Appl. No.: 16/817,603

(22) Filed: Mar. 12, 2020

(65) Prior Publication Data

US 2020/0215463 A1 Jul. 9, 2020

Related U.S. Application Data

(63) Continuation-in-part of application No. 15/942,081, filed on Mar. 30, 2018, now Pat. No. 10,905,976.

(60) Provisional application No. 62/480,776, filed on Apr. 3, 2017, provisional application No. 62/540,062, filed on Aug. 2, 2017.

(51) Int. Cl.
*B01D 24/00* (2006.01)
*B01D 27/08* (2006.01)
*B01D 27/14* (2006.01)

(52) U.S. Cl.
CPC ............ *B01D 23/26* (2013.01); *B01D 27/08* (2013.01); *B01D 27/148* (2013.01); *B01D 2201/64* (2013.01); *B01D 2259/804* (2013.01)

(58) Field of Classification Search
None
See application file for complete search history.

(56) References Cited

U.S. PATENT DOCUMENTS

| | | | |
|---|---|---|---|
| 537,489 | A | 4/1859 | Sherwood |
| 195,423 | A | 9/1877 | Vent |
| 224,680 | A | 2/1880 | Green |

(Continued)

OTHER PUBLICATIONS

Berkey Filters, published online at least as early as Mar. 1, 2017 at 911water.com.

(Continued)

*Primary Examiner* — Robert J Popovics
(74) *Attorney, Agent, or Firm* — Law Office of Paul B. Johnson; Paul B. Johnson

(57) ABSTRACT

Filter systems disclosed herein collapse for storage purposes and include mechanisms to continuously fill an upper chamber, allowing it to be smaller and to include more filters. A UVC light in a lower chamber sanitizes water entering therein. Water entering the lower chamber may pass through a quartz tube near the UVC light for sufficient exposure. The UVC light may be cycled between shorter periods of higher intensity and longer periods of lower intensity. A low power source such as a small solar array and/or battery may power the UVC light. A proximity switch may control the UVC light by providing power to the light only when the upper chamber is engaged with the lower chamber which may protect the user from exposure to the UVC light. Sealing mechanisms between the upper and lower chambers, as well as tote mechanisms and an alternative bucket filter system are disclosed.

15 Claims, 44 Drawing Sheets

(56) References Cited

U.S. PATENT DOCUMENTS 316,885 A 4/1885 Dumont
498,967 A 6/1893 Benham
541,970 A 7/1895 Harder
582,403 A 5/1897 Stifel
582,440 A 5/1897 Stifel
590,020 A 9/1897 Myers
611,691 A 10/1898 Langdon et al.
620,621 A 3/1899 Veazie
636,447 A 11/1899 Paddock
648,904 A 5/1900 Hart
673,722 A 5/1901 Moulton
826,654 A 7/1906 Firth
889,988 A 6/1908 Thompson
967,905 A 8/1910 Hagg
1,009,437 A 11/1911 Patnaude
1,052,440 A 2/1913 Hagg
1,084,030 A 1/1914 Ramsey
1,157,776 A 10/1915 Hagg
1,157,927 A 10/1915 Davis
1,284,233 A 11/1918 Caen, Sr.
1,378,274 A 5/1921 Probst
1,432,522 A 10/1922 Barnes
1,433,357 A 10/1922 Ellis
1,521,100 A 12/1924 House
1,547,855 A 7/1925 Burson
1,556,913 A * 10/1925 Capra .................... C02F 1/003 210/282
1,579,158 A 3/1926 Smilie
1,621,684 A 3/1927 Rabjohn et al.
1,628,510 A 5/1927 Ferry
1,629,269 A 5/1927 Hagg
1,645,712 A 10/1927 Meyers
1,674,203 A 6/1928 Holz et al.
1,696,487 A 12/1928 Jervis
1,723,564 A 8/1929 Lewis
1,728,646 A 9/1929 Washburne
1,752,060 A 3/1930 Burright et al.
1,918,446 A 7/1933 Barnes
2,239,612 A 4/1941 Lawlor
2,335,458 A 11/1943 Senyal
2,533,930 A 12/1950 Harr
2,604,991 A 7/1952 Rogers
2,716,490 A * 8/1955 Barstow ............ B01D 24/4631 210/277
2,801,764 A * 8/1957 Russell .................. F16J 13/065 220/320
3,334,044 A 8/1967 Satterlee
3,339,743 A 9/1967 Bealle
3,392,837 A 7/1968 Sanzenbacher
3,430,769 A 3/1969 Sanzenbacher
3,817,564 A * 6/1974 Baldwin ................ F16L 33/04 292/256.67
3,907,349 A * 9/1975 Kane ..................... B65D 45/32 292/256.67
3,931,015 A * 1/1976 Jenkins ................. B01D 29/27 210/232
4,173,364 A * 11/1979 Hein ...................... B01D 61/08 292/256.67
4,231,872 A * 11/1980 Keil ........................ B01J 47/04 210/93
4,749,484 A 6/1988 Greenhut
4,800,018 A 1/1989 Moser
4,818,398 A * 4/1989 Lott ....................... B01D 29/23 210/238
4,946,600 A 8/1990 Shin
4,948,504 A * 8/1990 Kierdorf ................ B01D 29/27 210/238
4,966,697 A * 10/1990 Rosaen .................. B01D 29/27 210/232
4,978,449 A 12/1990 Devine et al.
5,032,261 A 7/1991 Pyper
5,069,782 A * 12/1991 Moyher, Jr. ........... C02F 1/325 210/192
5,110,482 A 5/1992 Shin
5,128,036 A 7/1992 Svensson
5,167,814 A * 12/1992 Pulek ..................... B01D 29/96 210/232
5,173,192 A 12/1992 Shalev
5,186,828 A * 2/1993 Mankin .................. B01D 29/27 210/232
5,193,864 A * 3/1993 Coleman ................... F16B 2/08 292/256.67
5,209,845 A * 5/1993 Sims ...................... B01D 35/30 210/232
5,223,132 A 6/1993 Yoon
5,264,129 A 11/1993 Simpson et al.
D343,673 S * 1/1994 Bannigan ..................... D23/209
5,290,442 A 3/1994 Clack
5,322,625 A 6/1994 Rise
5,383,601 A 1/1995 Astle
5,454,944 A 10/1995 Clack
5,560,393 A 10/1996 Clack
5,562,824 A 10/1996 Magnusson
5,616,243 A 4/1997 Levy
5,693,109 A * 12/1997 Coulonvaux ........ B01D 46/008 55/498
5,900,212 A * 5/1999 Maiden ................... C02F 1/325 422/24
5,928,506 A 7/1999 Bae
5,993,672 A 11/1999 Manz
6,013,180 A 1/2000 Wang
6,110,424 A * 8/2000 Maiden ................... C02F 1/325 210/748.11
6,116,429 A * 9/2000 Kirsgalvis ............. B01D 29/27 210/356
6,123,858 A 9/2000 Manz
6,129,841 A 10/2000 Dann
6,136,192 A * 10/2000 Booth .................... B01D 29/23 210/450
6,139,726 A 10/2000 Greene
6,193,894 B1 * 2/2001 Hollander ................. A61L 2/10 210/748.11
6,224,751 B1 * 5/2001 Hofmann ................ C02F 1/003 210/85
6,248,244 B1 6/2001 Dann
6,402,949 B1 * 6/2002 Banks ..................... C02F 1/002 210/257.1
6,419,821 B1 7/2002 Gadgil et al.
6,516,562 B2 2/2003 Astle
6,521,124 B2 * 2/2003 Northcut .............. B01D 29/114 210/232
6,524,477 B1 2/2003 Hughes
6,579,495 B1 * 6/2003 Maiden ................... C02F 1/325 210/748.11
6,602,410 B1 8/2003 Tanner et al.
6,602,425 B2 8/2003 Gadgil et al.
6,648,174 B2 11/2003 Greene
6,702,295 B1 * 3/2004 Kapcoe ................ F16J 15/3228 277/551
6,716,343 B2 4/2004 Kool et al.
6,736,298 B2 5/2004 Busick et al.
6,764,594 B2 7/2004 Lee
6,949,188 B2 * 9/2005 Geyer .................... B01D 29/23 210/232
6,953,523 B2 * 10/2005 Vandenbelt ............ C02F 1/003 210/85
6,966,980 B2 11/2005 Blackburn
7,002,140 B2 * 2/2006 Elsegood .................. A61L 2/10 210/748.1
7,002,161 B2 2/2006 Greene
7,014,759 B2 3/2006 Radford
7,018,528 B2 3/2006 Lee
7,081,225 B1 * 7/2006 Hollander ................. A61L 2/10 210/748.11
7,138,054 B2 * 11/2006 Harms ................... B01D 29/21 210/232
7,175,760 B2 2/2007 Cary et al.
7,232,517 B1 * 6/2007 Shepherd ................ C02F 1/003 210/94
7,306,723 B2 12/2007 Radford
7,438,799 B2 10/2008 Vandenbelt et al.

(56) References Cited

U.S. PATENT DOCUMENTS

| | | | | |
|---|---|---|---|---|
| 7,641,790 | B2 * | 1/2010 | Maiden | A45F 3/20 210/91 |
| 7,874,325 | B2 | 1/2011 | Tyler et al. | |
| 7,906,019 | B2 * | 3/2011 | Elliott | A01N 59/16 210/205 |
| 8,043,502 | B2 | 10/2011 | Nauta | |
| 8,128,820 | B2 | 3/2012 | Wu | |
| 8,177,966 | B2 | 5/2012 | Wu | |
| 8,192,621 | B2 * | 6/2012 | Ferraresi | B01D 35/16 210/232 |
| 8,216,465 | B2 | 7/2012 | Nauta | |
| 8,226,831 | B2 * | 7/2012 | Maiden | C02F 1/003 210/739 |
| 8,313,644 | B2 | 11/2012 | Harris et al. | |
| 8,480,139 | B2 * | 7/2013 | Starr | B65D 45/345 292/256 |
| 9,193,605 | B2 | 11/2015 | Minton-Edison et al. | |
| 9,194,493 | B2 * | 11/2015 | Richiuso | F17C 1/08 |
| 9,199,859 | B2 | 12/2015 | Spittle et al. | |
| 9,352,252 | B2 | 5/2016 | Vestergaard Frandsen et al. | |
| 9,352,979 | B2 | 5/2016 | Kuennen et al. | |
| 9,517,948 | B1 * | 12/2016 | Garrett | C02F 1/002 |
| 9,914,076 | B2 * | 3/2018 | Koreis | B01D 35/30 |
| 9,975,068 | B1 | 5/2018 | Maresh | |
| 10,082,164 | B2 * | 9/2018 | Richiuso | F16B 2/18 |
| 10,336,639 | B2 | 7/2019 | Kuennen et al. | |
| 10,563,682 | B2 * | 2/2020 | Richiuso | F16B 2/18 |
| 10,589,199 | B2 | 3/2020 | See | |
| 10,589,200 | B1 | 3/2020 | Maresh | |
| 10,647,592 | B2 | 5/2020 | Geelhood et al. | |
| 10,905,976 | B2 * | 2/2021 | Johnson | B01D 21/307 |
| 10,995,781 | B2 * | 5/2021 | Richiuso | F16J 13/065 |
| 2003/0196944 | A1 * | 10/2003 | Tanner | C02F 1/003 210/201 |
| 2004/0007515 | A1 * | 1/2004 | Geyer | B01D 29/902 210/232 |
| 2006/0144781 | A1 | 7/2006 | Carlson et al. | |
| 2006/0151393 | A1 * | 7/2006 | Badger | B01D 61/04 210/652 |
| 2006/0231476 | A1 * | 10/2006 | Vandenbelt | C02F 1/003 210/266 |
| 2007/0209984 | A1 * | 9/2007 | Lev | C02F 1/325 210/143 |
| 2007/0241049 | A1 * | 10/2007 | Tytar | B01D 36/04 210/455 |
| 2008/0217252 | A1 * | 9/2008 | Elliott | A01N 59/16 210/661 |
| 2008/0314808 | A1 * | 12/2008 | Vandenbelt | C02F 1/003 210/85 |
| 2011/0303589 | A1 | 12/2011 | Kuennen et al. | |
| 2012/0187034 | A1 * | 7/2012 | Shaw | B01D 29/05 210/201 |
| 2012/0187052 | A1 * | 7/2012 | Elliott | A01N 59/16 210/764 |
| 2012/0267314 | A1 | 10/2012 | Minton-Edison et al. | |
| 2014/0144829 | A1 | 5/2014 | Takeda et al. | |
| 2014/0216993 | A1 | 8/2014 | Pradeep et al. | |
| 2014/0342041 | A1 | 11/2014 | Mullins | |
| 2016/0114271 | A1 | 4/2016 | Michaud | |
| 2016/0236958 | A1 | 8/2016 | Kuennen et al. | |
| 2018/0154290 | A1 | 6/2018 | See | |
| 2018/0280838 | A1 | 10/2018 | Johnson et al. | |
| 2020/0071189 | A1 | 3/2020 | Geelhood et al. | |
| 2020/0215463 | A1 | 7/2020 | Johnson et al. | |

OTHER PUBLICATIONS

UV Water Purification Systems disclosed and described online at freshwatersystems.com, published online at least as early as Jul. 2, 2019, retrieved from https://web.archive.org/web/20190702052536/https://www.freshwatersystems.com/collections/uv-water-purification on Mar. 12, 2020.

* cited by examiner

FILTER SYSTEMS AND RELATED METHODS

CROSS REFERENCE TO RELATED APPLICATIONS

This document is a continuation-in-part application of U.S. Nonprovisional patent application Ser. No. 15/942,081, entitled "Filter Systems and Related Methods," naming as first inventor Valdean Allen Johnson, which was filed on Mar. 30, 2018 (hereinafter the '081 application), which '081 application in turn claims the benefit of the filing date of U.S. Provisional Patent Application No. 62/480,776, entitled "Method of providing continual access and flow of water to, through and from a water filter system," naming as first inventor Valdean Allen Johnson, which was filed on Apr. 3, 2017, and which '081 application also claims the benefit of the filing date of U.S. Provisional Patent Application No. 62/540,062, entitled "Method of creating a protection against overflow of a water filter system," naming as first inventor Valdean Allen Johnson, which was filed on Aug. 2, 2017, the disclosures of each of which are hereby incorporated entirely herein by reference.

BACKGROUND

1. Technical Field

Aspects of this document relate generally to filters for liquids.

2. Background Art

We live in a world that is filled with many smaller forms of life: protozoa, fungus, bacteria and viruses to name just a few. Many of these lower life forms create little threat to human life. Some, however, can make human and other higher life forms quite sick and even pose a threat to life when ingested. Various methods of chemical eradication such as adding chlorine to water have been used quite effectively to eliminate these pathogens from drinking water, however chemical solutions such as chlorine, which do kill the pathogens, also pose their own health risk to human life.

Water filters exist that will screen out most of these pathogens, but they are not 100% effective in keeping all of them out, particularly over time, as the filters lose their effectiveness. Traditional gravity water filters are often used at home, and also for emergency situations where access to culinary or pressure water lines are not available, for example during a natural disaster such as a hurricane, during or after an earthquake, or when the water lines become contaminated. They do filter out most of the bacteria and protozoa life forms in the water, and are also very effective at filtering out other toxins such as lead, arsenic, pesticides and other chemical compounds that have a negative effect on human life. But they are not perfect at removing all of the pathogens in the water, particularly the smallest ones such as viruses. Filter companies admit to their vulnerability when they advise not to use their filters without boiling the water during a boil alert (an event where the government advises the people that the drinking water has been contaminated with pathogens and could cause illness or death by drinking public water without first boiling it to kill the germs in the water). Purified water, even after it has been filtered, will grow bacteria unless there is some preventative agent to keep it from doing so.

Short-wavelength ultraviolet light, hereinafter referred to as UVC, has been used for a number of years to sanitize water. It is disruptive to DNA in living organisms. In some cases does not necessarily kill the pathogen, but affects its DNA, making it incapable of reproducing, thus causing an end of the germ at the end of its life cycle. This technique is potentially both beneficial and detrimental, because while exposing pathogens to UVC light may damage the DNA of the pathogen, rendering it incapable of reproducing, it can also be injurious to the skin cells and eyes of humans and larger animals when they are exposed to it.

Recently, LED light technology has been developed, and is now in use, that emits the specific range of frequencies of UVC light to prevent pathogens from growing. The LEDs are effective, but as noted before, can also be harmful to humans. The traditional UVC lights were mercury based, which required a great deal of energy and posed a health risk from mercury exposure if the light bulb broke or leaked mercury into the water. Another application of the use of ultraviolet lights to sanitize water is now available in the form of hand held devices that can be immersed in a glass or small container of water. However, these devices also expose the user to the ultraviolet light emitted from the wand, and are very limited in the amount of water they can purify at one time, such as water in a cup or glass.

For home or business water sanitation in a pressurized water line, the UVC light is often placed in an "in line" configuration, inside of a long, narrow cylinder through which the water passes, exposing it to the light, before flowing through into another tube or pipe. This is a very effective form of water sanitation, and is commonly used in connection with reverse osmosis filters.

SUMMARY

Unlike any of the conventional gravity flow water filters, the following invention uniquely provides a gravity flow water filter to fit compactly on the counter and slid back out of the way under the upper cabinets like most countertop appliances and still allow a water chamber to be filled while sitting on the counter surface. This may be done due to the unique connection to an external water source described in the '081 and related applications disclosed above. In implementations the continual filling of the upper and lower chambers reduces the need to access the chambers for manual filling and permits a much smaller ratio in the size of the two chambers. In other words, in implementations the continual filling may allow the upper chamber to have a smaller size than the lower chamber. This may allow the filter to fit into constricted spaces, for example on a kitchen counter directly under an upper cabinet situated above the counter. The filter in this patent is more efficient and thus reduces the manual attention and wait time than other gravity filters by virtue of the sealed and vented lower chamber. Because the upper chamber is continually filling it also can filter more water using the same or less upper chamber space compared with other gravity filters.

The system is designed with a UVC (ultraviolet) light to be used inside of a gravity water filter purified chamber for the purpose of sanitizing the water by eliminating any pathogens in the water that may have gotten past the filter. Filtered water may be clean to start with but without the presence of chlorine which is now filtered out, the dark moist chamber becomes a breeding ground for bacteria, viruses or other pathogens that may have found their way in. Placement of the light inside the lower chamber continually purges the purified water preventing pathogens from living in the purified water while at the same time shielding the user from UVC light exposure and thus eliminating the need for the user to periodically open and cleanse the lower chamber.

UVC LED lights which are fairly new in the world of water sanitation require a small amount of power to perform their function. A method of providing alternating hi/low light emission cycles may be used in which the UVC light is cycled through a longer period of lower emission from the LED light, followed by a shorter period of increased UVC light emission. This pattern could further help to economize on the power consumption requirements of the incoming power and increase the life span of the light source. The alternating shorter periods of higher wattage emission would serve to purge any pathogens that have either self-repaired or found other ways into the tank of filtered water. The light source could be constantly providing UVC light to the water by the water being introduced into the system via a quartz tube that could be coiled near the light, to maximize the exposure time of the incoming water to the UVC light, and minimize the distance of the light source to the incoming water. This economization would allow a low power source such as a small solar power source or a battery to power the device during periods of emergency when outside power may not be available.

The user could be protected from exposure to the light by using a proximity switch which activates the light when the upper chamber is in place and deactivates the light whenever the user removes the upper chamber to access the inside of the lower chamber. A method of sealing the lower chamber is also described, along with various embodiments of the invention such as a tote system and an alternate bucket filtration system is described herein. This invention may stand alone but may also include any details disclosed in USPTO application No. 62/480,776, or the other above-referenced patent applications, for controlling the inflow of water into the lower chamber of the filter or for other mechanisms/purposes.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements.

DESCRIPTION

Implementations/embodiments disclosed herein (including those not expressly discussed in detail) are not limited to the particular components or procedures described herein. Additional or alternative components, assembly procedures, and/or methods of use consistent with the intended filter systems and related methods may be utilized in any implementation. This may include any materials, components, sub-components, methods, sub-methods, steps, and so forth.

Figure 2B:
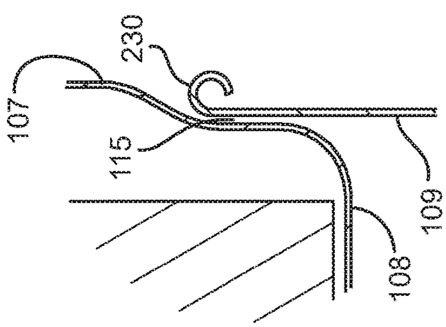
FIG. 2B is a detail of FIG. 2A showing an interface between an upper and lower chamber of the system of FIG. 1.
Figure 2A:
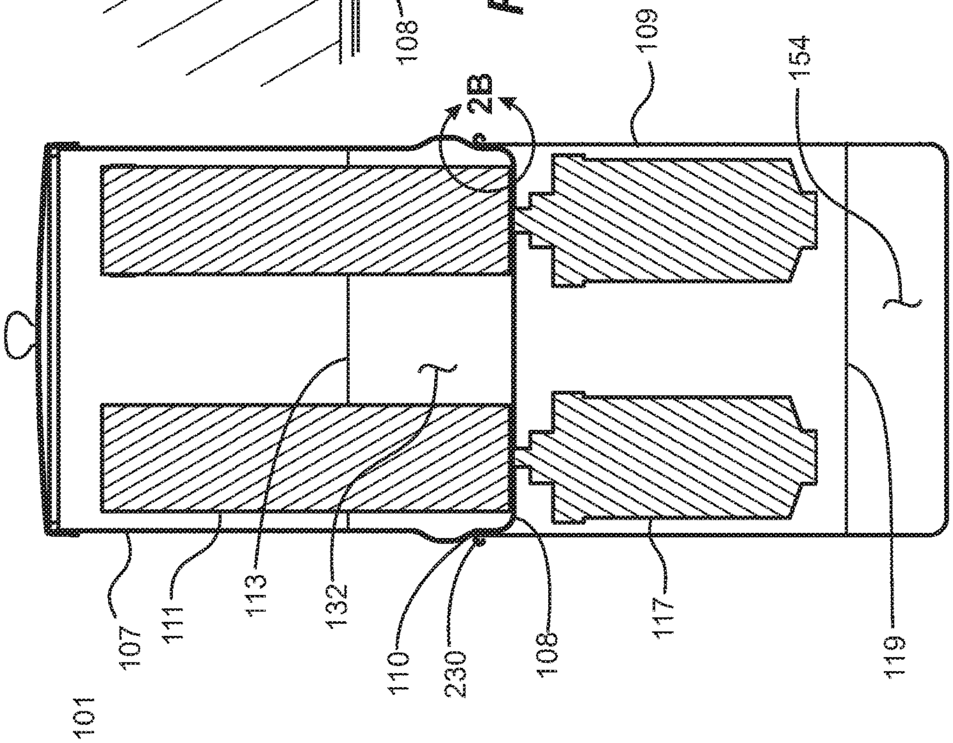
FIG. 2A is a cross-section view of the system of FIG. 1.
Figure 1:
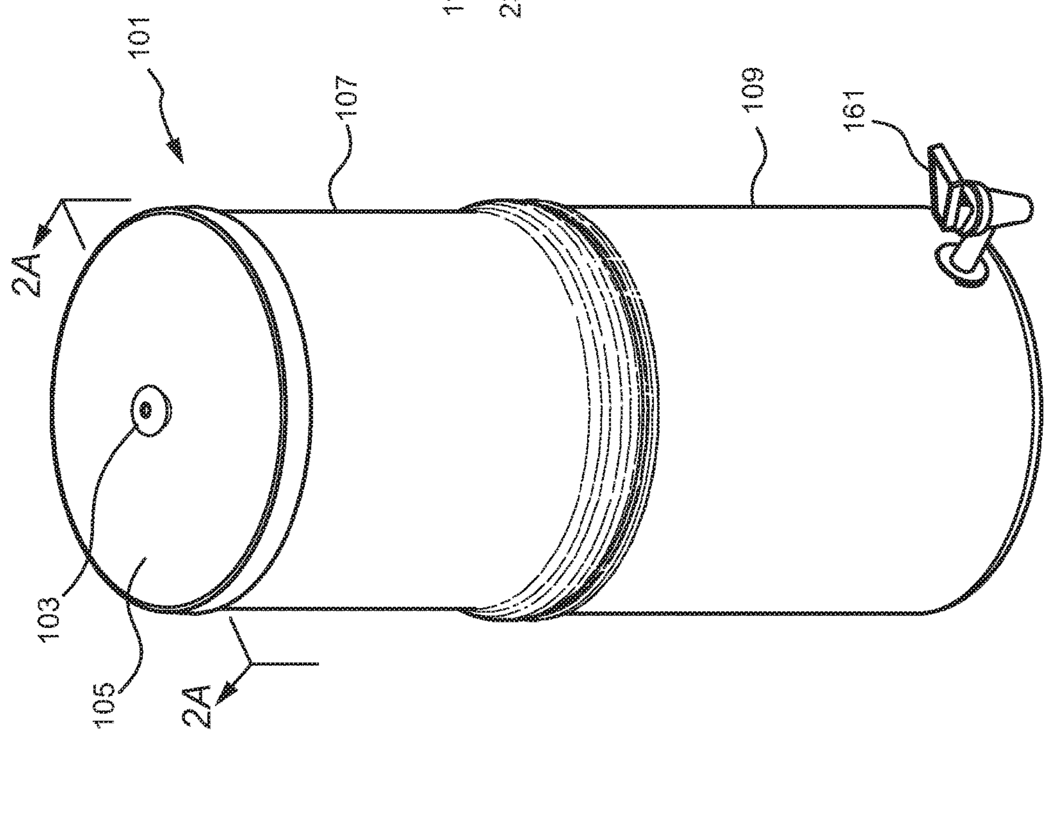
FIG. 1 is a perspective view of a traditional gravity fed water filter system.

A traditional gravity fed water filter (filter) 101 as shown in FIGS. 1 and 2 includes a lid 105 and knob 103 covering an upper water chamber 107 designed to hold unpurified water 132 separated from a lower chamber 109 which is intended to contain purified water 154. Filters 111 and 117 process the unpurified water 132 and collect it as purified water 154 in chamber 109. The upper chamber 107 fits into an opening 110 in the top of the lower chamber 109, the bottom 108 of the upper chamber 107 forming the interface 115 with the upper lip 230 of the lower chamber 109.

Figure 3:
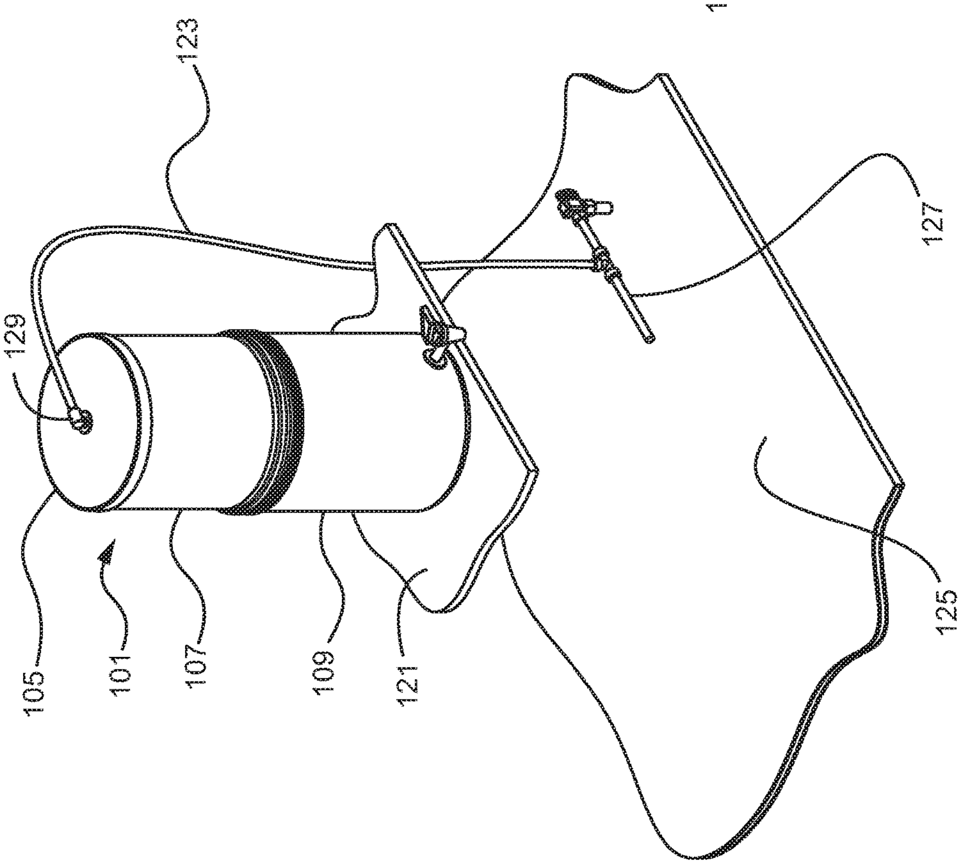
FIG. 3 is a perspective view of an implementation of a gravity filter system connected to a culinary water line.

As shown in FIG. 3, in implementations of the invention disclosed herein the traditional filter may be coupled with an external water line 123 which may connect the filter 101 to a number of water sources. The water feed line 123 may be connected from the input port 129 of the water filter upper chamber 107 to a culinary water pressure line 127.

Figure 4:
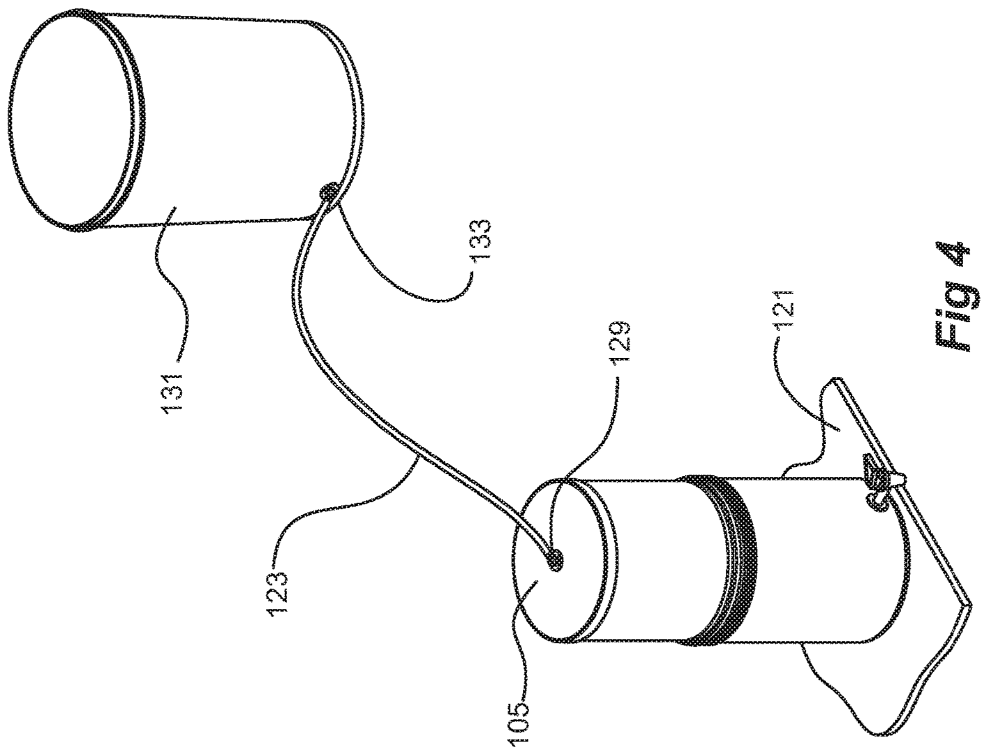
FIG. 4 is a perspective view of a gravity filter system connected to an off-grid water source.

The external water feed line 123 shown in FIG. 4 may be redirected to connect to a different water source such as but not limited to an off grid water container 131 via an outlet port 133 that is not connected to any water pressure line 127. This container 131 may use gravity to feed the water line 123 from the outlet port 133 of the off grid water container 131 by way of the water feed line 123 through the water inlet port 129 that is attached to the center of the lid 105.

Figure 5:
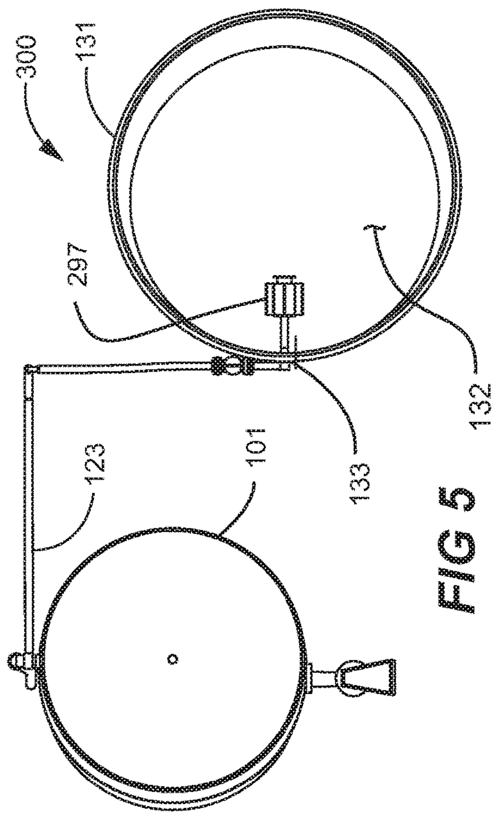
FIG. 5 is a top view of a pre-filter membrane at an exit port of an off-grid water source container.
Figure 6:
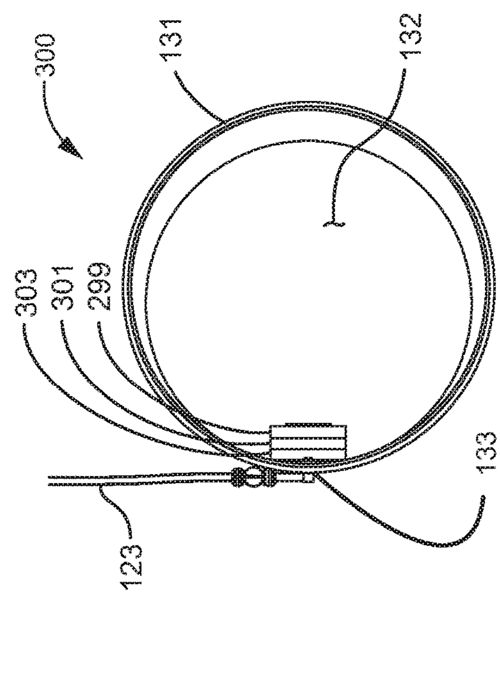
FIG. 6 is a top view of an alternate embodiment of a three-stage membrane pre-filter at an exit port of an off-grid water source container.

FIGS. 5 and 6 show a pre-filter containment system 300 which holds and filters unpurified water 132 before it is introduced to filter 101. Unpurified water 132 may be filtered by an inline filter 297 that is connected to the water feed line 123. This pre-filter 297 may sit at the bottom of the off-grid unpurified water container and may be made of sponge material or some washable medium and may consist of layers of progressively finer pores as the water passes through it to catch first the larger contaminants and then increasingly smaller contaminants in subsequent layers. Layers may be comprised of large pore material 299, medium pore material 301 and fine pore material 303 until the water 132 exits through port 133 into the water feed line 123.

Figure 7:
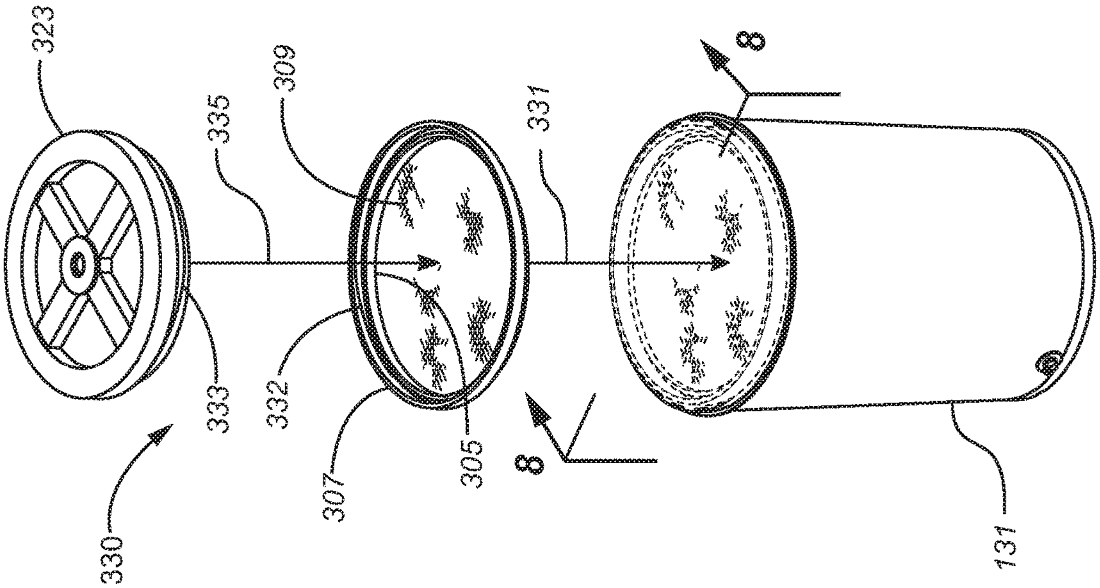
FIG. 7 is a perspective view of an off-grid water source container, lid, and lid ring membrane.
Figure 9:
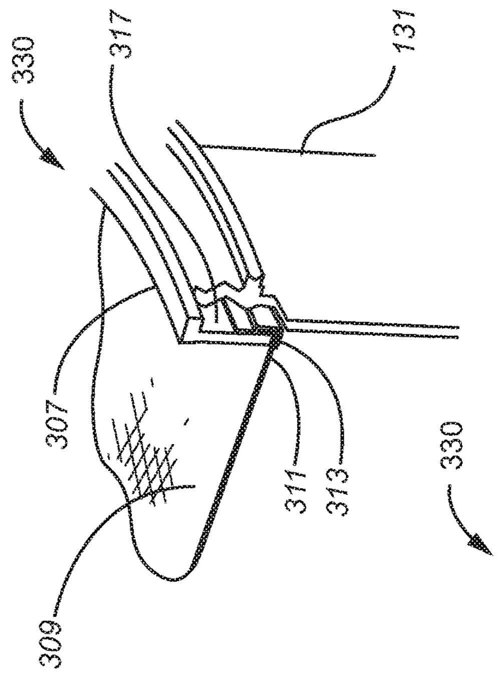
FIG. 9 is a detail view of the container of FIG. 8.
Figure 8:
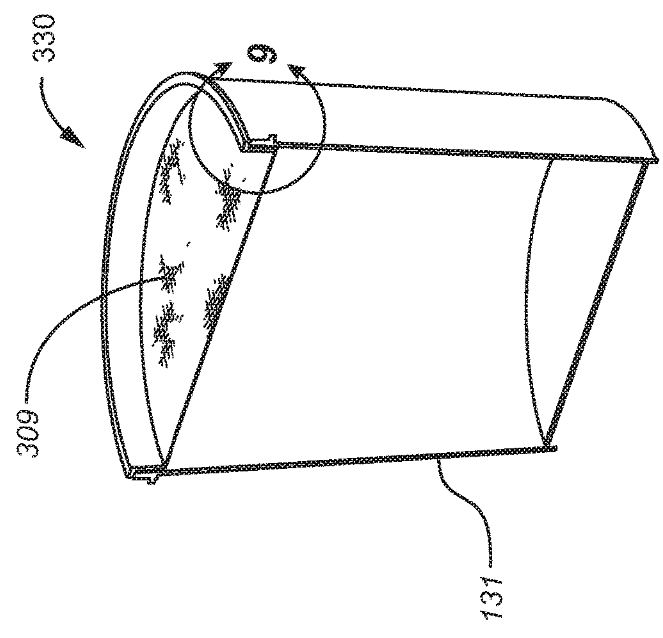
FIG. 8 is a cross-section perspective view of the container of FIG. 7.

FIGS. 7, 8 and 9 show an additional a? pre-filtering system 330 used to filter the water before it is introduced into the opening of the off grid water source container 131. This includes of using a ring 307 and optionally a second retaining ring 305 to hold a filter membrane 309, as shown in FIG. 7. The edge of membrane 309 may be attached between rings 307 and 305, or the edge of membrane 309 may be held to ring 307 by attaching an adhesive strip 313 to surface 311 of membrane 309 and surface 317 of ring 307 as shown in FIG. 9.

Pre-filter assembly 330 in FIG. 7 may be inserted on top of container 131 in direction 331 and attached to top of container 131. Lid 323 may be dropped in direction 335 into the top of ring 307. The thread 333 of lid 323 should engage the thread 332 of ring 307.

Figure 11A:
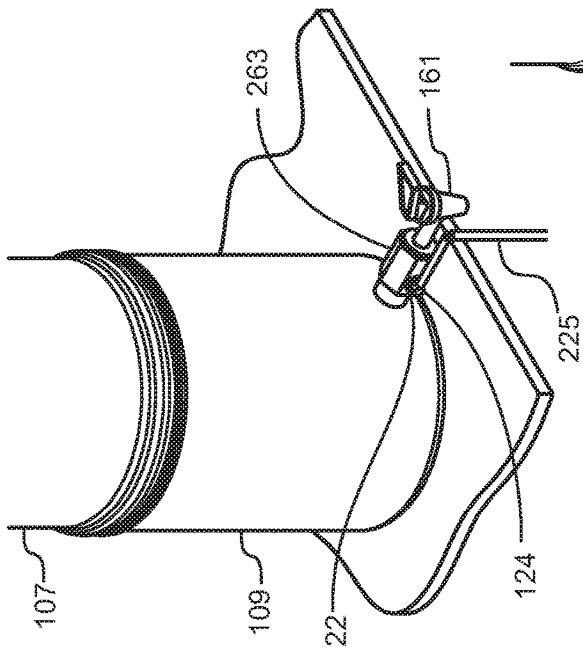
FIG. 11A is a detail perspective of the secondary purified water reservoir of FIG. 10 with a diverting adapter.
Figure 11B:
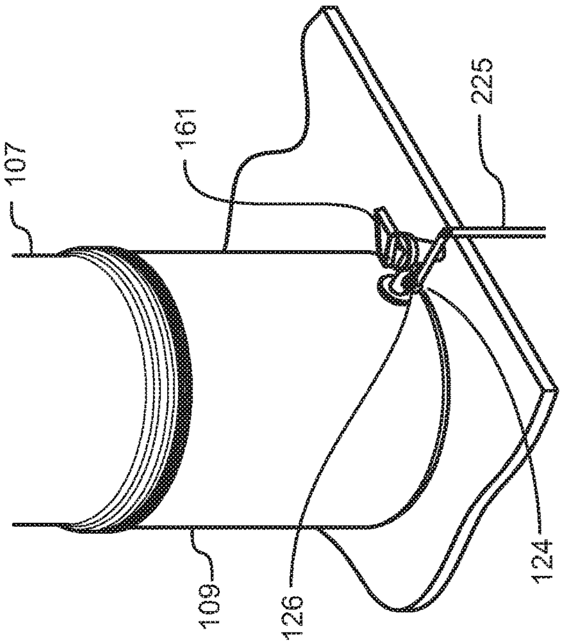
FIG. 11B is a detail perspective of the secondary purified water reservoir of FIG. 10 with a diverting port built into a spout instead of a diverting adapter.
Figure 10:
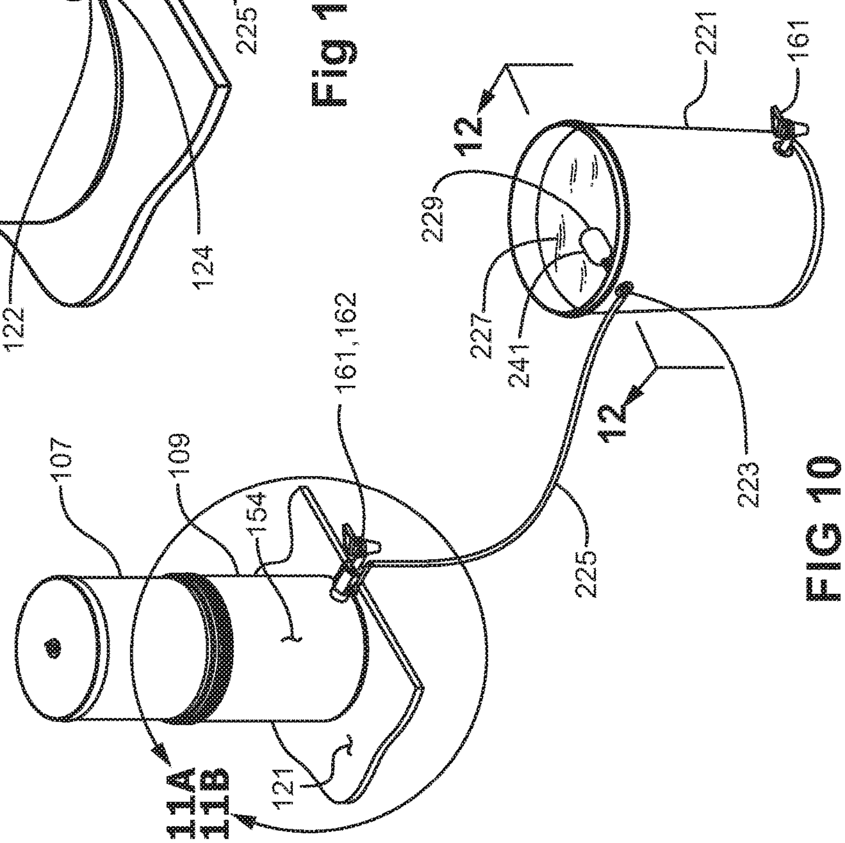
FIG. 10 is a perspective view of a gravity fed water filter system connected to a secondary purified water reservoir.
Figure 12:
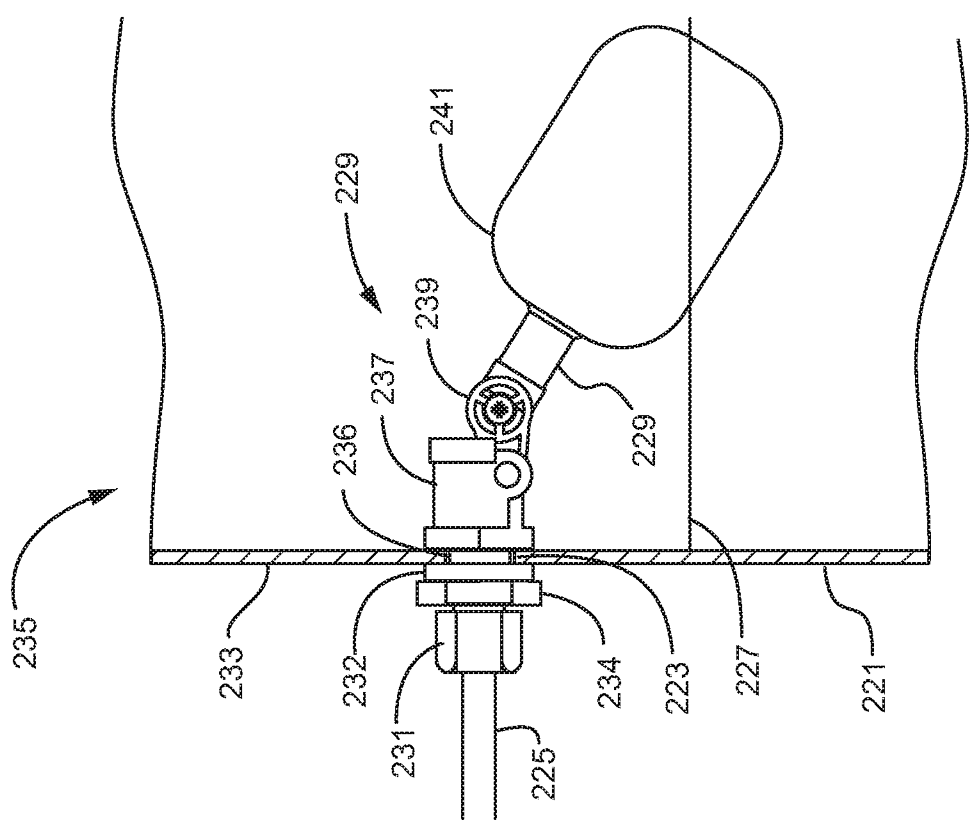
FIG. 12 is a cross-section view of the gravity fed water filter system of FIG. 10 showing an embodiment of a float valve.

FIGS. 10, 11A, 11B and the section detail in FIG. 12 show the flow of the purified water to an external purified water storage container 221. The existing system's purified water 154 is dispensed from the lower chamber 109 through a spout 161 generally located at the bottom of lower chamber 109. Alternatively, one may route the dispensed purified water 154 from lower chamber 109 into the water output line 225 that feeds an alternate secondary water container 221 as shown in FIG. 10. To do this, the purified water 154 may exit the bottom of the lower chamber 109 and may be redirected through a diverting adapter 263 as shown in FIG. 11A. The water may then either go through the spout 161, or alternatively may exit through port 122 and fitting 124 into the purified water output line 225. FIG. 11B is similar to 11A except that a side port 126 is included in the spout itself which would connect to fitting 124 and output line 225.

The purified water 154 may go to a secondary purified water container 221, and its flow may be controlled by a secondary water storage container float valve system 235 as shown in FIG. 12. The water may go through the inlet port 223 into the float valve 229 and be dispensed by valve body 237 into the secondary storage container 221, and continue to fill the container 221 until the water level 227 engages the secondary float valve bulb 241 which rotates on valve pivot 239 until it causes valve 229 to attenuate the flow of incoming water 154 to the secondary storage container 221. The float valve 229 may be inserted through an orifice 236 in secondary storage container side wall 233 in the storage container 221. An annular seal 232 is used to seal the opening and a jam nut 234 may secure the valve 229 to the storage container 221. The purified water line 225 may be connected to the valve 229 by a fitting such as an elbow 231 or quick connect or other means.

Figure 13:
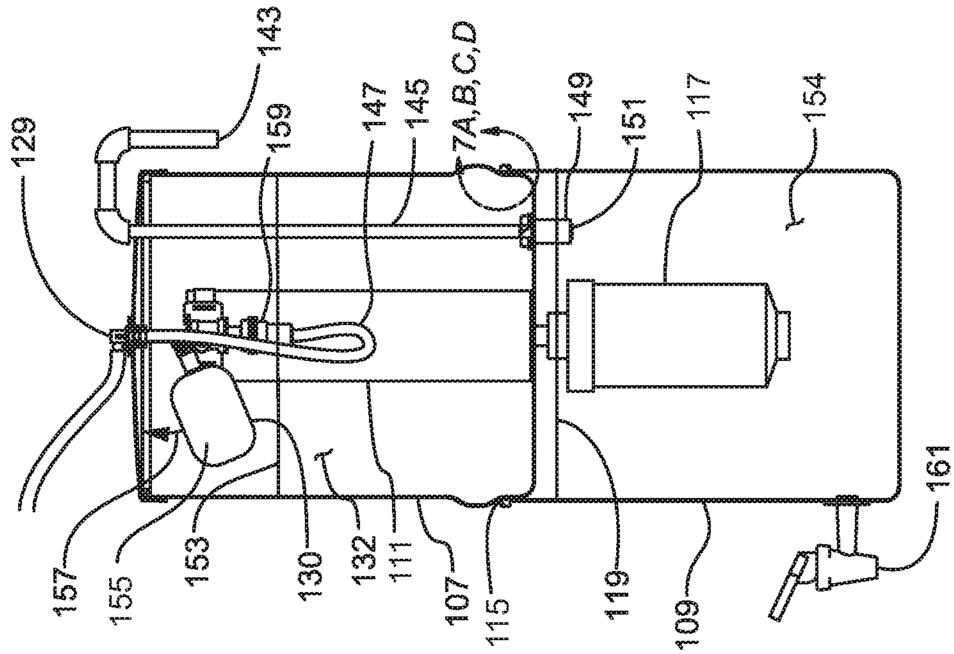
FIG. 13 is a cross-section side view of an embodiment of a gravity filter system with an upper chamber water level below capacity.
Figure 14:
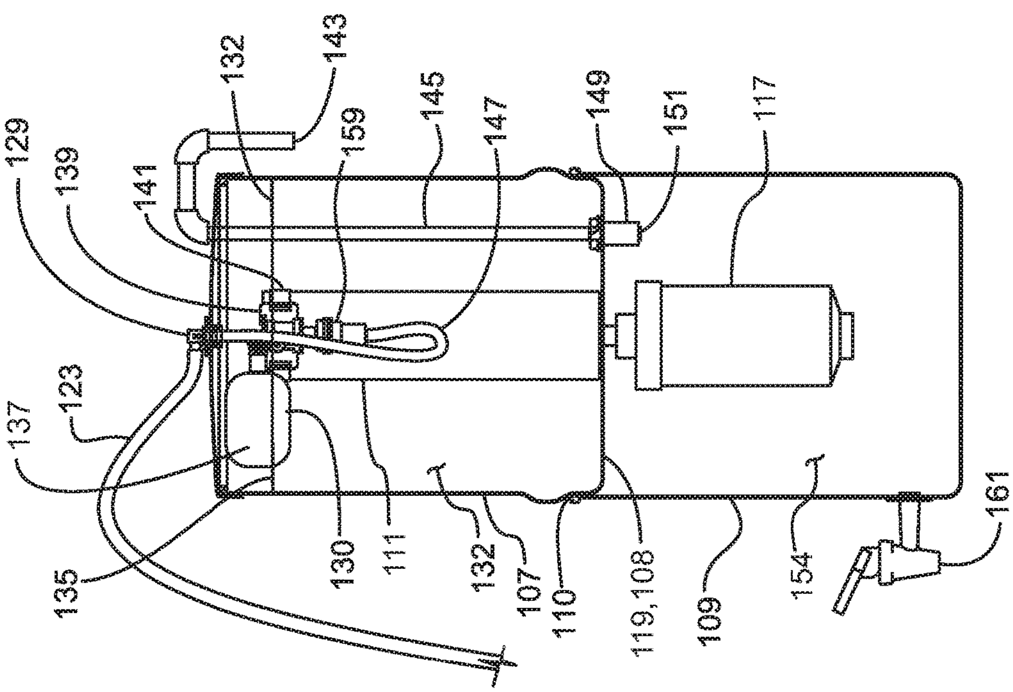
FIG. 14 is a cross-section side view of the gravity filter system of FIG. 13 with the upper chamber water level at capacity.

The internal filtering process begins with the unpurified water flowing into upper chamber 107. FIGS. 13 and 14 show that after going through the inlet port 129 the water continues through an internal water feed line 147 and may go through a float valve adapter 159 that feeds the water into float valve 130. The valve 130 may dispense unpurified water 132 into the upper chamber 107, until the water level 153 shown in FIG. 13 rises, moving the float valve 130 from position 155 to position 137 in FIG. 14, attenuating the inflow of unpurified water 132 into upper chamber 107.

An air vent stack 145 may be added as shown in FIGS. 13 and 14 to normalize the air pressure in the sealed, lower chamber 109, to allow the water level 119 to rise and fall without creating a change in vessel pressure, permitting the free flow of purified water 154 in and out of the lower chamber 109 as needed. The air and water can travel through the vent inlet port 151 as shown in FIG. 13 through a bulkhead fitting 149 in the lower chamber 109, up the vent stack 145 and out the vent exit 143 near the top of the upper chamber 107 shown in the same figures. The upper end of the vent must exceed the height of the maximum water level 135 of the upper chamber 107 shown in FIG. 14, thus preventing any over spill of purified water 154 due to buoyant equalization of the two chambers' water levels 119/135.

Figure 15:
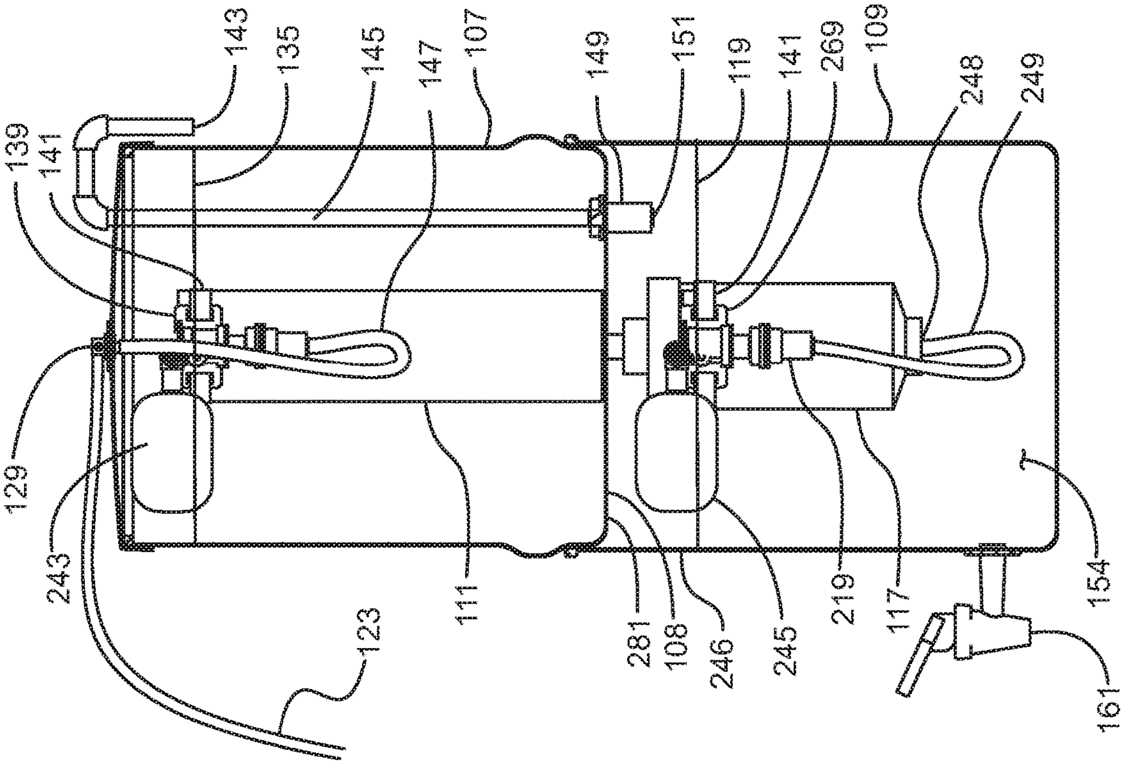
FIG. 15 is a cross-section perspective view of an alternative embodiment of a gravity filter system including a second float valve to control a lower chamber water level.
Figure 18:
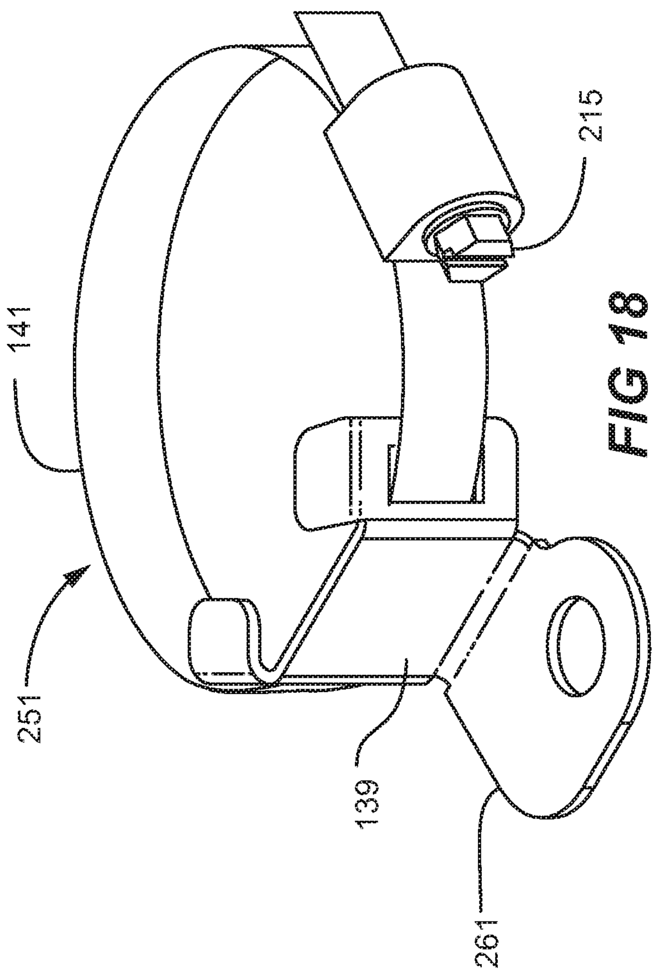
FIG. 18 is a perspective view of the float valve mounting bracket of FIG. 16 attached to a clamping band.
Figure 16:
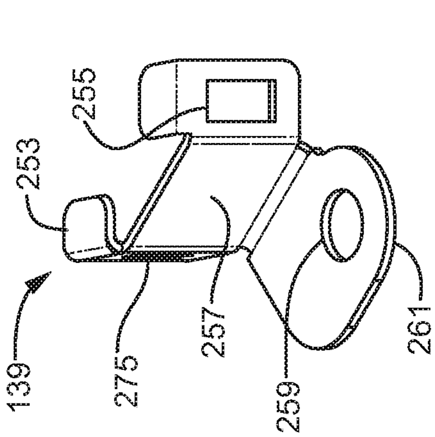
FIG. 16 is a perspective view of an upper chamber float valve mounting bracket of the system of FIG. 15.
Figure 17:
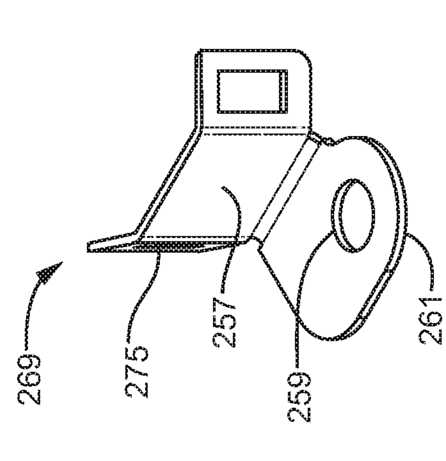
FIG. 17 is a perspective view of a lower chamber float valve mounting bracket of the system of FIG. 15.

FIG. 15 shows a second float valve 245 which may be added to the lower chamber 109 that would control the inflow of purified water 154 into the lower chamber 109. This second float valve 245 may be attached to the lower chamber filter 117 by way of a float valve bracket 269 as shown in FIG. 17, using a clamping band 141 as shown in FIG. 18. Alternatively, it may be mounted to the side wall 246 of the lower chamber 109, or to the bottom 108 of the upper chamber 107.

The purified water 154 entering the lower chamber 109 via filters 111, 117 may be directed into a second tube 249 through the output 248 of the filter cartridge 111,117. This tube 249 connects to the second float valve 245, by way of an adapter, 219, which limits the purified water 154 entering the lower chamber 109, maintaining the lower chamber water level 119 so that it would not exceed the capacity of the lower chamber 109. The unpurified water 132 which is continuously fed into the upper chamber 107 constantly flows down through the filter cartridges 111, 117 into the lower chamber 109. In other implementations the lower filter cartridge 117 may be excluded so that there is only a filter in the upper chamber—in such implementations the second float valve 245 may instead be directly connected to the bottom of the upper filter cartridge 111.

Figure 19A:
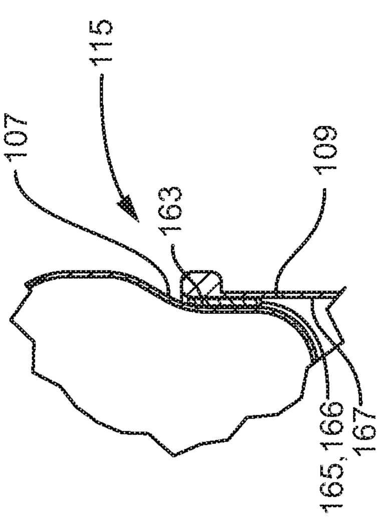
FIG. 19A is side section detail view of an implementation of a water seal between the upper and lower chambers of a gravity filter system.
Figure 19B:
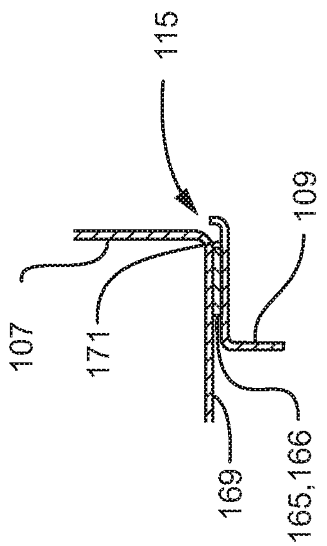
FIG. 19B is side section detail view of another implementation of a water seal between the upper and lower chambers of a gravity filter system.
Figure 19C:
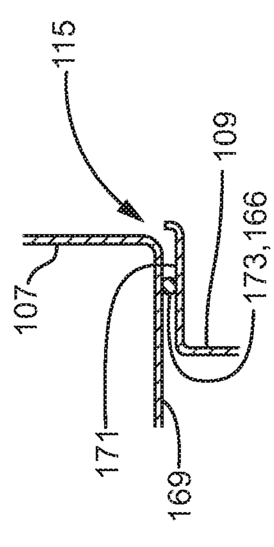
FIG. 19C is side section detail view of another implementation of a water seal between the upper and lower chambers of a gravity filter system.
Figure 19D:
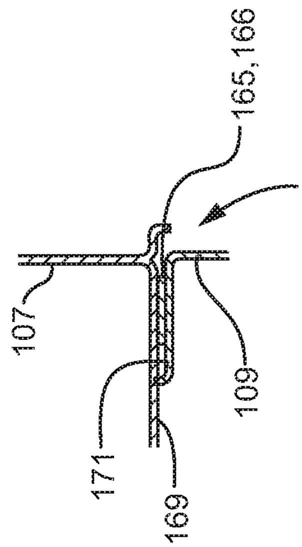
FIG. 19D is side section detail view of another implementation of a water seal between the upper and lower chambers of a gravity filter system.

FIG. 19A shows an annular seal 165 at an interface 115 between upper chamber 107 and lower chamber 109 to prevent purified water 154 from escaping through interface 115. FIGS. 19B, C and D show seal configurations that may be used to seal different prior art upper/lower chamber interfaces. FIG. 19A depicts a vertical, cylindrical interface 115 between the upper chamber 107 and the lower chamber 109, including inside surface 167 of lower chamber 109 and outside surface 163 of upper chamber 107. FIGS. 19B, C and D detail a flat horizontal interface 115 between upper chamber 107 and lower chamber 109, including the bottom surface 169 of upper chamber 107 and the upper surface 171 of lower chamber 109. The annular seal 165 may be in the form of, but not limited to, a flat gasket material 166 shown in FIGS. 19A, B and D, or an O-ring 173 as seen in FIG. 19C or other material achieving an equivalent seal.

Figure 20C:
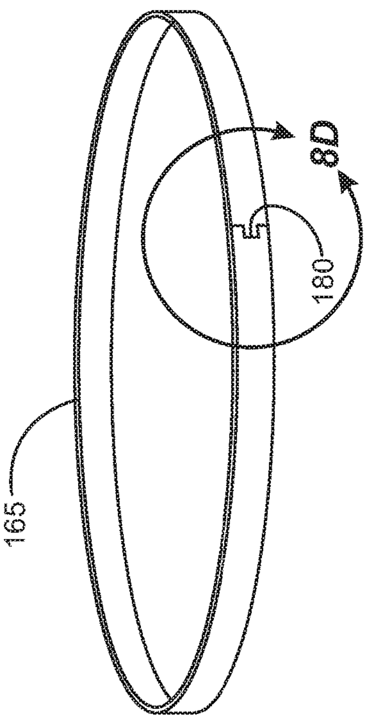
FIG. 20C is a perspective detail of the gasket seal of FIG. 20A.
Figure 20D:
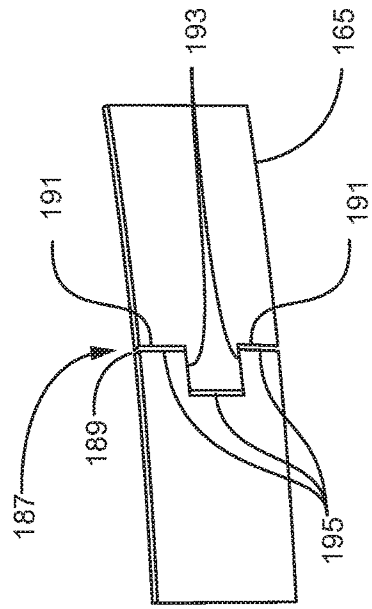
FIG. 20D is a perspective detail view of the gasket seal of FIG. 20C.
Figure 20A:
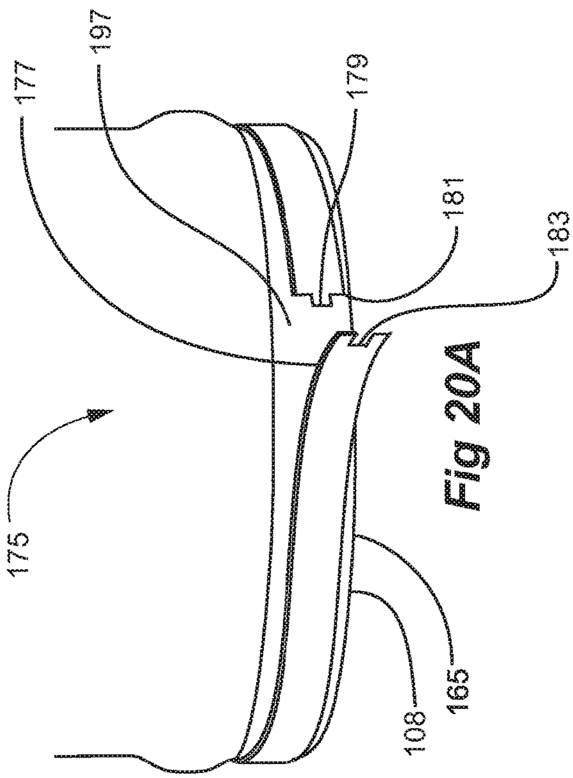
FIG. 20A is a perspective detail of a gasket seal being applied to a lower chamber of a gravity filter system.
Figure 20B:
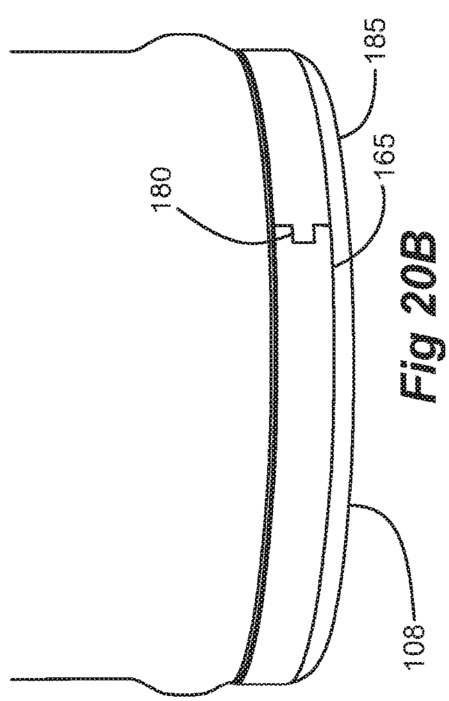
FIG. 20B is a perspective detail of the gasket seal of FIG. 20A after being applied to the lower chamber.

As shown in FIGS. 20A and 20B, annular seal 165 may completely wrap around and be adhesively held to the circumference of the annular portion 197 of the bottom 108 of upper chamber 107, or it might be a continuous ring with no breaks. A mating sealing notch 180, which may include a tongue 179 at one end of the seal and a groove 183 at the other end of the seal, prevents a circumferential gap 189 in FIG. 20D at seal joint 187 from allowing water to escape through the seal assembly joint 187. The horizontal sealing edges 193 of the sealing joint 187 allow for tighter control than the vertical edges 191, 195 of sealing joint 187, eliminating water leakage through gap 189 at seal joint 187. In each case an annular seal 165 seals the interface 115 (FIGS. 19A, B, C, D) between upper chamber 107 and lower chamber 109. Any other pattern or shape of mating interface of the two ends, other than a straight vertical cut, may be used in other implementations.

Figure 21A:
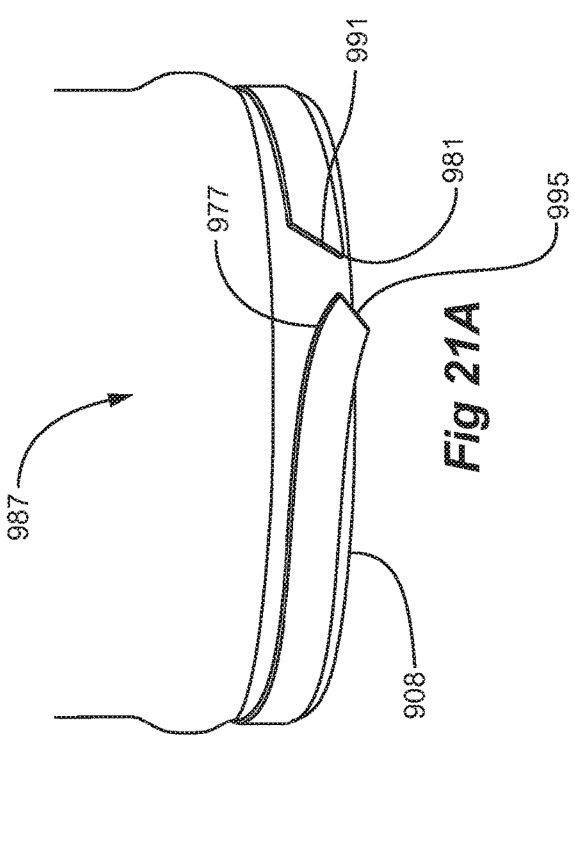
FIG. 21A is a perspective detail of a gasket seal being applied to a lower chamber of a gravity filter system.
Figure 21B:
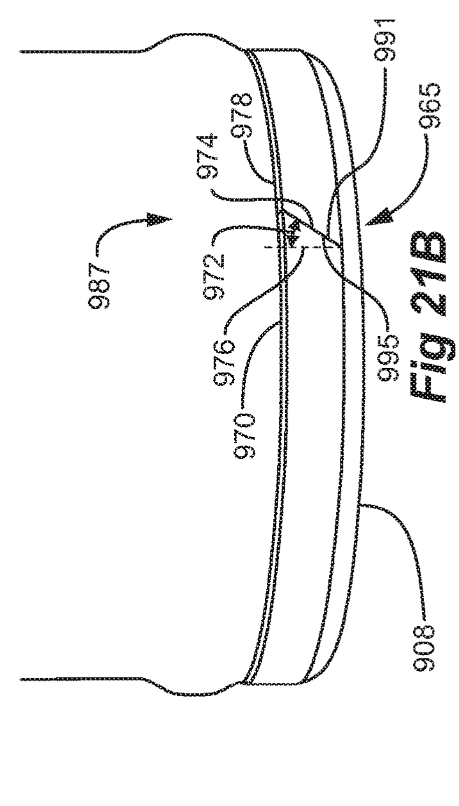
FIG. 21B is a perspective detail of the gasket seal of FIG. 21A after being applied to the lower chamber.
Figure 21C:
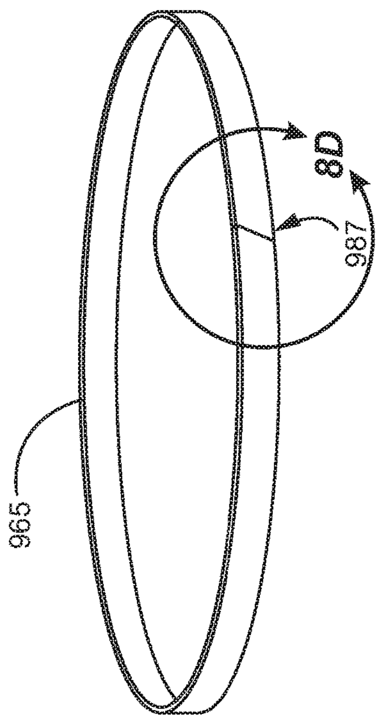
FIG. 21C is a perspective detail of the gasket seal of FIG. 21A.
Figure 21D:
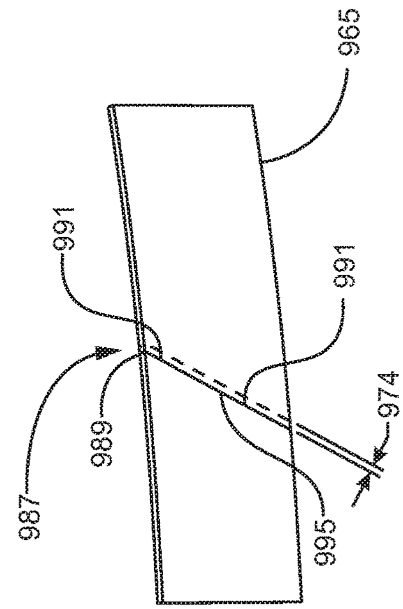
FIG. 21D is a perspective detail view of the gasket seal of FIG. 21C.

FIGS. 21A, B, C and D show an alternate embodiment in which the annular seal 965 is cut at an angle 972 so that right edge 991 mates exactly with left edge 995. This angle 972 would allow for any needed adjustment to eliminate any gap or overlap that might occur during placement.

Figure 23:
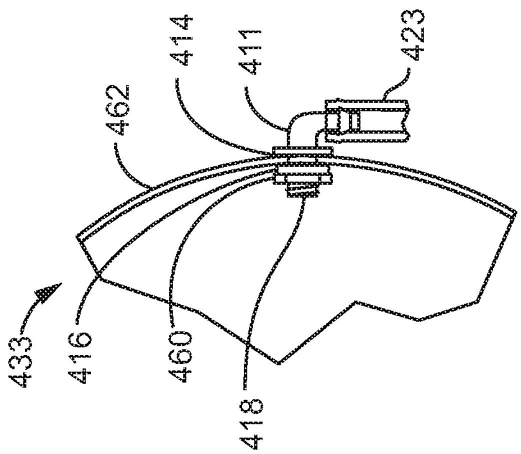
FIG. 23 is a cross-section view of the off-grid water container of FIG. 22.
Figure 22:
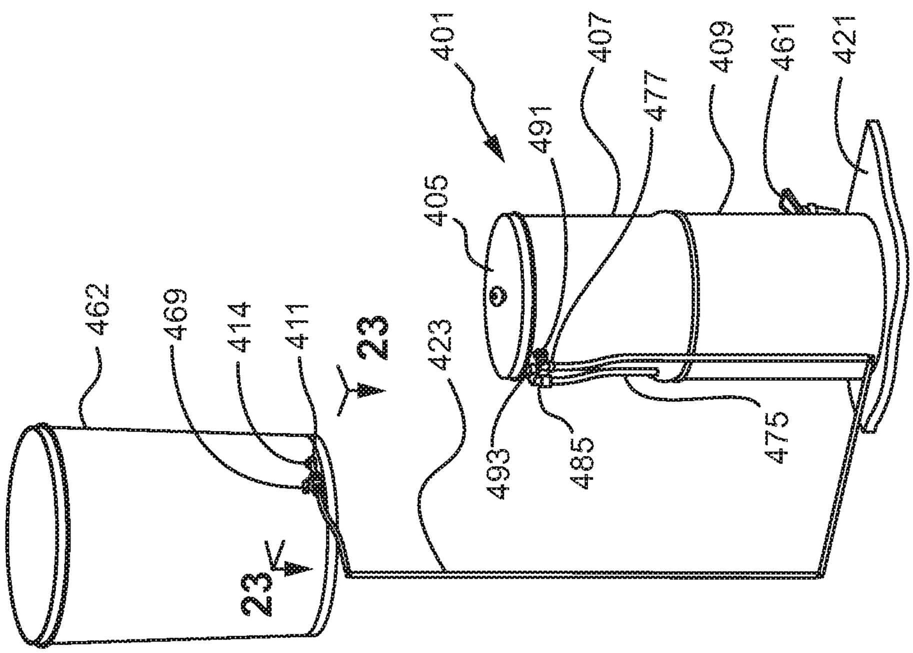
FIG. 22 is a perspective view of a gravity fed water filter system connecting an off-grid water container through a sidewall of an upper chamber of the system.
Figure 26:
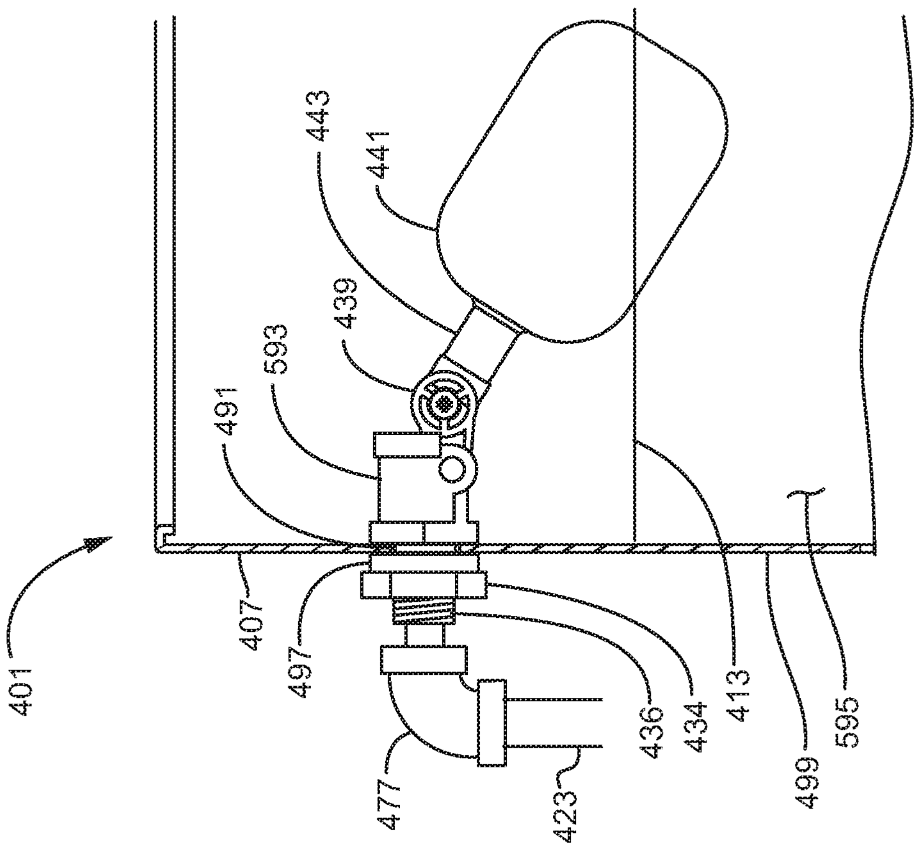
FIG. 26 is a cross-section detail view of the system of FIG. 25 showing the float valve mounted to the sidewall of the upper chamber.

FIGS. 22 and 23 show an alternative embodiment of the connection of the filter system to its off-grid water sources, as seen previously in FIGS. 3 and 4. This embodiment depicts a filter system 401 where a fitting 411 may be connected to an unpurified water container 462 at port 414 sealed by annular seal 416 and secured by jam nut 460 that is threaded onto threaded portion 418 of fitting 411. The unpurified external water feed line 423 may connect to fitting 411, through an off-grid shutoff valve 469, from the outlet port 414 of the off-grid unpurified water container 462. Water feed line 423 may connect to fitting 477 at port 491 of upper chamber 407. Then as shown in FIG. 26, fitting 477 may connect to valve body 593. A jam nut 434 may secure threaded portion 436 of valve body 593 to port 491 and annular seal 497 may seal port 491.

Figure 25:
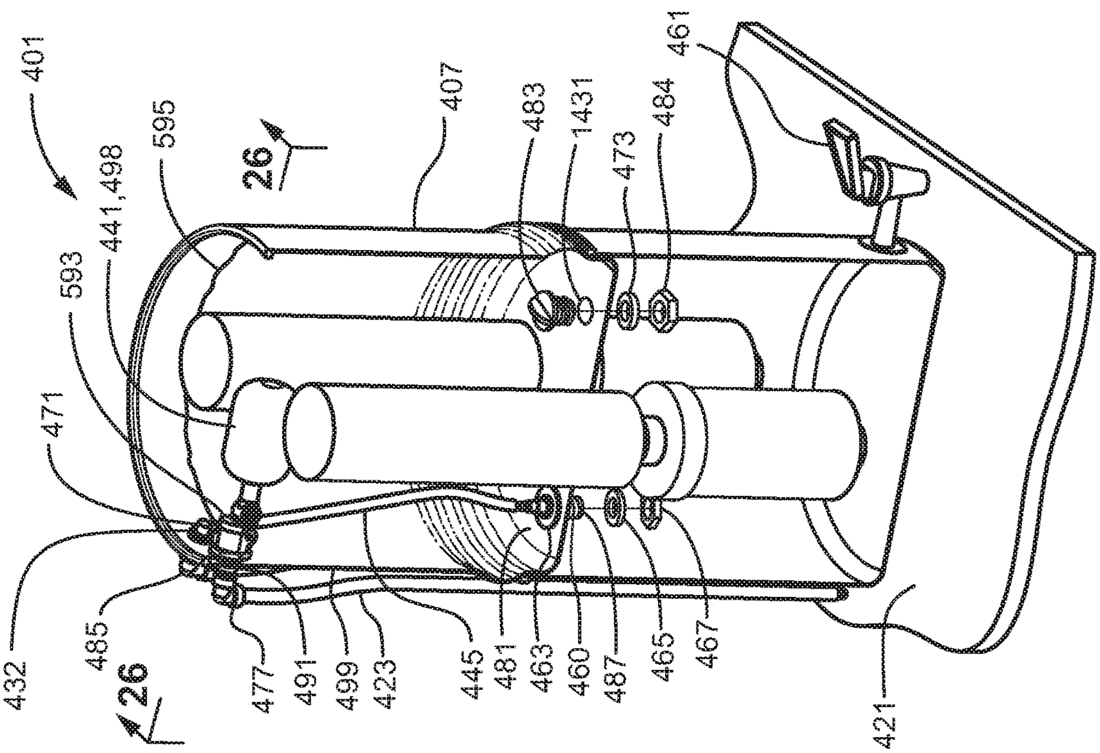
FIG. 25 is a cross-section view of the system of FIG. 24 showing a float valve connected to a sidewall of the upper chamber.
Figure 24:
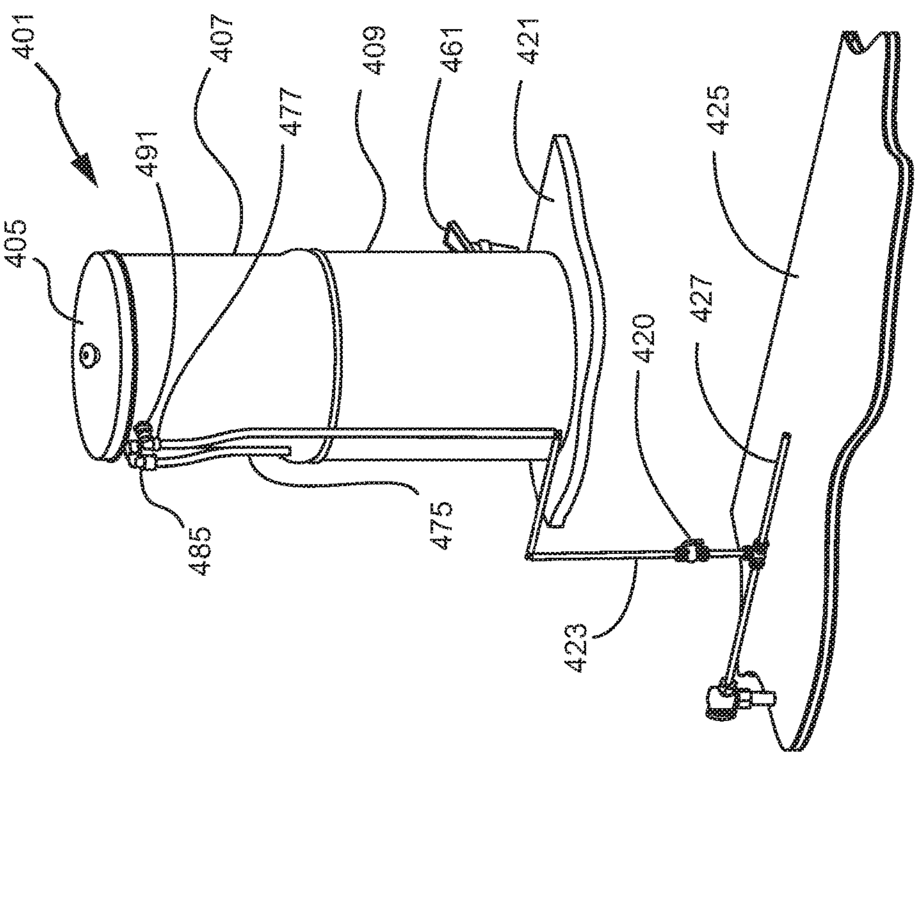
FIG. 24 is a perspective view of a gravity fed water filter system connecting a culinary water line through a sidewall of an upper chamber of the system.

As depicted in FIG. 24, a shut off valve 420 may connect the water pressure line 427 to the external water feed line 423. As shown in FIGS. 25 and 26, the external water feed line 423 continues until it connects to a fitting which may be an elbow 477 which passes through inlet port 491 in the side wall 499 of upper chamber 407 and connects to float valve body 593. In the detail of FIG. 26, annular float valve seal 497 seals port 491 by being placed between the connection of float valve body 593 and fitting 477. Jam nut 434 is secured to threaded end 436 of valve body 593.

FIGS. 25 and 26 also depict the flow of unpurified water 595 through the water feed line 423, which continues through the elbow 477 into valve body 593 and is released into upper chamber 407. Unpurified water 595 continues to fill upper chamber 407 until the upper chamber water level 413 engages float valve bulb 441. The water 595 then may force valve bulb 441 of float valve 443 to raise, until the valve body 593 attenuates flow of unpurified water 595 into upper chamber 407.

Figure 27:
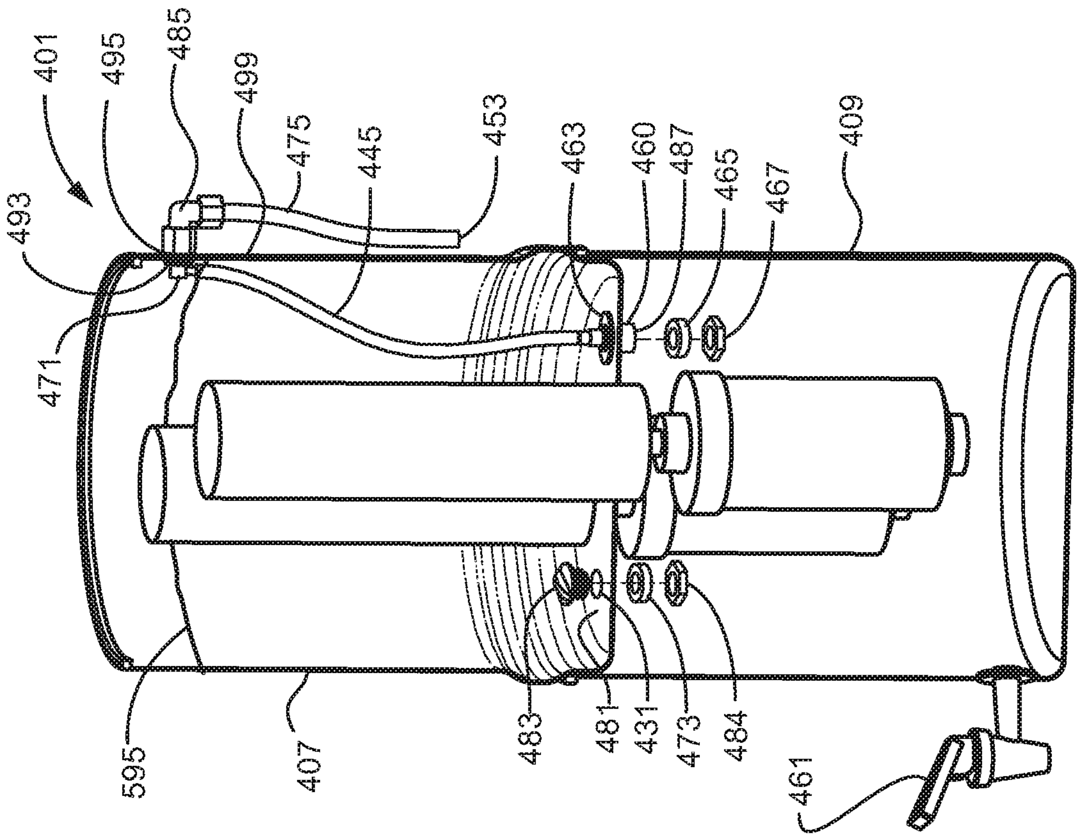
FIG. 27 is a cross-section perspective view of a gravity fed water filter system showing a vent exiting a sidewall of the upper chamber.

This same embodiment shown also in FIG. 27 depicts the vent stack 445 which is attached to a bulkhead fitting 463 and extends through orifice 431 in floor 481 of upper chamber 407. An annular seal 465 may be placed on threaded portion 460 of bulkhead fitting 463. Jam nut 467 is then tightened onto threaded portion 460. The air and water in lower chamber 409 can then freely flow through the inlet port 487 on the underside of the bulkhead fitting 463 and up through the vent stack 445. The upper end of vent stack 445 connects to an elbow 471 that exits through outlet port 495 of side wall 499 in upper chamber 407. An annular vent seal 493 seals the vent outlet port 495 of side wall 499 in upper chamber 407. An elbow 485 may connect the vent on the outside of upper chamber 407 to optional down spout 475 and vents out to the open air at the vent exit 453 as shown in FIG. 27, thus creating equilibrium in chamber 409 with the ambient air pressure outside the filter system 401. Plugs 483, annular seals 473 and jam nuts 484 are used to fill unused orifices 431 where needed to prevent unpurified water in upper chamber 407 from entering and contaminating lower chamber 409.

Figure 29:
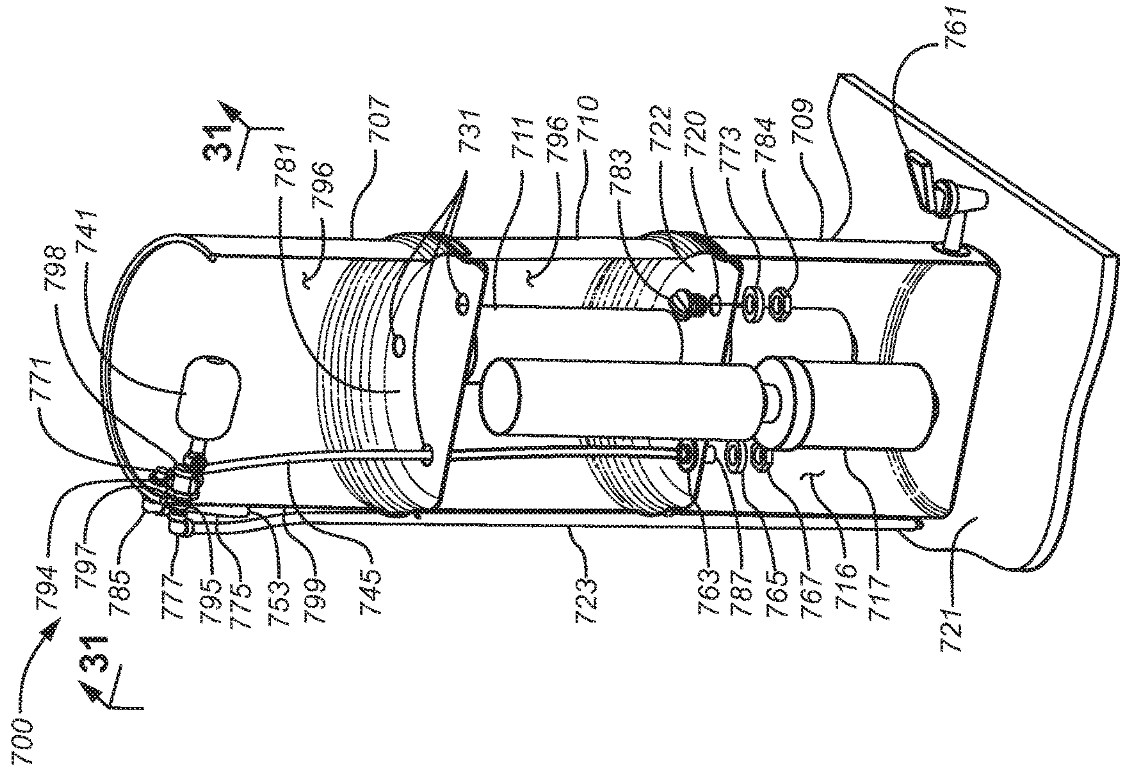
FIG. 29 is a perspective section view of a gravity fed water filter system including a mid-chamber of purified water.
Figure 28:
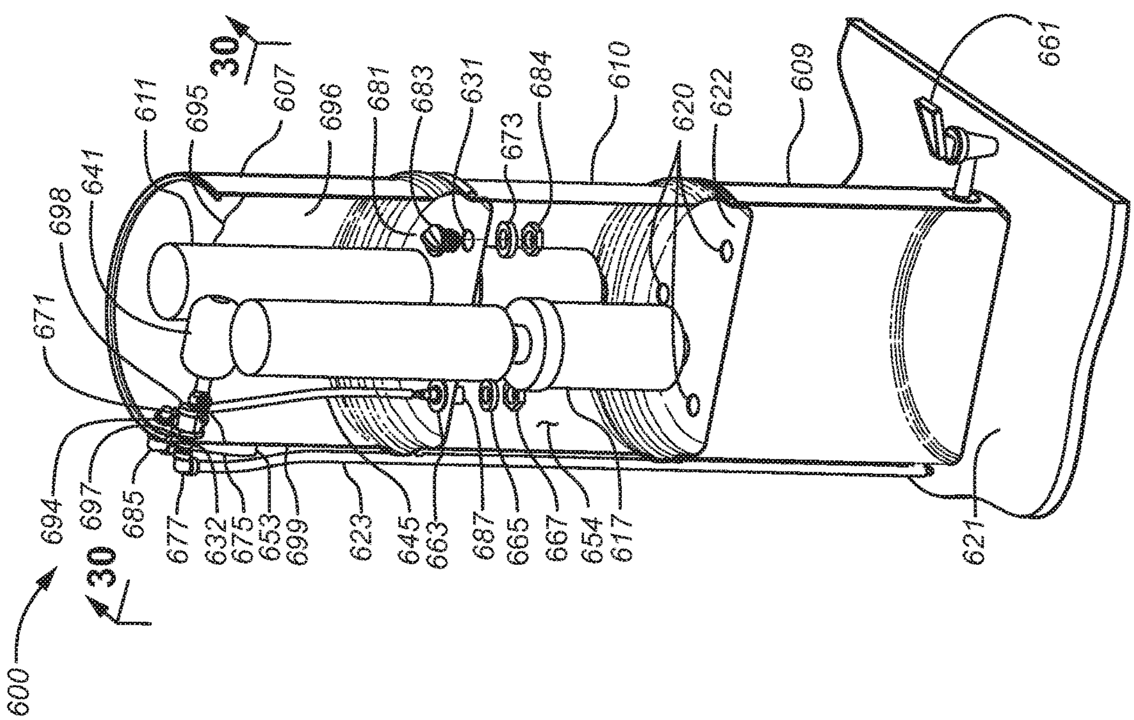
FIG. 28 is a perspective section view of a gravity fed water filter system including a mid-chamber of purified water.

FIGS. 28 and 29 show how a third chamber embodiment 600/700, may be implemented either in place of the off-grid unpurified water container 131, previously depicted in FIG. 4, or may act as the purified water container 221, previously depicted in FIG. 10.

Figure 30:
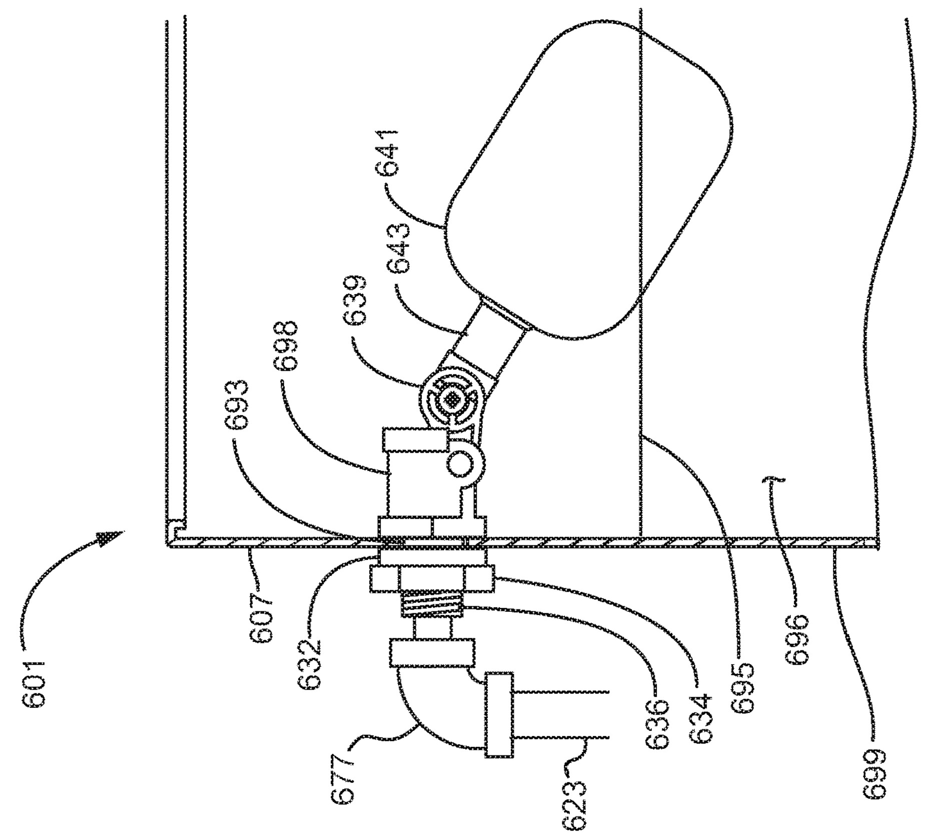
FIG. 30 is a detail cross-section view of an upper chamber of the system of FIG. 28.

FIGS. 28 and 30 depict an integrated purified water containment system 600 wherein the purified water container 221 as shown previously in FIG. 10 is alternatively designed directly into the filter system 600 as an additional chamber 610/710, doubling the capacity of purified water of the current gravity filtration systems in a more aesthetically pleasing alternative than the container 221 previously shown in FIG. 10. In this embodiment the filters 611 are inserted into the orifices 631 in the base 681 of the upper chamber 607, and any remaining open orifices 631 are plugged with plug 683, seal 673 and jam nut 684. The orifices 620 in floor 622 of the new middle chamber 610 are left open to allow purified water 654 to flow freely from the new middle chamber 610 to the lower chamber 609, which doubles the filter system's capacity for available purified water 654.

The water feed line 623 may connect from either the outlet port 414 (FIGS. 22 and 23), through a shutoff valve 469 of the off grid water container 462, or the water pressure line 427 (FIG. 24) through a shutoff valve 420 through feed line 623 (FIG. 28), to fitting or elbow 677. The water flows through inlet port 693 in the side wall 699 of upper chamber 607 into a float valve body 698. Shown in the detail of FIG. 30, an annular seal 632 and jam nut 634 may be secured to threaded end 636 of valve body 698 through inlet port 693. Unpurified water 696 flows through water line 623 through elbow 677 into valve body 698 and is released into upper chamber 607. Unpurified water 696 continues to fill upper chamber 607 until the upper chamber water level 695 engages float valve bulb 641. The water 696 then may force valve bulb 641 of float valve 643 to raise, pivoting bulb 641 about valve pivot 639 until the valve body 698 attenuates flow of unpurified water 696 into upper chamber 607.

This embodiment also allows for the vent stack 645 seen in FIG. 28, which is attached to a bulkhead fitting 663 and extends through an orifice 631, a seal 665 and jam nut 667 in floor 681 of upper chamber 607 are secured to threaded feature 687, opening out into middle chamber 610 through a vent inlet port 687 on the underside of the bulkhead fitting 663. The upper end of vent stack 645 connects to an elbow 671 that exits through outlet port 697 of side wall 699 in upper chamber 607. An annular vent seal 694 seals the vent outlet port 697 of side wall 699 in upper chamber 607 as shown in FIG. 28. Elbow 685 connects the vent on the outside of upper chamber 607 to optional down spout 675 and vents out to the open air at the vent exit 653.

Figure 31:
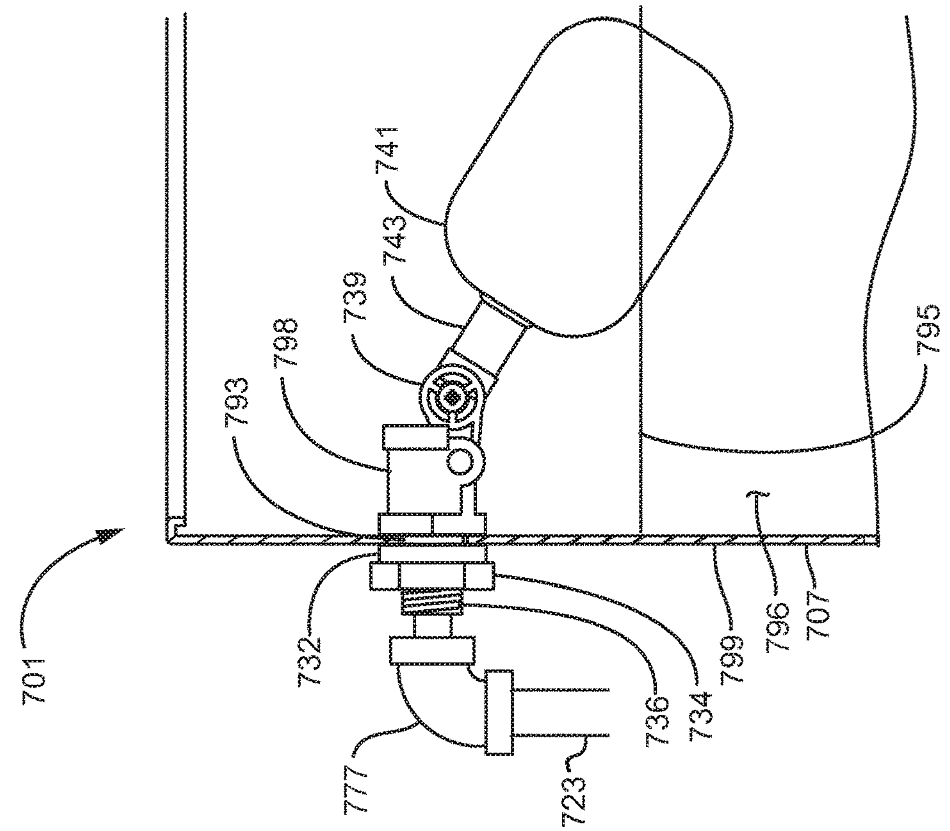
FIG. 31 is a detail cross-section view of an upper chamber of the system of FIG. 29.

FIGS. 29 and 31 depict an integrated off grid water containment system 700 wherein an unpurified water container 131, such as the one shown in FIG. 4 is designed directly into the filter system 700, in a more aesthetically pleasing alternative, as an additional chamber, doubling the capacity of unpurified water of the current gravity filtration systems. The water feed line 723 may connect from either the outlet port 414 (FIG. 22) through a shutoff valve 469 of the off grid water container 462, or a water pressure line 427 (FIG. 24). As detailed in FIG. 31, the water feed line 723 then connects to an elbow 777 at inlet port 793 in the side wall 799 of upper chamber 707 into a float valve body 798. An annular seal 732 seals port 793 in the side wall 799 of upper chamber 707. Jam nut 734 is secured to threaded end 736 of valve body 798. Unpurified water 796 goes through water line 723 through the elbow 777 into valve body 798 and is released into upper chamber 707. Unpurified water 796 continues to fill upper chamber 707 until the upper chamber water level 795 engages float valve bulb 741. The water level 795 then may force valve bulb 741 of float valve 743 to raise, pivoting bulb 741 about valve pivot 739 until the valve body 798 attenuates flow of unpurified water 796 into upper chamber 707.

The embodiment of FIG. 29 is like that of FIG. 28 except that floor 722 of middle chamber 710 separates the unpurified water 796 stored in the upper two chambers 707 and 710 from the purified water 716 stored in the lower chamber 709. Note that since middle chambers 610/710 would be stackable, as many as desired may be added to this new, more versatile water filter system 700.

The vent for this embodiment is shown in FIG. 29, beginning with a threaded inlet port 787 in lower chamber 709 on the underside of the bulkhead fitting 763, connected by a seal 765 and jam nut 767 which passes through an orifice 720 in floor 722 of the new middle chamber 710, and may extend through an unsealed orifice 731 in the floor 781 of the upper chamber 707. The upper end of vent stack 745 connects to an elbow 771 that exits through outlet port 794 of side wall 799 in upper chamber 707. An annular vent seal 794 seals the vent outlet port 797 of side wall 799 in upper chamber 707. Elbow 785 connects the vent on the outside of upper chamber 707 to optional down spout 775 and vents out to the open air at the vent exit 753. A plug 783 is also seen coupled with an annular seal 773 and jam nut 784 through orifice 720. The plug is used to fill unused orifices where needed to prevent unpurified water in the upper chamber from entering and contaminating the lower chamber. If a filter or other element is desired to couple with the orifice then the plug can be removed.

Figure 32:
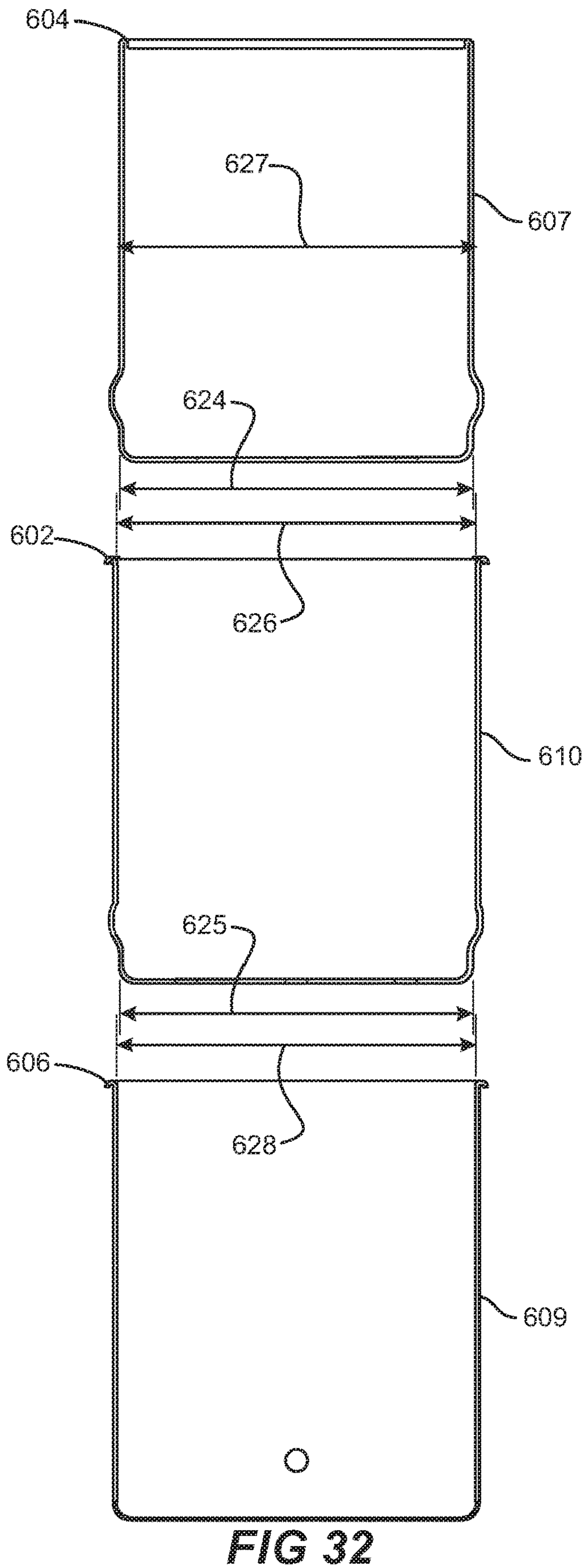
FIG. 32 is a front cross-section exploded view of a gravity filter with an added mid-chamber.
Figure 33:
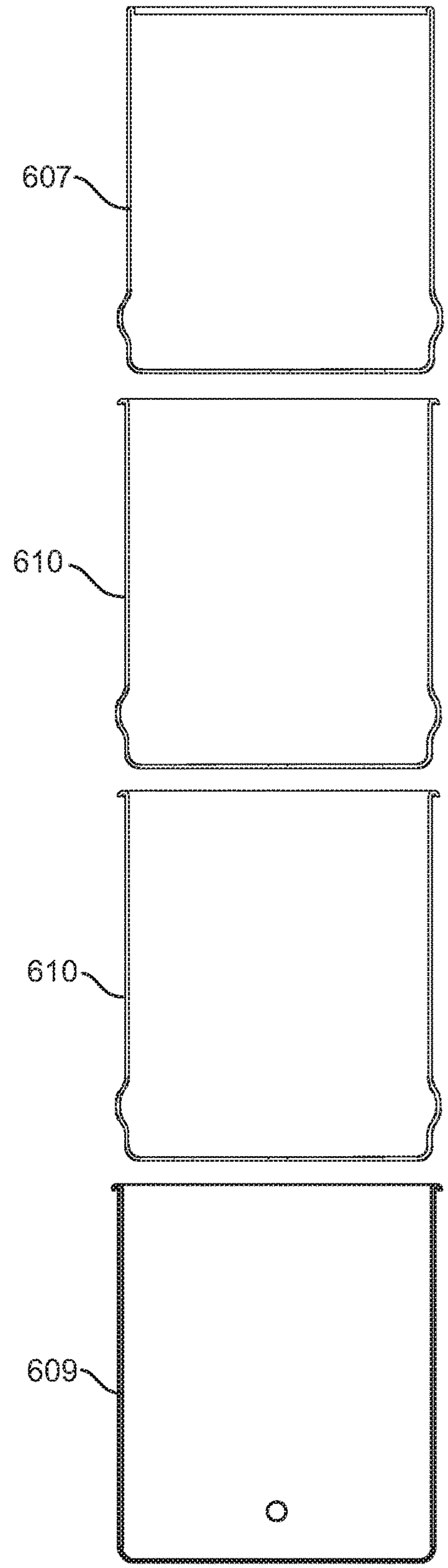
FIG. 33 is a front cross-section exploded view of a gravity filter with multiple mid-chambers added between upper and lower storage containers.

FIGS. 32 and 33 apply to both the 600 and 700 embodiments. FIG. 32 shows construction of mid-chamber 610/710. The lip 602 of mid chamber 610/710 turns outward as opposed to the lip 604 of upper chamber 607, which turns inward. This inside diameter 626 of mid-chamber 610/710 allows mid-chamber 610/710 to receive either the bottom outside diameter 624 of upper chamber 607, or to receive the bottom outside diameter 625 of another mid-chamber 610/710. The outside bottom diameter 625 of mid-chamber 610/710 may be designed to slip into the top inside diameter 628 of lower chamber 609, or the top inside diameter 626 of another mid-chamber 610/710. This allows for multiple mid-chambers 610/710 to be stacked one upon another as many as desired, between upper chamber 607 and lower chamber 609, which can be used either as additional unpurified or purified water chambers as shown in FIG. 33.

Figure 35:
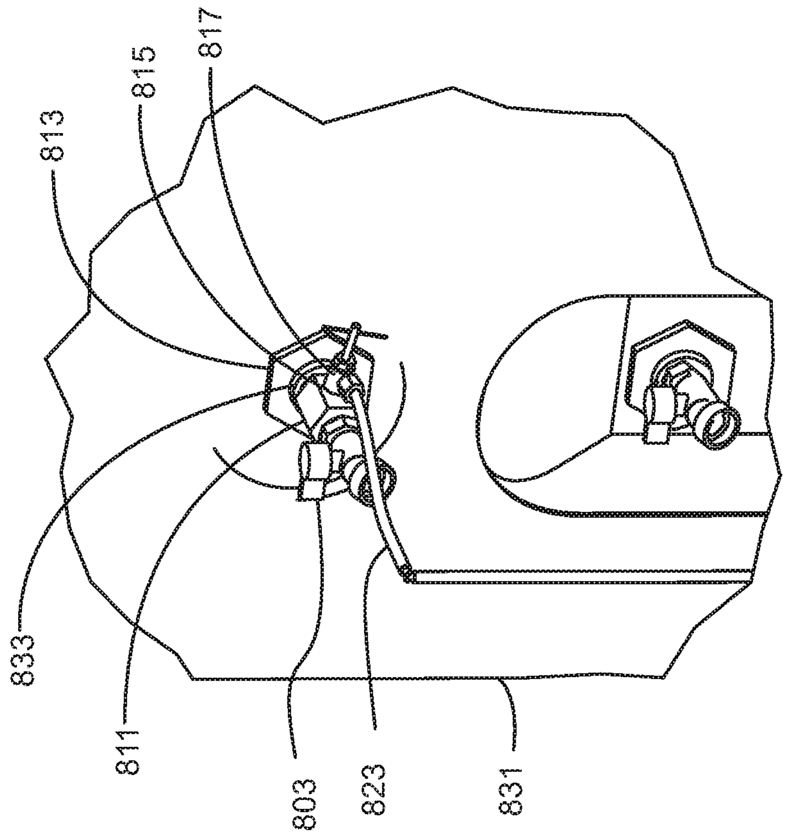
FIG. 35 is a detail view of a diverting faucet adapter of the system of FIG. 34.
Figure 34:
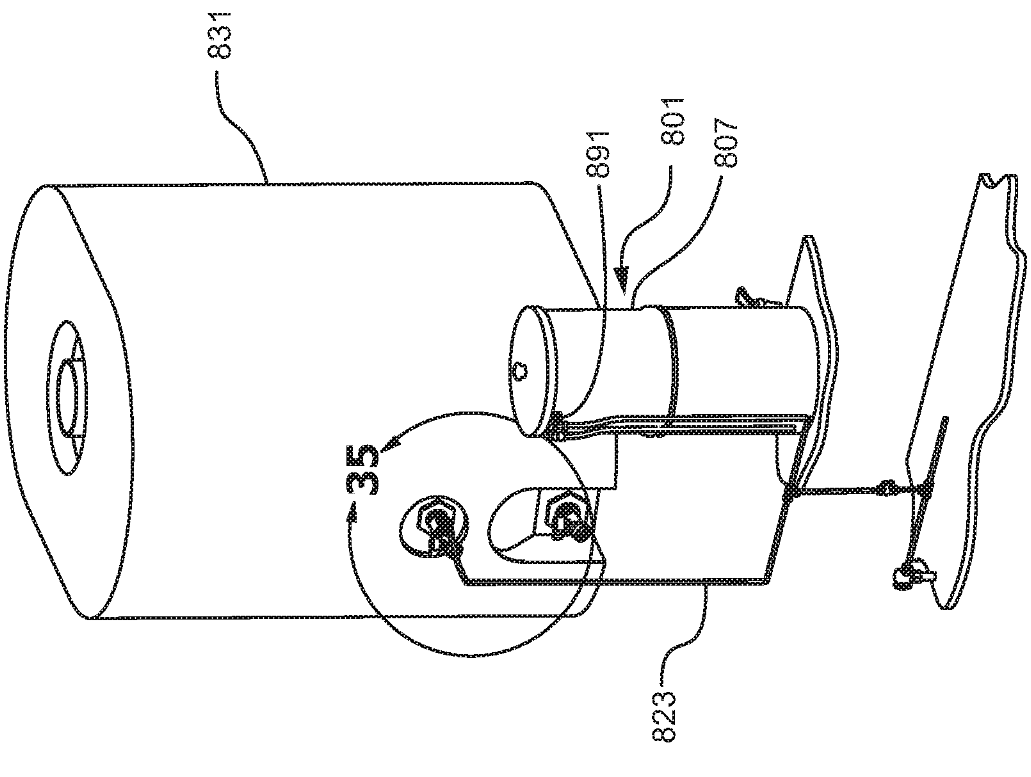
FIG. 34 is a perspective view of a gravity fed water filter system connecting to a large unpurified water storage container.
Figure 36:
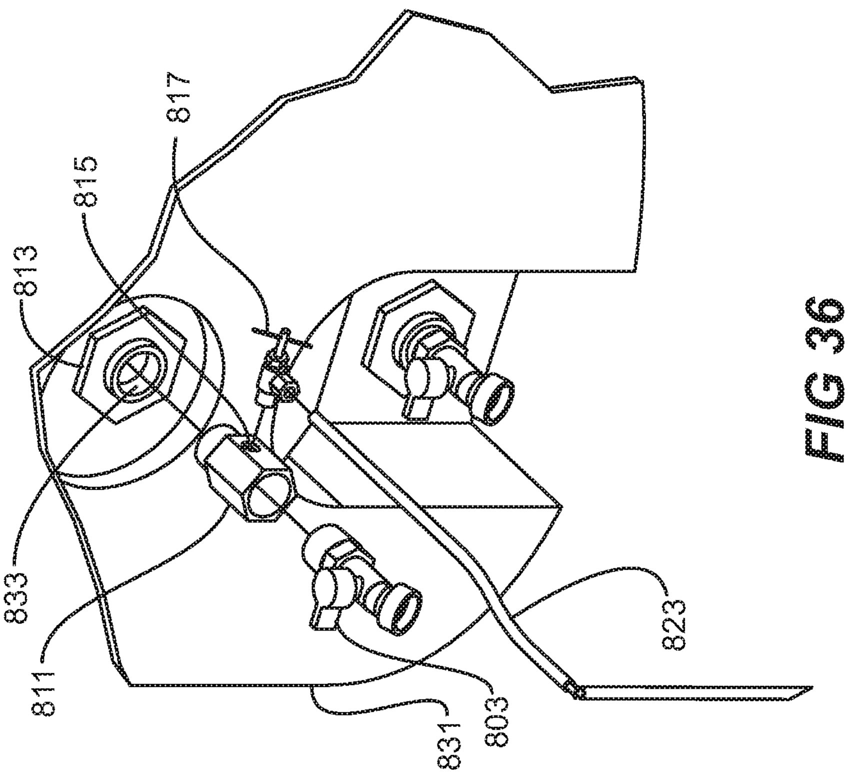
FIG. 36 is an exploded view of the diverting faucet adapter of FIG. 35.

FIGS. 34 and 35 and exploded detail FIG. 36 show water filter system 801, which may be attached to a large water storage tank 831 at storage tank port 833 with the use of a spigot adapter 811 that attaches to port fitting 813. This adapter may be attached to a spout or spigot 803 which may dispense water from storage container 831. A side port 815 in the spigot adapter 811 may connect to a shutoff valve 817 to allow manual shutoff of water in line 823. This water feed line 823 may then connect to water filter system 801 in upper chamber 807 at an inlet port 891. This allows the user to connect the water filter system to large water storage containers 831 which may consist of any size and shape. Storage tank port 833 may dispense water through its standard spout 803 and still feed the water inlet line 823 by way of side port 815 in spigot adapter 811.

Figure 38:
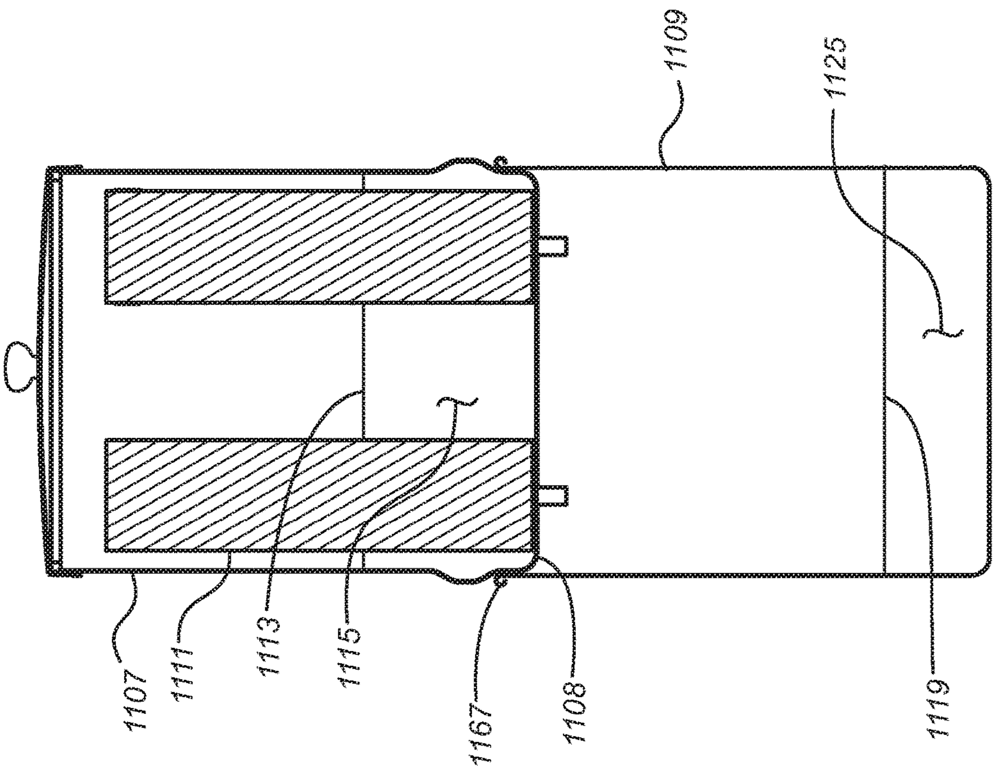
FIG. 38 is a side cross section view of the gravity fed water filter system of FIG. 37.
Figure 37:
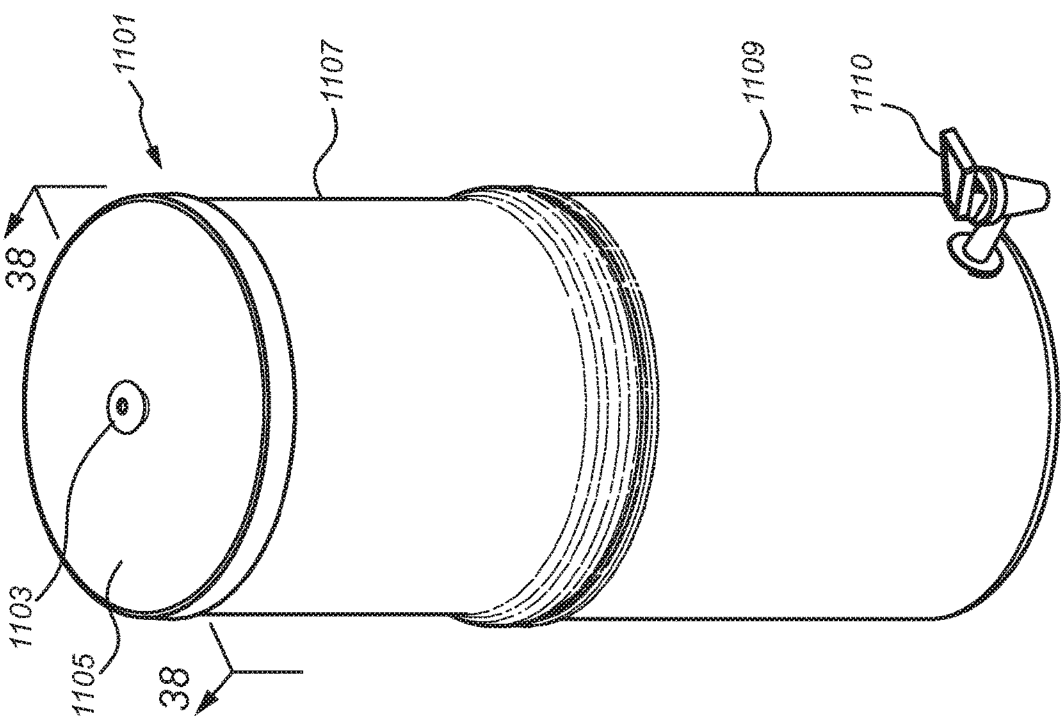
FIG. 37 is a perspective view of a traditional gravity fed water filter system.

FIGS. 37 and 38 depict a prior art conventional gravity flow water filter system 1101. The filter system 1101 may have a lid 1105, a knob 1103, an upper chamber 1107, and a lower chamber 1109. Inside the chamber are filters 1111 that turn unfiltered water 1115 contained in upper chamber 1107 into filtered water 1125 contained in lower chamber 1109 which became filtered by passing it through filters 1111.

Figure 39:
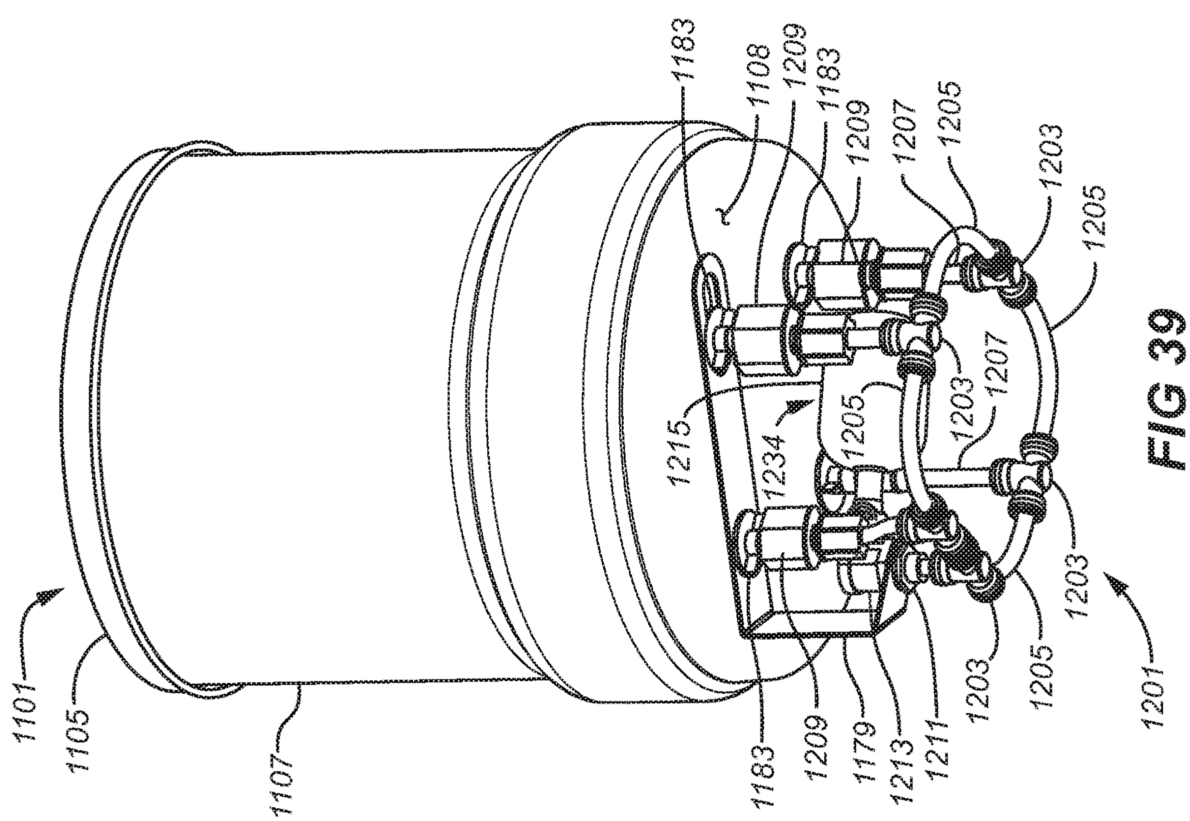
FIG. 39 is a perspective view of a lower chamber float valve control system of a gravity-fed water filter system.

FIG. 39 and onward disclose water filter systems which, in implementations, may include 7 elements: (1) an electrical component including a low power consuming UVC ultraviolet light with its on or off grid power source; (2) a controlled water inlet system that allows all new water passing from the upper chamber to the lower chamber through its filters to be exposed for an extended time, and in close proximity to the UVC sanitizing light, before being released into the lower chamber; (3) a relay system or programmed timer system that may control the UVC light, which may alternate between high wattage output and lower wattage or even no output mode, thus conserving the amount of power required to sanitize the water in the filter; (4) a method of protecting the user from exposure to the ultraviolet light by means of a proximity switch; (5) a means of sealing the lower chamber; (6) a compact design that allows the gravity filter to be recessed to the back of the counter, under an upper cabinet; and (7) a tote system using one or two buckets which may function both as a means to tote the filtration system and/or other items and then be used as part of the filtration system itself. The systems may include other elements, or may exclude some of these elements, as these are just examples.

FIG. 39 is a filter which controls the inflow of water into the lower chamber of the filter. FIG. 39 depicts a lower chamber flow control system 1201 connected to upper chamber 1107. This flow control system may consist of filter stem connectors 1209 that attach to vertical tubes 1207. These vertical tubes 1207 may connect to annular tubes 1205 by any means including tees 1203. The annular tubes 1205 may then be attached to a float valve 1234, including a float valve body 1213 which controls the inflow of water by means of a float valve bulb 1215. The float valve body 1213 may be held in place by a float valve bracket 1179 which is secured to upper chamber 1107 by means of valve stem nuts 1183.

Figure 48:
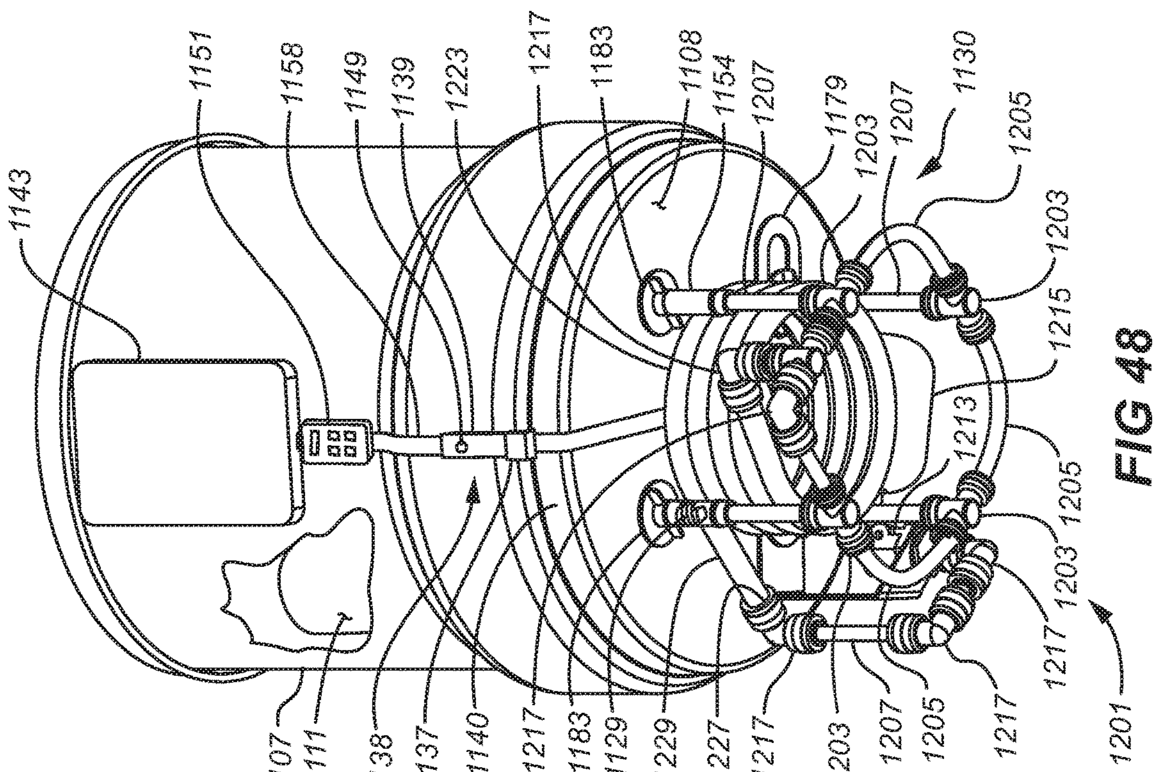
FIG. 48 is a perspective view of a gravity fed water filter system having a water level control system, ultraviolet light and quartz coiled tube.
Figure 47:
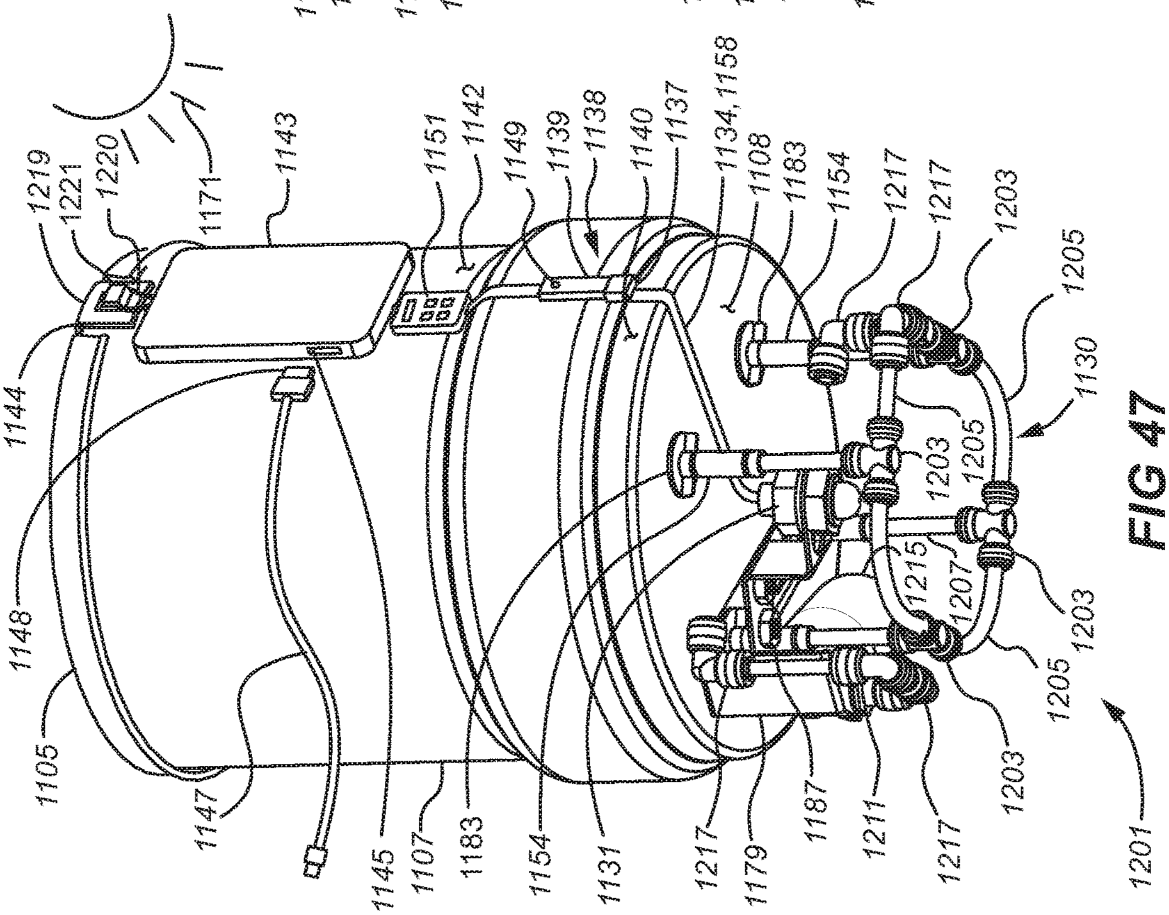
FIG. 47 is a perspective view of a gravity fed water filter system having a water level control system combined with an ultraviolet light system.
Figure 50:
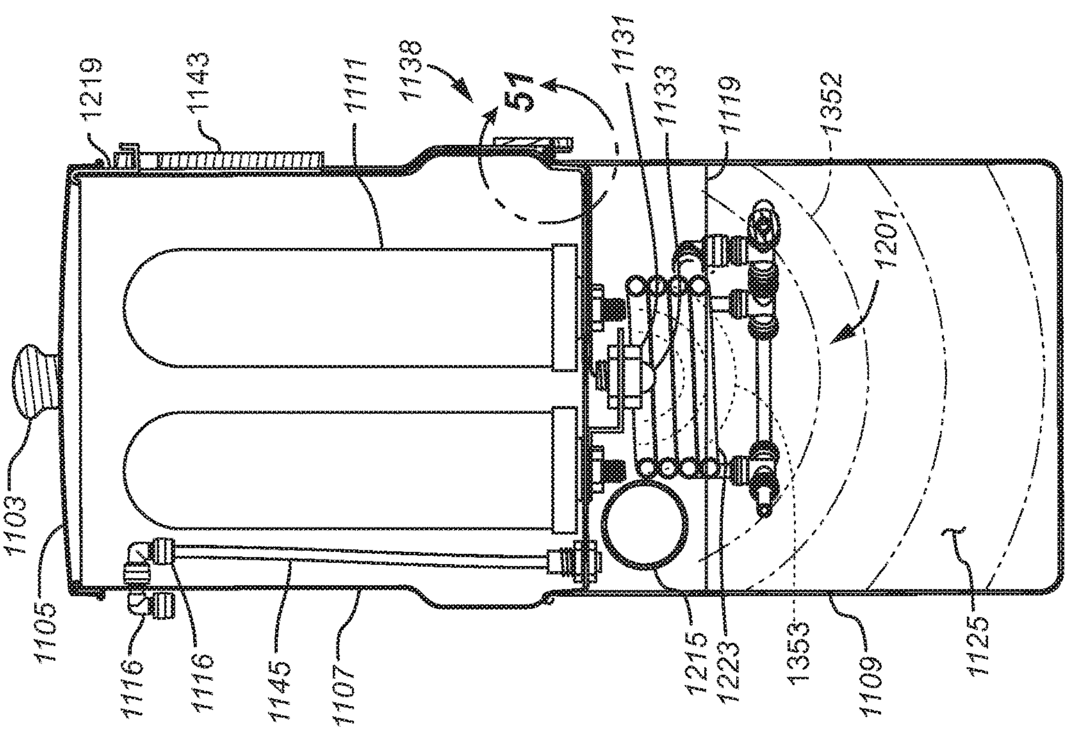
FIG. 50 is a cross-section view of the system of FIG. 49 with a lower chamber attached, representatively illustrating UVC light emanating from the LED through the coil and tank.

When a UVC system is not used, the float valve bulb 1215 may be oriented such that it sits in the center of the chamber as shown in FIG. 39. However when the UVC light system 1130 is installed, the float valve 1215 may need to be oriented such that it is not in the center but comes close to the side wall of lower chamber 1109 as seen in FIGS. 47, 48 and 50.

Figure 40:
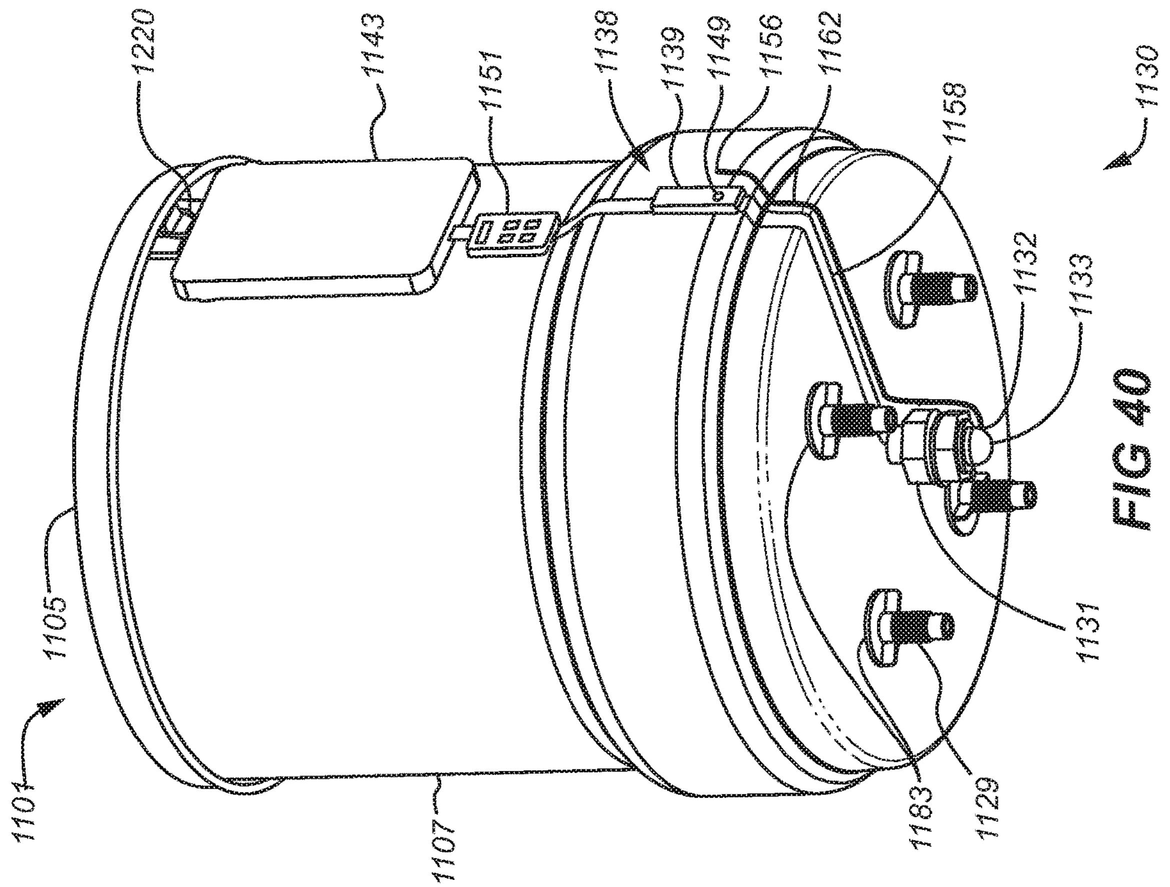
FIG. 40 is a perspective view of an ultraviolet light/solar power system attached to an upper chamber of the system of FIG. 39.

FIG. 40 shows the UVC light system 1130. A low voltage power source, which may be a solar power battery 1143, may be connected to a UVC power line 1158 that may have a control circuit 1151. A proximity switch 1139 may be inserted into the power line 1158, and may be used to shut off power to the light 1131 if the upper chamber 1107 is removed from the top of lower chamber 1109.

Figure 41:
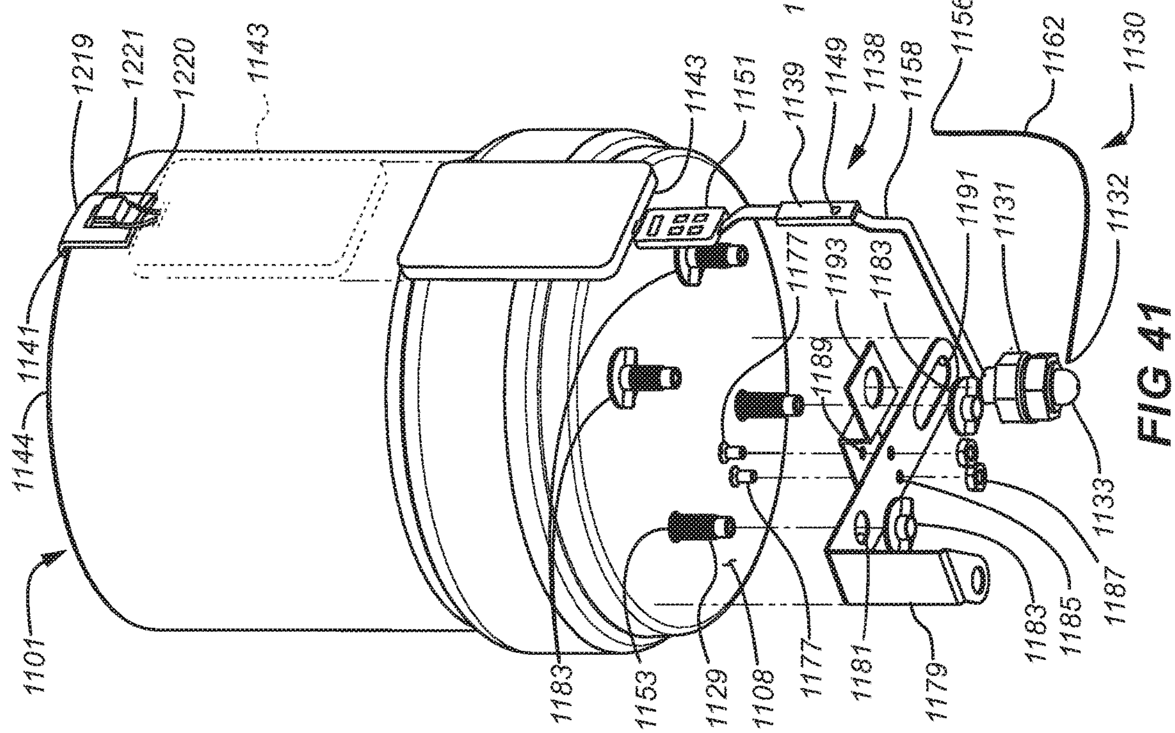
FIG. 41 is an exploded perspective view of the ultraviolet light/solar power system of FIG. 40.

FIG. 41 shows an exploded view of FIG. 40, noting how the power supply 1143 may be suspended on the lip of the upper chamber 1107 or lower chamber 1109 (lower chamber 1109 not shown in this and subsequent figures). It further shows how UVC light bracket 1193 may be attached to using fasteners such as 1177 and 1187 to float bracket 1179 through holes 1185. Float bracket 1179 may be attached to filter stems 1129 through upper chamber hole 1153 and bracket hole 1181 with wing nuts 1183 securing the bracket 1179 to the underside of upper chamber 1107. Brackets 1193 and 1179 may also be integrated into one bracket, or be configured in various ways. UVC bracket 1193 may be connected and act as a support to UVC light 1131.

Figure 42:
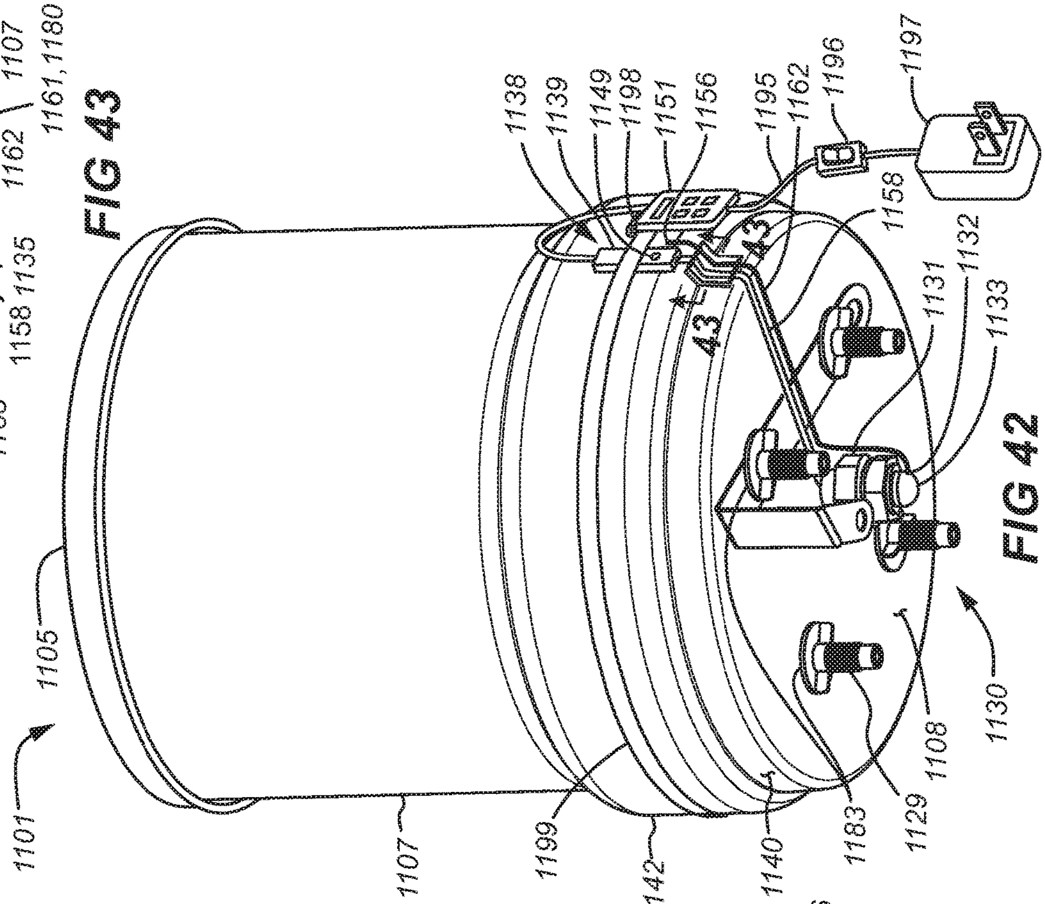
FIG. 42 is a perspective view of an ultraviolet light electrical system powered by a residential power supply.

FIGS. 41 and 42 show the power controlling circuit 1151 which may allow the user to control turning on and off the UVC light 1131 either manually or by the use of a timer. It may also be programmed with relays, switches and controls to accomplish a variety of functions, such as to control the intensity of the light 1131, preset the time and/or date of the light schedule, and so forth. This power controlling circuit 1151 may also be used to control the power output that controls the light emission cycle 1351 shown and described later in FIGS. 66 and 67. The control circuit 1151 may be situated anywhere in the UVC power line 1158.

FIG. 42 also shows how wire 1158 runs along the bottom surface 1108 of upper chamber 1107 and along the neck surface 1140 of upper chamber 1107 and may connect to proximity switch 1139, which in turn may connect to the control circuit panel 1151. The control panel 1151 and proximity switch 1139 may be held in place by a clamping band 1199. An on/off switch 1196 may be a part of the control panel 1151 or may be connected electrically to a power wall adapter 1197.

A proximity switch assembly 1138 may be used to prevent the user from being exposed to harmful UVC light. To alert the user that the UVC light 1131 is on, an indicator light 1149 as shown in FIG. 42 may be used, which may be found on proximity switch 1139 or anywhere along power line 1158.

Also shown in FIG. 42, another means of detecting whether the UVC light 1131 is on or off may be to use a fiber optic cable 1162 which may have a receiving end 1132 pointed at light 1131. The cable could be independent of the power line 1158 as shown in FIG. 42, or may alternatively be bundled with the power line 1158 as shown in FIG. 41. The other end of the cable simply exits the lower chamber 1109 and terminates at end 1156 as shown in FIG. 42. Thus, when light 1131 is shining, the receiving end 1132 of fiber optic cable 1162 picks up some of the light emitting from UVC light 1131, travels through fiber-optic cable 1162, and emits a small amount of that UVC light out of the emitting end 1156 of fiber-optic cable 1162 to indicate that light 1131 is on. Because the fiber optic cable itself carries light to provide the indication, it may correctly be called an indicator light.

Figure 43:
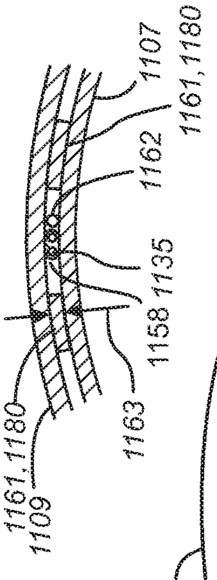
FIG. 43 is a detail of FIG. 42.

FIG. 43 is a section view taken from FIG. 42 which shows that UVC power wire 1158 may be bundled to include a fiber optic cable 1162, which may be kept safe from being pinched by the upper chamber 1107 and lower chamber 1109 by a spacer portion 1180 of spacer clip 1161, due to the spacer's thickness 1163 which may meet or exceed the thickness of the wire 1158 and cable 1162.

Figure 44:
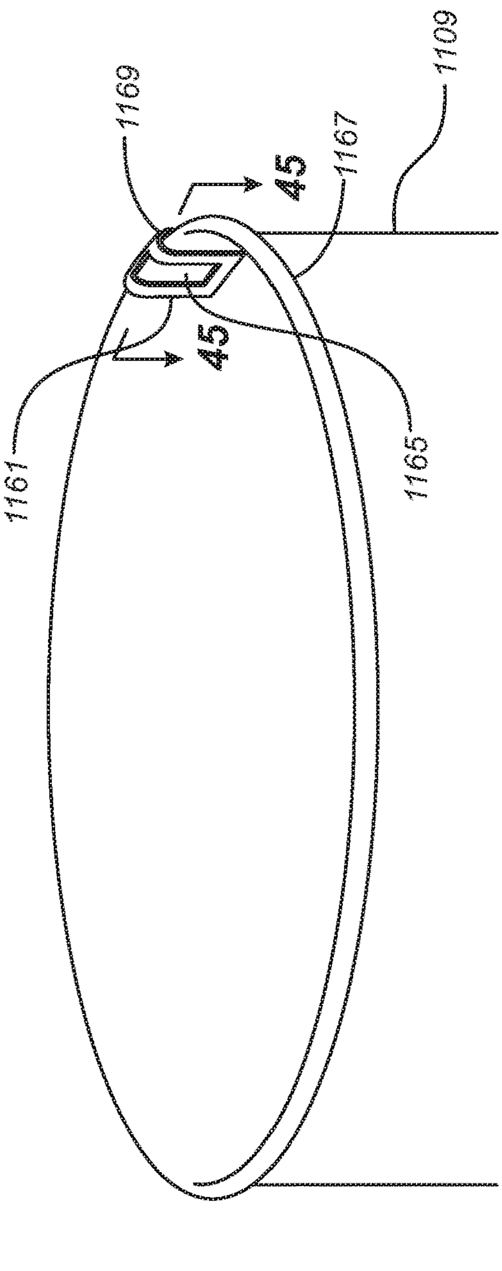
FIG. 44 is a front perspective inside view of a lower chamber having a proximity switch clip attached thereto.
Figure 45:
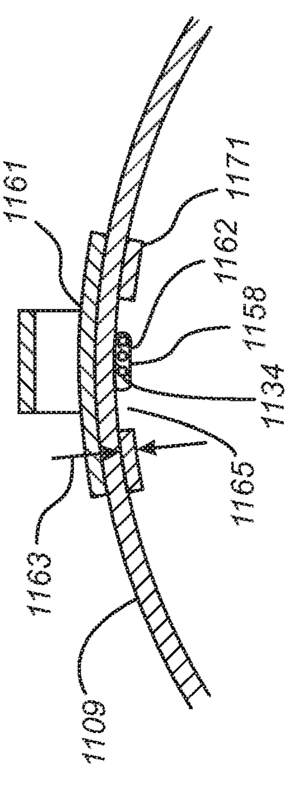
FIG. 45 is a cross-section view of the lower chamber and proximity switch clip of FIG. 44.
Figure 46:
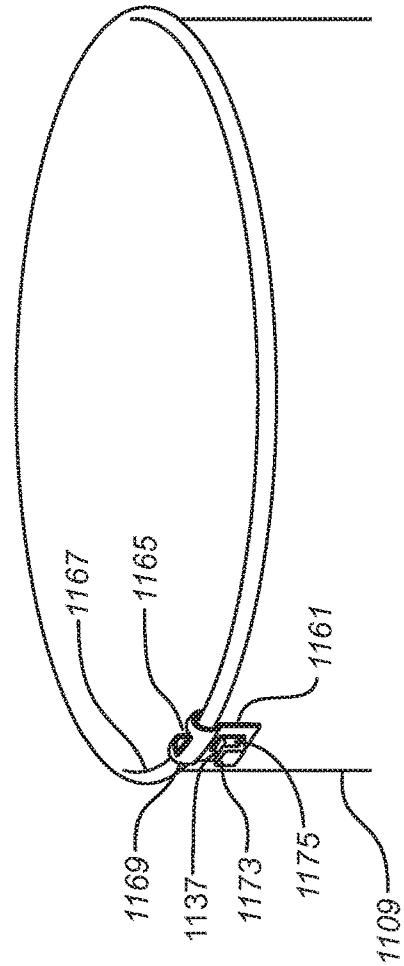
FIG. 46 is a front perspective outside view of the lower chamber and proximity switch clip of FIG. 44.

FIGS. 44, 45 and 46 are views of spacer clip 1161 which may act as a spacer to allow UVC power wire 1158 and fiber optic cable 1162 to sit in gap 1165 between upper chamber 1107 and lower chamber 1109. This spacer clip 1161 has a thickness 1163 which could prevent pressure between chambers 1107 and 1109 from pinching ribbon wire 1158 and fiber optic cable 1162.

FIG. 47 depicts UVC light system 1130 attached to upper chamber 1107 as an alternate embodiment in conjunction with the flow control system 1201. The UVC light 1131 may be connected to a set of wire leads 1134 which may or may not be in the form of a ribbon wire 1158. That wire 1158 may exit from the UVC light assembly 1131 and may run across the bottom surface 1108 of upper chamber 1107, follow the contour of the neck 1140 of upper chamber 1107 and continue following the contour of the outer surface 1142 of upper chamber 1107 until it connects to the control circuit 1151. Here it may route to an on/off switch 1196 and out to a power adapter or source of power of appropriate voltage 1197 as shown in FIG. 42, or it may route to a portable power source which may be a solar powered battery 1143 as shown in FIG. 47. Battery pack 1143 may be recharged by sunlight 1171 or by some other external power source through power wire 1147, which could be connected by connector 1148. Note that in FIG. 47 the quartz coil is removed in order to show the UVC light 1131.

FIG. 47 also depicts how the solar battery hanging bracket 1221 may be hung by a hook feature 1219 off of lip 1144 of upper chamber 1107 and hook onto strap 1220, or by some other means which may be in the form of a loop in the solar device 1143, screws, rivets, or other fasteners. Lid 1105 may cover the solar battery hanging bracket 1221. Note that FIG. 47 shows a breakout in the lid 1105, in order to show the bracket 1221.

FIG. 48 shows how the stems 1129 of filters 1111 may connect to vertical connector tubes 1207 by means of flexible synthetic sealable tube adapters 1154, which connect to tees 1203, annular tubes 1205 and elbows 1217. An alternate means of connecting the filter stem 1129 to the vertical connector tube 1207 may be accomplished by means of threaded connectors 1209, as was shown in FIG. 39. An elbow 1217 may connect to transparent quartz coil 1223. In other implementations the coil could be formed of another material. The coil acts as a conduit to bring the water nearby the ultraviolet light to be sanitized thereby. The water coming from filters 1111 may feed upward through the coil 1223, through elbows 1217, vertical connector tubes 1207 and through float valve body 1213, which controls water released into lower chamber 1109. (Lower chamber 1109 is not shown in FIG. 48).

Figure 49:
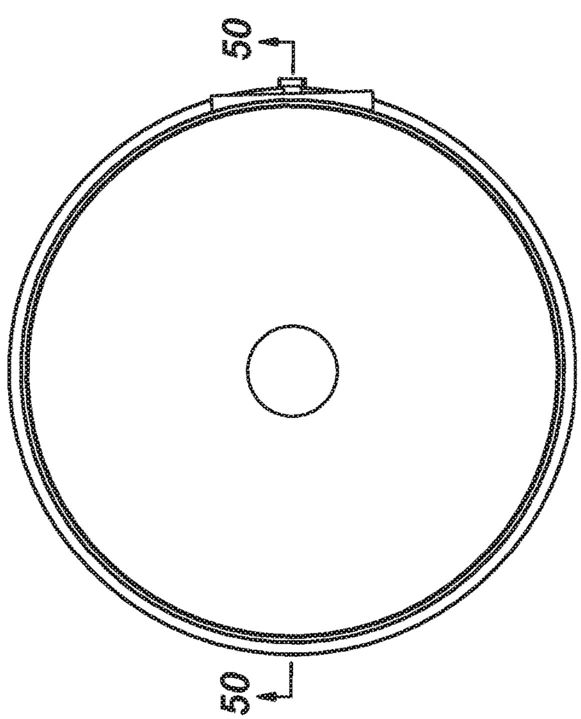
FIG. 49 is a top view of an upper chamber of the system of FIG. 48.
Figure 51:
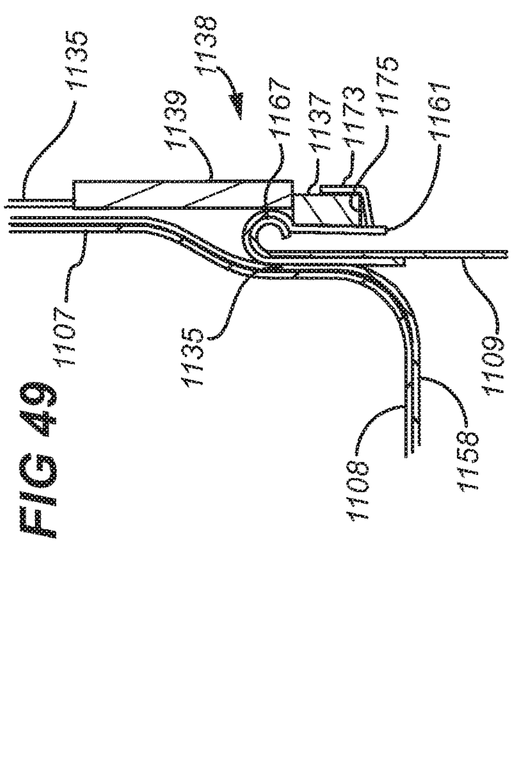
FIG. 51 is a detail view of FIG. 50 showing detail of an LED wire connected to the proximity switch.

FIGS. 49, 50 and detail FIG. 51 show how UVC light 1131 is stationed so that light waves 1352 and 1353, emanating from UVC light 1131, shine through the crystal quartz coil 1223, exposing the incoming water in the coil to the sanitizing UVC light 1131. The light waves 1352 and 1353 then pass through into the rest of lower chamber 1109, thus cleansing both the incoming water in the coil 1223 and the filtered water 1125 in lower chamber 1109. The UVC light 1131 may or may not have a quartz dome 1133 through which it emits the light 1352 into lower chamber 1109.

The nature of a coil is to revolve several times around a central point. The quartz coil 1223, depicted in FIG. 50, has several coils, therefore it provides several times more linear inches of exposure to light 1352 and 1353 emitted from UVC LED 1131, than a straight section of tube could provide, thus multiplying the effective time of exposure of incoming water to UVC light 1131. Filtered water 1125 may be introduced at the bottom of the coil 1223, and then gravity forces the water to travel no faster than the rate at which the water is emitted through the filters 1111, which forces the water 1125 to be exposed to the UVC light 1131 for an extended time. Coil 1223 also closely surrounds the quartz dome 1133 and may or may not be above the water level 1119, which may therefore increase the effectiveness of the light 1131, since the effective strength of the emittance of light decreases by the square of the distance from the source. The lower emittance light 1353, passing through coil 1223, may be sufficient to sanitize the water traveling through quartz coil 1223. The higher power emittance light 1352 is stronger, and would be sufficient to eliminate any pathogens in lower chamber 1109 that may have either self-repaired or were introduced into the tank by other means than through the flow control system 1201.

FIGS. 50 and 51 show how the UVC light 1131 may receive power via a wire 1158, which may be a ribbon wire, and may connect to the electrical portion 1139 of proximity switch assembly 1138. The proximity switch assembly 1138 may have a non-electrical part 1137, which may be attached to lower chamber 1109 by being glued to the chamber 1109, or by being fit into a sensor retention cavity 1175 of spacer clip 1161, which may clip onto lip 1167 of lower chamber 1109 as shown in FIGS. 50, 51, 53, 54, 55, 57, 58 and 59, or by some other means.

Figure 53:
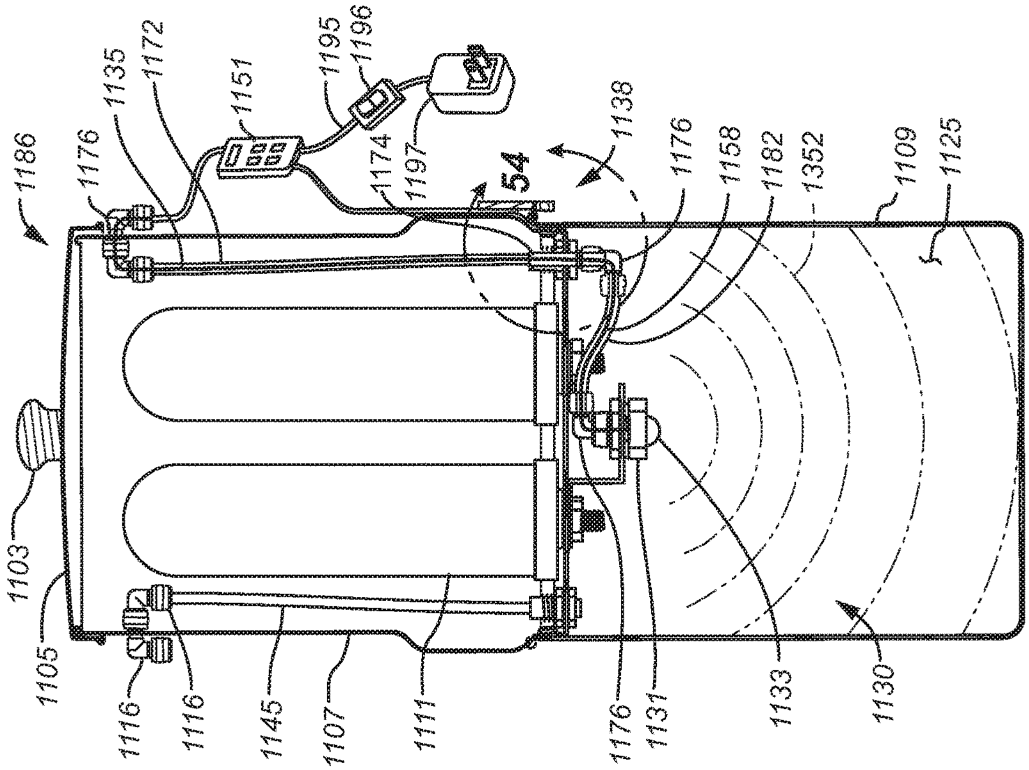
FIG. 53 is a cross-section view of the system of FIG. 52 showing the UVC light wire conduit system exiting through the upper chamber.
Figure 52:
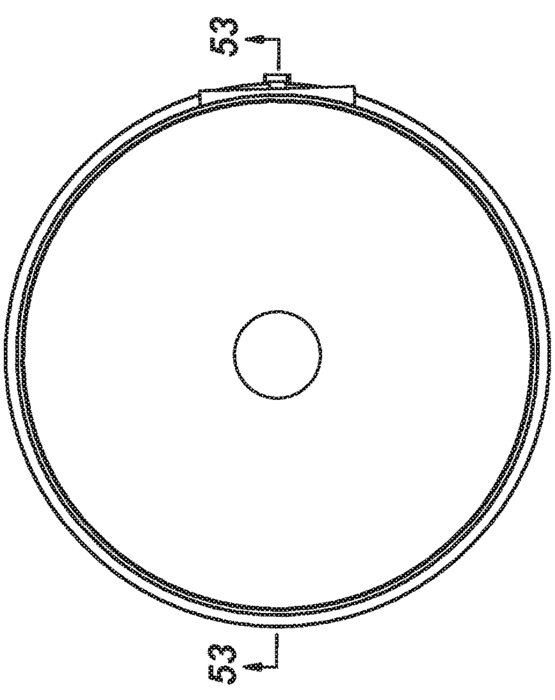
FIG. 52 is a top view of a gravity fed water filter system with a UVC light and wire conduit system and annular seal.
Figure 55:
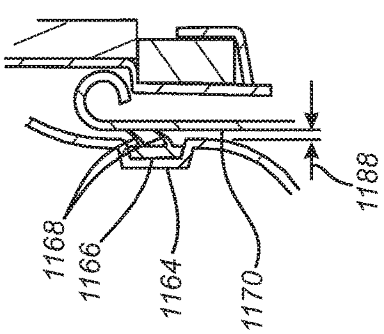
FIG. 55 is an enlarged detail view of FIG. 54 showing detail of the annular seal.
Figure 54:
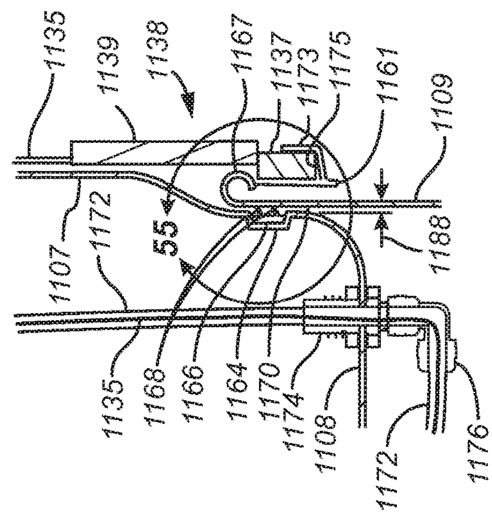
FIG. 54 is a detail view of FIG. 53 showing an annular seal with LED wire connected to the proximity switch.
Figure 57:
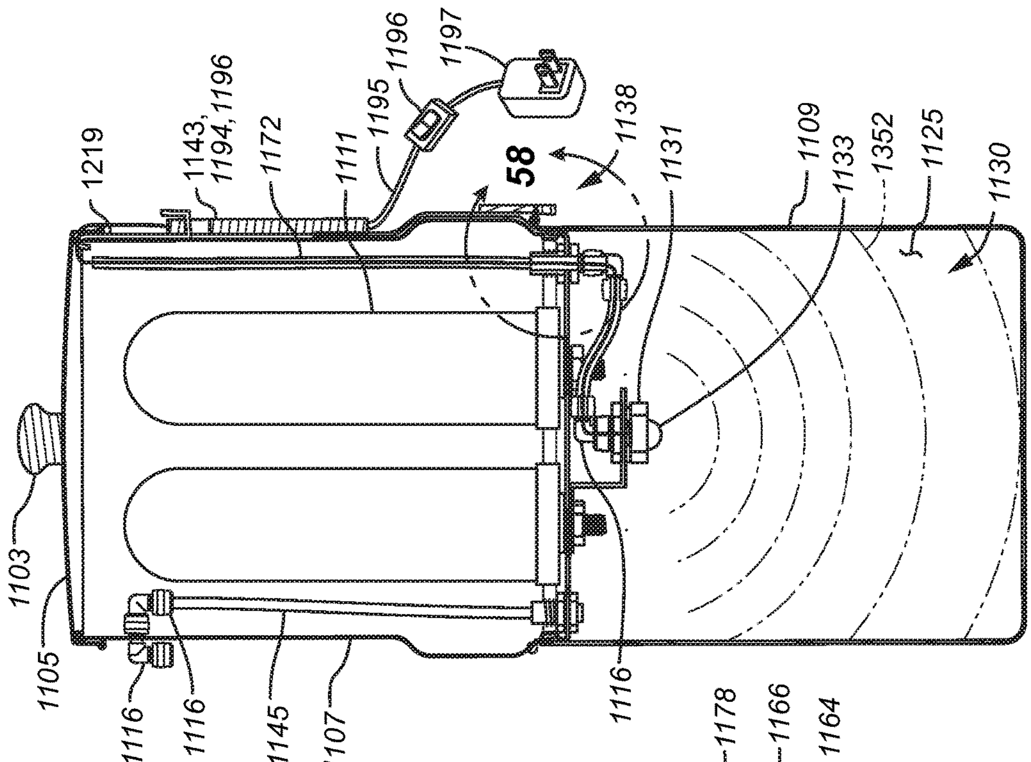
FIG. 57 is a front cross-section view of the filter system of FIG. 56, showing the UVC light conduit and reversed annular seal.

In the embodiment of FIGS. 53, 54 and 55, a seal 1166 may be situated in a grooved annular track 1164. One or more thin tapered annular flaps 1168 may circumferentially engage the inside surface 1170 of lower chamber 1109, creating a seal between the interface at the bottom of upper chamber 1107 and the upper inside of lower chamber 1109, when the upper chamber 1107 is set in place in the top of the lower chamber 1109, to prevent the lower chamber 1109 from leaking water when filled to capacity. This flap portion 1168 of seal 1166 would allow for a greater amount of variance in gap tolerance 1188 than would a typical O-ring or flat gasket.

FIGS. 53, 54 and 55 show an embodiment in which the power source may be from a power adapter plug 1197. The adapter 1197 may connect to control circuit 1151 and/or an on-off switch 1196 by wires 1195. The wires 1195 may then be routed through a watertight conduit 1186 beginning with elbows 1176 and down through wire conduit tube 1172 through a wire conduit bulkhead 1174 another elbow 1176 and into UVC light fitting 1131. The conduit line 1186 would keep the wires 1158 dry and free of exposure to water in chambers 1107 and 1109.

Figure 59:
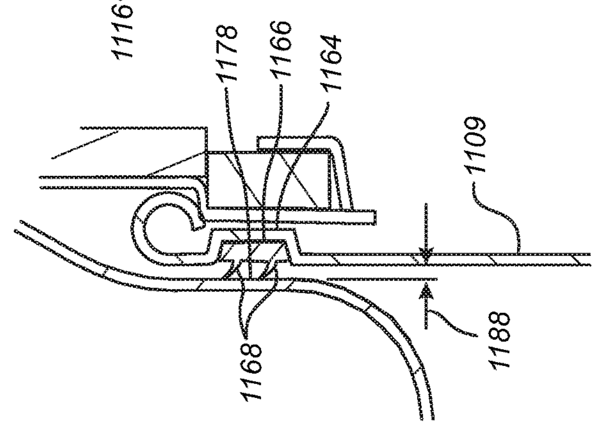
FIG. 59 is an enlarged detail view of FIG. 58 showing the reversed annular seal.
Figure 56:
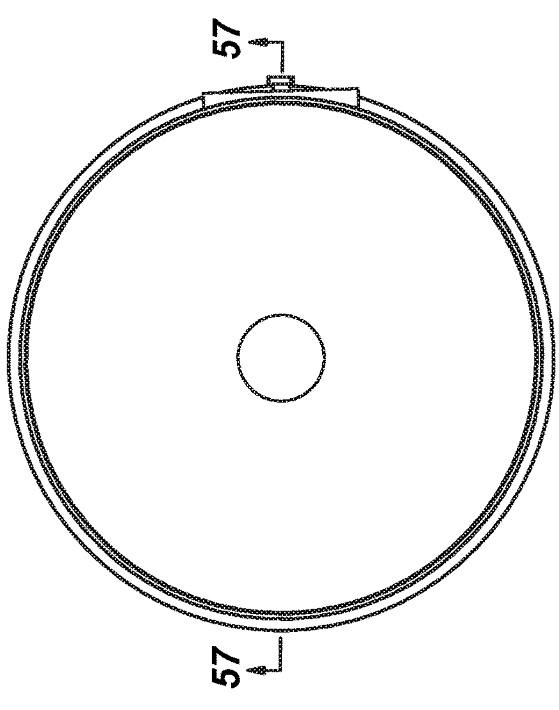
FIG. 56 is a top view of a gravity fed water filter system with a UVC light conduit wire and reversed annular seal.
Figure 58:
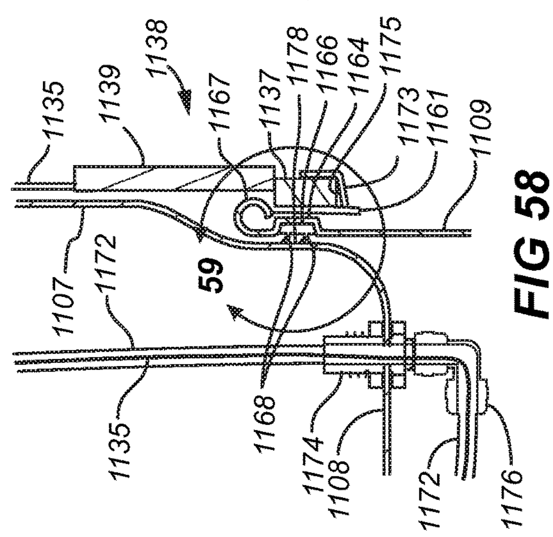
FIG. 58 is a detail view of FIG. 57 showing the reversed annular seal with LED wire connected to a proximity switch.

FIGS. 56, 57, 58 and 59 are similar to 52, 53, 54 and 55, except that the seal groove 1164 is reversed by being placed in the top of lower chamber 1109, and thus the seal 1166 is likewise reversed so that flaps 1168 coming up off of the seal 1166 brush the outer surface 1178 of upper chamber 1107 creating the seal as seen in detail FIGS. 58 and 59. This method of sealing takes advantage of the natural taper found in the lower part of the upper chamber 1107 that helps to mitigate the difference in gap tolerance 1188.

Figure 60:
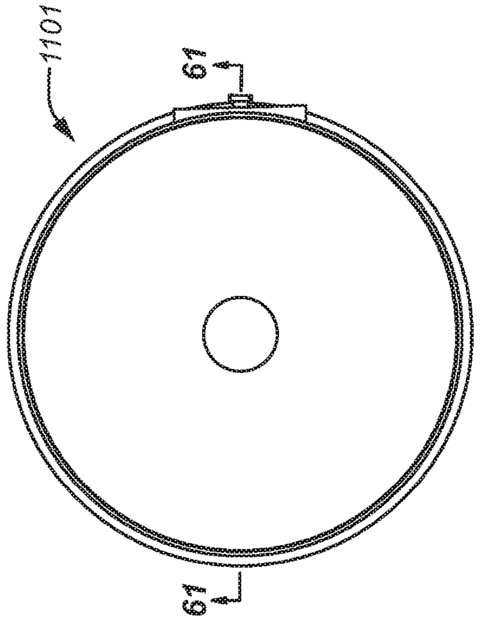
FIG. 60 is a top view of a gravity fed water filter system with UVC light and wire conduit system and annular seal.

FIG. 60 depicts UVC light 1131 connected to sidewall mount UVC bracket 1228 which is secured to the side wall of lower chamber 1109 by wire conduit bulkhead fitting 1174 which may also be a liquid tight cord grip 1150. The UVC light 1131 may be electrically connected by wire cord 1172. Wire cord 1172 may then exit through side wall of lower chamber 1109 through conduit bulkhead fitting 1174 and may or may not run through elbow fitting 1116. It may be fed into a circuit control device 1151 and then out to a wall voltage adapter 1197.

Figure 61:
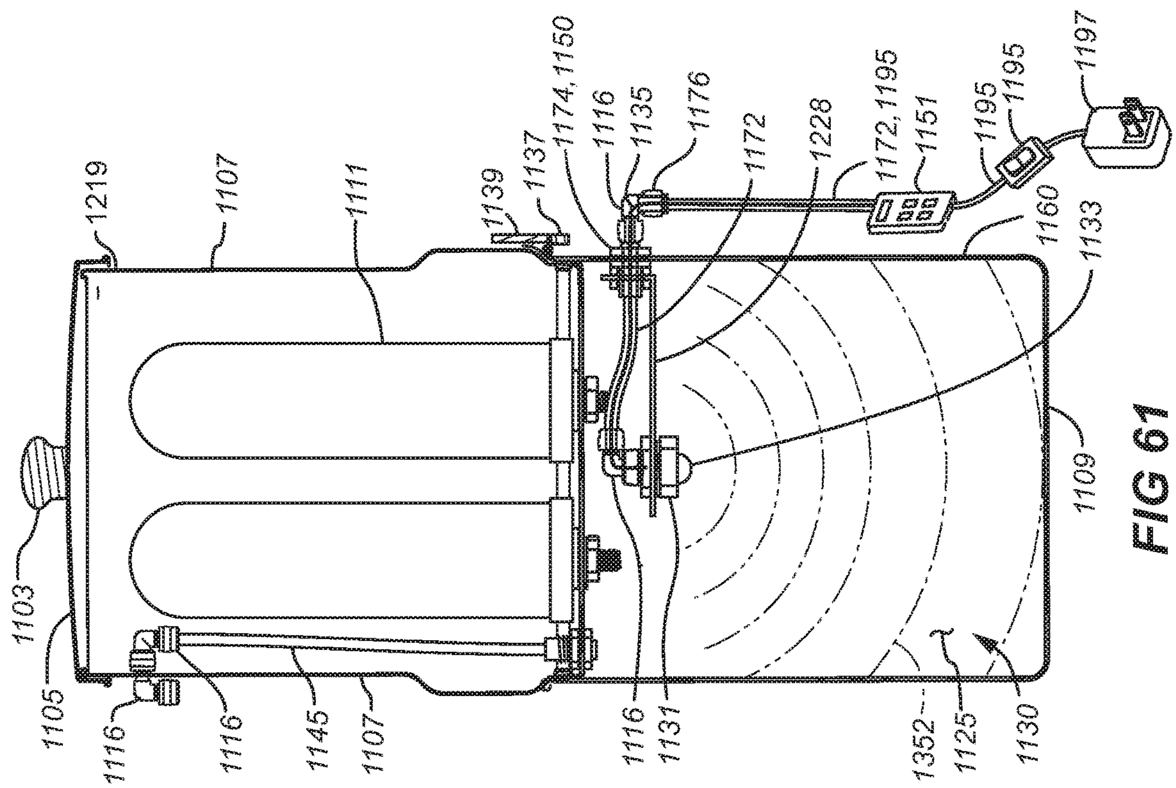
FIG. 61 is a cross-section view of filter system of FIG. 60 with the UVC light and wire conduit system exiting through the lower chamber.

FIG. 61 shows an embodiment which utilizes a UVC electrical cord 1190, which is inserted on one end to an elbow fitting 1116 and exits filter system 1101 through side wall of lower chamber 1109 through a bulkhead 1174 or liquid tight cord grip 1150. Cord 1190 then may pass through control panel 1151 and then to electrical wall adapter 1197.

Figure 62:
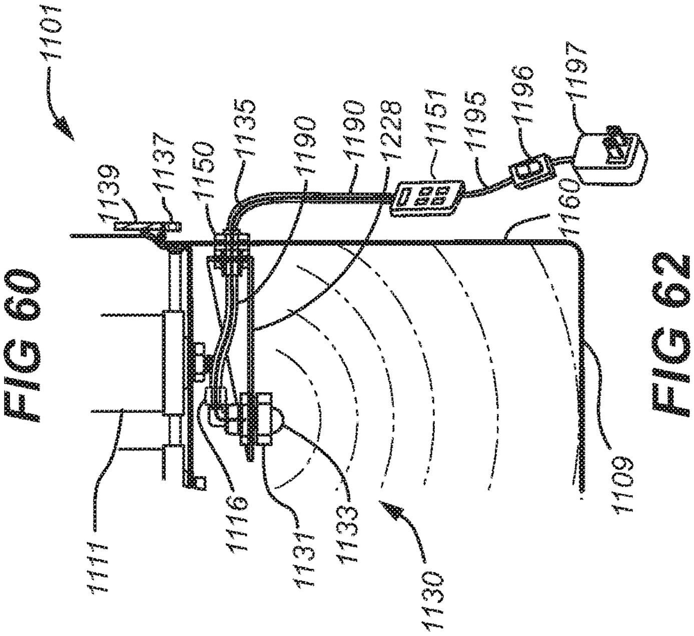
FIG. 62 is a cross-section view of an alternative of the filter system of FIG. 60 with the LED wire as a cable exiting the lower chamber through a cord grip.

Also in FIG. 62, inside the lower chamber 1109 the cord grip 1150 attaches to wall mount UVC light bracket 1228. UVC bracket 1228 attaches on the other end and supports UVC light 1131.

Figure 63:
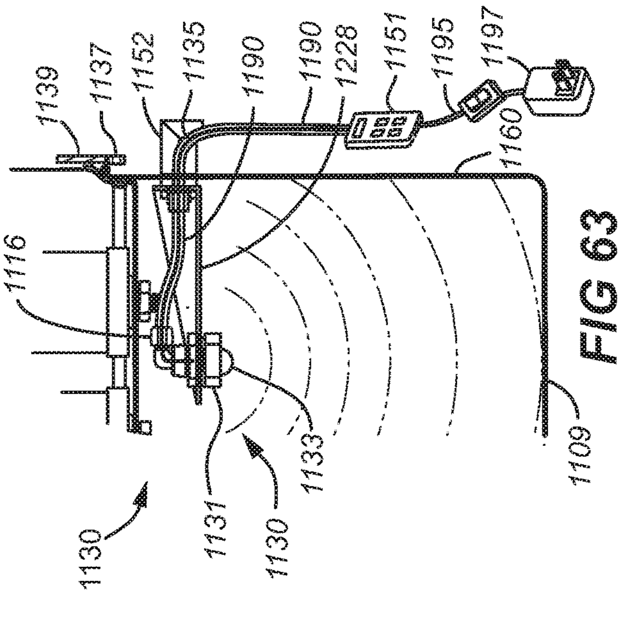
FIG. 63 is a cross-section view of an alternative of the filter system of FIG. 77 with the LED cable exiting the lower chamber through a 90 degree cord grip.

FIG. 63 depicts a scenario similar to FIG. 62 except the UVC light cord 1190 may exit through side wall of lower chamber 1109 through an elbow shaped liquid tight cord bulkhead fitting 1152.

Figure 64:
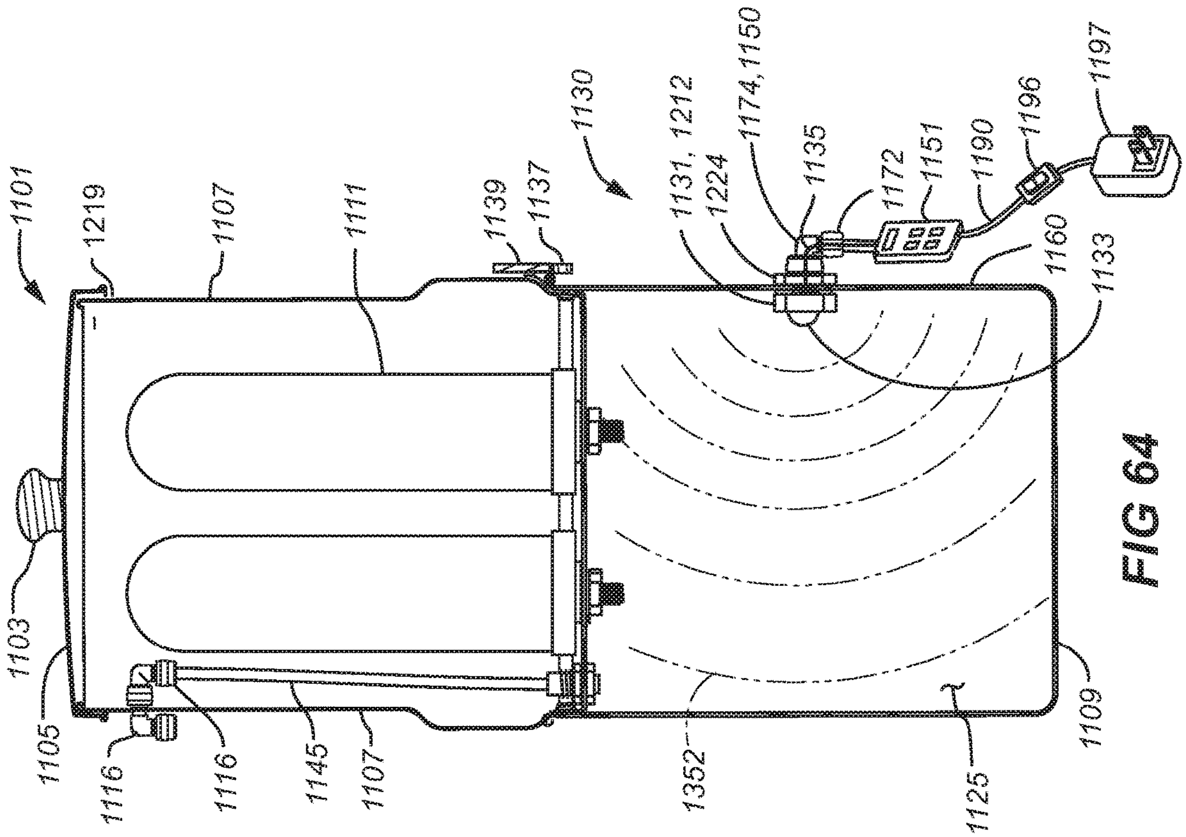
FIG. 64 is a cross-section view of an alternative of the filter system of FIG. 77 with the LED light mounted directly to a side wall of the lower chamber.

FIG. 64 depicts LED light 1131 mounted directly through a hole in sidewall 1160 of lower chamber 1109 and secured with UVC LED nut 1224. Light cord 1190 exits the UVC LED fixture 1212 and connects to circuit panel 1151 which may have an on/off switch 1196 incorporated into the circuit panel 1151 in any of these embodiments or may exist separately, and built into cord 1190 as shown in most of the included embodiments.

Alternatively, high intensity emissions 1352 may be set for short time intervals with hours to days in between, while low intensity interval 1353 may be set to emit very low to zero emissions. The purpose of this type of cycle would be for simply sanitizing the tank on a regular basis to reduce bacteria buildup in the lower chamber 1109, but not as a continual means of incapacitating bacteria or pathogens as they enter the lower chamber. The term "incapacitating" as used in this paragraph is meant to convey the idea of affecting the bacteria or pathogens to reduce or prevent reproduction.

Figure 66:
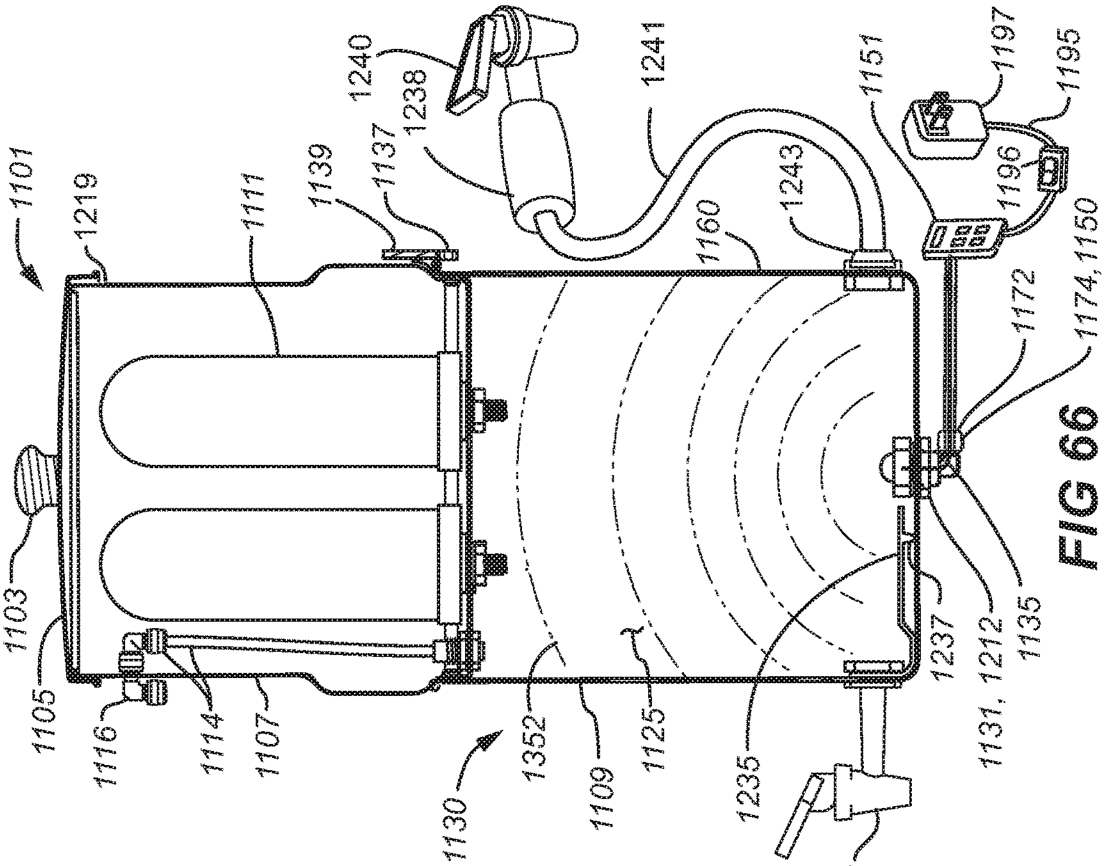
FIG. 66 is a cross-section view showing a filter system with an LED light mounted at a bottom of the lower chamber, a silver antimicrobial piece and alternate hose wand attachment.
Figure 65:
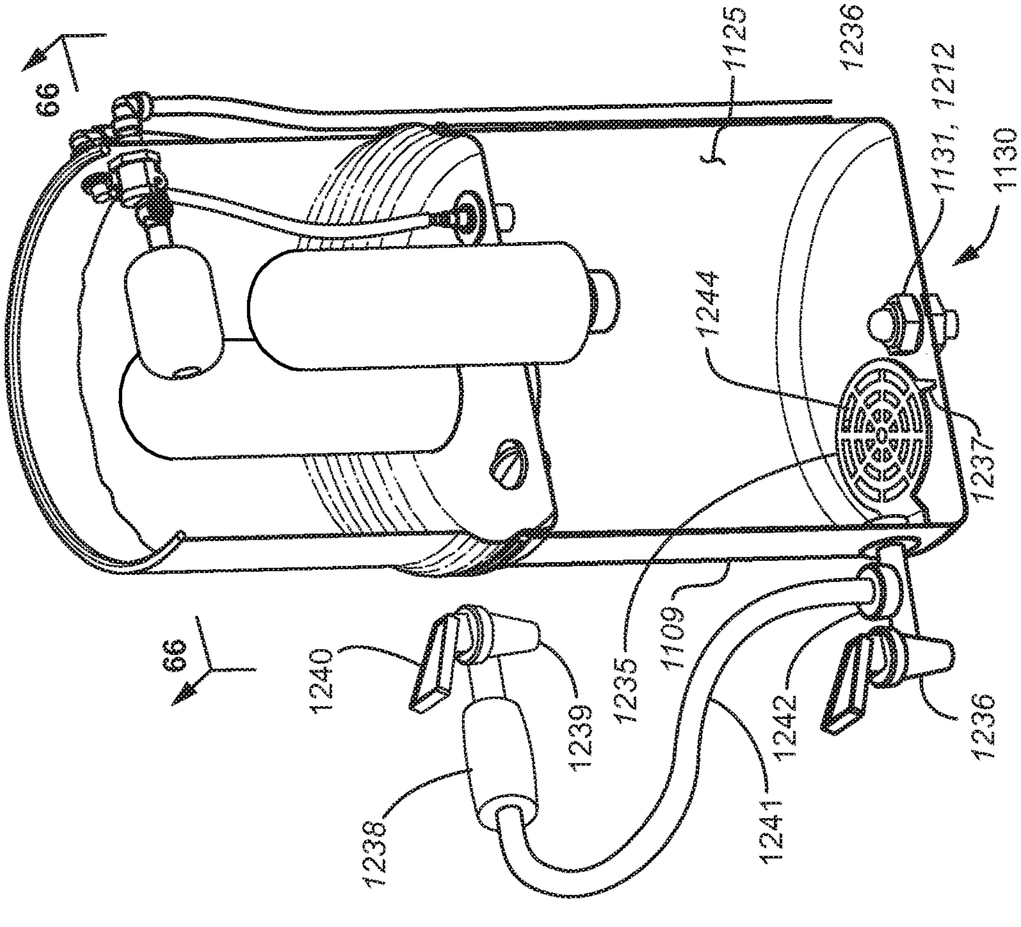
FIG. 65 is a cross-section perspective view showing a filter system with an LED light mounted at a bottom of the lower chamber, with a silver antimicrobial piece and an alternate hose wand attachment.

FIGS. 65 and 66 also show two different means of incorporating an alternate spigot wand 1238 that allows for delivering of filtered water 1125 to places remote to the main spigot 1236. This spigot wand 1238 would have a spigot trigger 1240 that can be activated by the person holding the wand anywhere that hose 1241 would allow the wand 1238 to reach. In implementations the wand is an inflexible or rigid element coupling the hose with the spigot trigger. The wand may be a convenient element for a user to grip while moving the hose or using the spigot trigger, in other words it may function as a handle. Filtered water 1125 may be dispensed through hose 1241 from lower chamber 1109 by various means including being connected at side fitting 1242 of spigot 1236 shown in FIG. 65 or may be connected to chamber 1109 by a wand hose bulkhead fitting 1243 through a hole in sidewall 1160 of lower chamber 1109 as shown in FIG. 66.

FIGS. 65 and 66 also depict the filter system 1101 wherein an annular silver grate 1235 resides in the lower chamber and may, but is not required to be tethered to a stationary object in chamber 1109 such as spigot 1236 or some other fixture. The annular silver grate 1235 may be situated so as to facilitate the greatest exposure of the water flowing in the tank in order to kill any bacteria or pathogens that might make it into lower chamber 1109. Holes 1244 in silver grate 1235 serve two purposes, first to maximize the ratio of the size of the silver grate 1235 to the surface area of the silver required to cover it, in order to decrease the cost of silver plating of the grate 1235, and to reduce the area under the grate that might act to inadvertently shield bacteria from the ambient UVC light waves 1352 bouncing around in the chamber.

Figure 67:
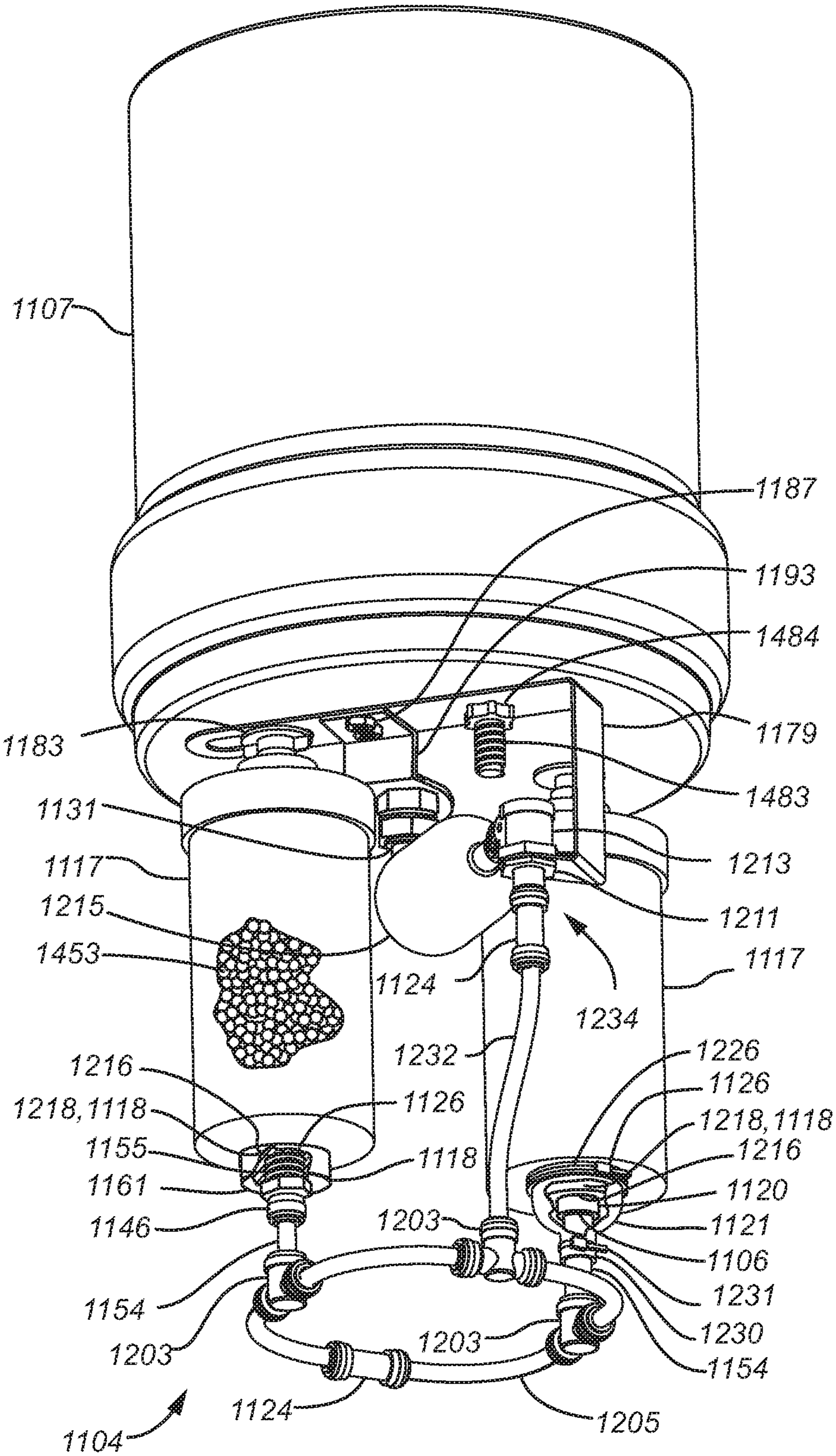
FIG. 67 is a lower front perspective view of float control system with lower chamber filters.

Filters 1117 shown in FIG. 67 are typically used to filter fluoride, and are commonly attached to the stems 1129 (shown in FIG. 48) of upper chamber filters 1111 under wing nuts 1183. FIG. 67 shows how float control system 1104 may then connect to lower chamber filters 1117 by the use of boots 1121. The boots 1121 perform two functions. First, they seal the junction between vertical tubes 1154 and bosses 1118 of filters 1117 by completely encasing the junction between bosses 1118 and vertical tubes 1154. The boots 1121 also serve the purpose of preventing the vertical tubes 1154 from detaching from the bosses 1118. The upper end 1226 of boots 1121 are slid over bosses 1118 and secured by clamping bands. The lower portion 1230 of boots 1121 are slid onto vertical tubes 1154 and secured by clamping bands 1231. The vertical tubes extend up into the holes 1216 in the bottom of bosses 1118. The gap between the diameter of tubes 1154 and the larger holes 1216 may be filled by means of a flexible annular spacer tube 1120 which is inserted into the hole 1216 in boss 1118. Tubes 1154 are inserted into cavities 1106 of spacer tubes 1120. The boot seal 1121 may be attached to the outer annular surface 1218 of boss 1118 with annular clamping bands 1126 to secure boots 1121 to boss 1118. Tubes 1154 which come out of annular spacer 1120 extend through smaller ends 1230 of boots 1121 and may be secured with clamping bands 1231 and then inserted at the other end into tees 1203. The tees 1203 are connected to tube ring 1205. Another tee 1203 may connect tube ring 1205 to vertical tube 1232 which is inserted into coupling 1124. Coupling 1124 then connects to valve body 1213 of float valve 1234 that is attached to float valve bracket 1179 with valve hex nut 1211 which acts to limit the amount of water flowing into lower chamber 1109.

Figure 69:
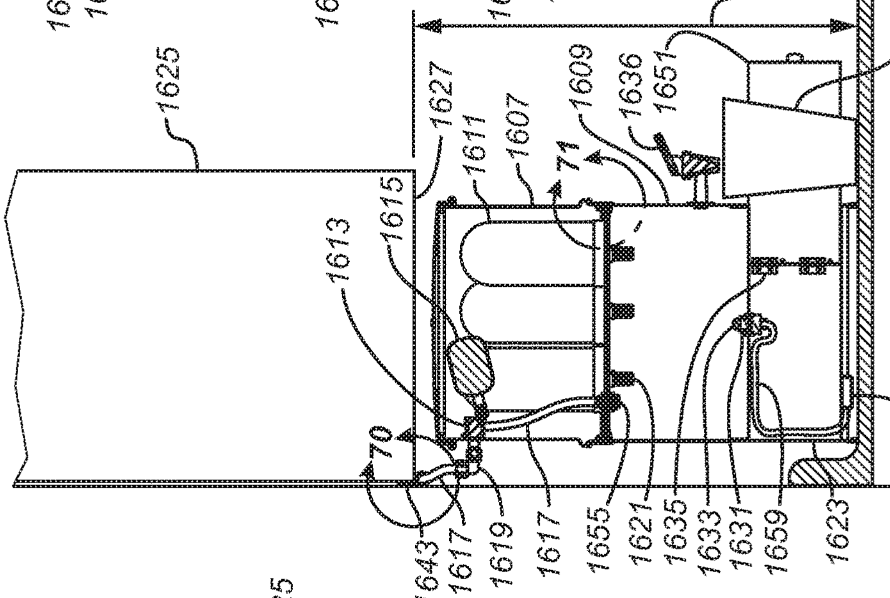
FIG. 69 is a side view of filter system in context with kitchen counter and cabinet.
Figure 68:
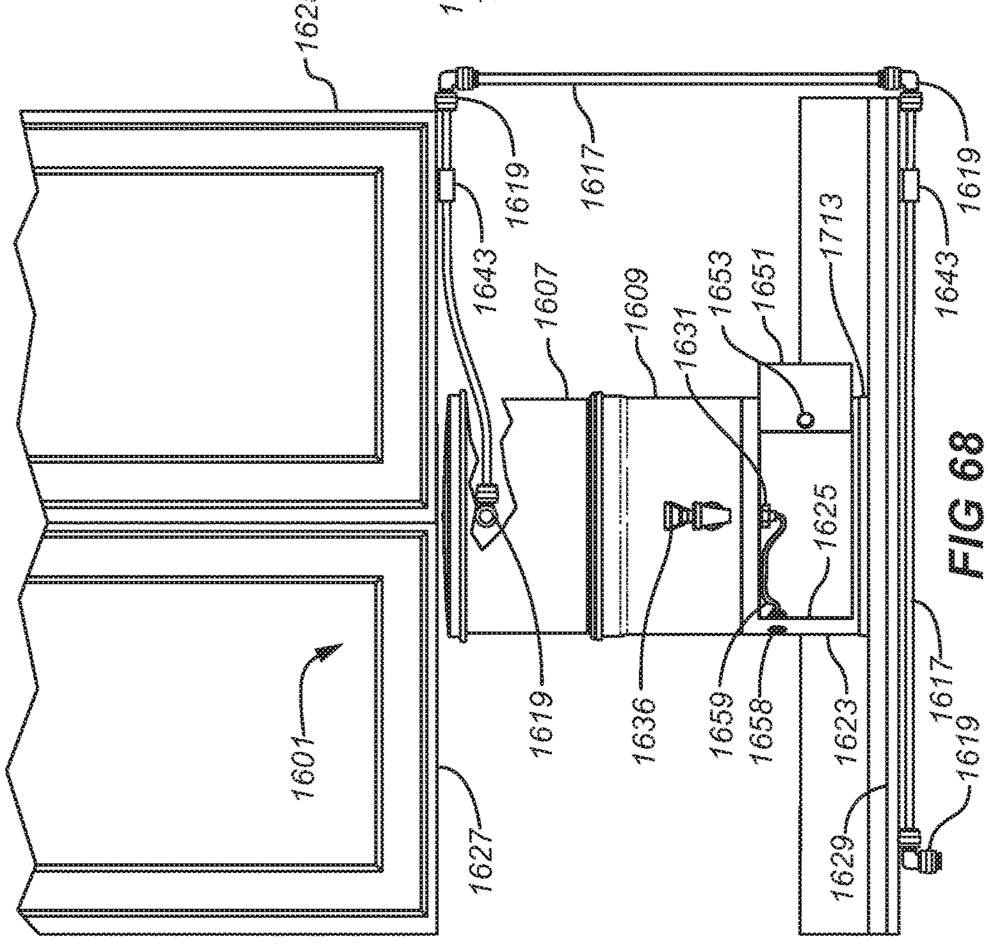
FIG. 68 is a front view of filter system in context with kitchen counter and cabinet.

FIGS. 68 and 69 depict another embodiment. A low profile compact filter system 1601 is uniquely designed to fit in a space 1683 between the lower surface 1627 of upper cabinet 1625 and the countertop 1629. The filter contains a built in stand 1623 that allows a glass 1603 to fit under the spout 1636 without requiring a ledge such as a sink or end of counter 1629 for the spout 1636 to hang over, in order to fit the glass 1603 under the spout 1636. The stand 1623 may be an annular ring with an edge guard 1713. Incoming water may be routed through water line 1617. Line 1617 passes through hole 1667 of clip (shown in FIG. 70).

Figure 70:
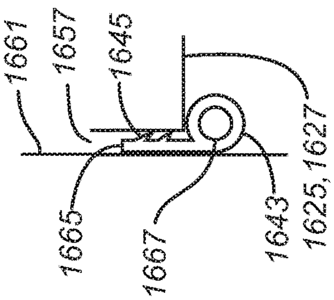
FIG. 70 is a detail view of FIG. 69.

FIG. 70, a detail of FIG. 68, shows how the tab 1665 of clip 1643 may be slipped between the back of cabinet 1625 and wall surface 1661 in gap 1657, and barbs 1645 may retain clips 1643 from pulling out. Elbows 1619 shown in FIG. 68, direct the tubing from under the counter 1629 up to the underside 1627 of cabinet 1625 and eventually into the back side of chamber 1607 through elbow 1619 into valve 1613 as shown in FIG. 69. The water fills chamber 1607 which filters through filter cartridges 1611 into lower chamber 1609. When water fills up lower chamber 1609, vent 1617 vents air up to a level above the maximum water level in chamber 1607, and out through back of upper chamber 1607 thus preventing a vapor lock condition.

As shown in FIGS. 68 and 69, UVC light 1631 may have a light dome 1633 mounted in the bottom of chamber 1609. UVC wire 1659 is routed along the bottom of the lower chamber 1609 down the side wall of the stand 1623 to an on/off switch 1658 and then through the floor of stand 1623 and into a junction box 1681. The wires may exit the side wall of the stand 1623, pass through an on/off switch 1196 which may be a part of the control panel 1151 or may be connected electrically and out to an electrical adapter 1197.

Figure 71:
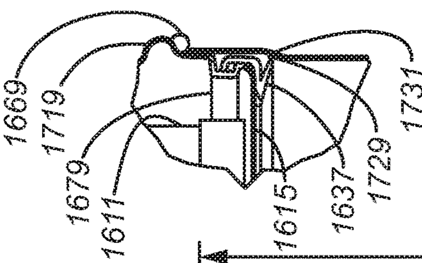
FIG. 71 is a detail view of FIG. 69.

FIG. 71 shows an alternate embodiment of a seal 1637 that is attached to the bottom surface 1605 of upper chamber 1607. The seal 1637 wraps over the annular edge of chamber 1607, hooks onto groove 1679 and makes sealing contact 1729 against offset 1731 of lower chamber 1609.

Figure 72:
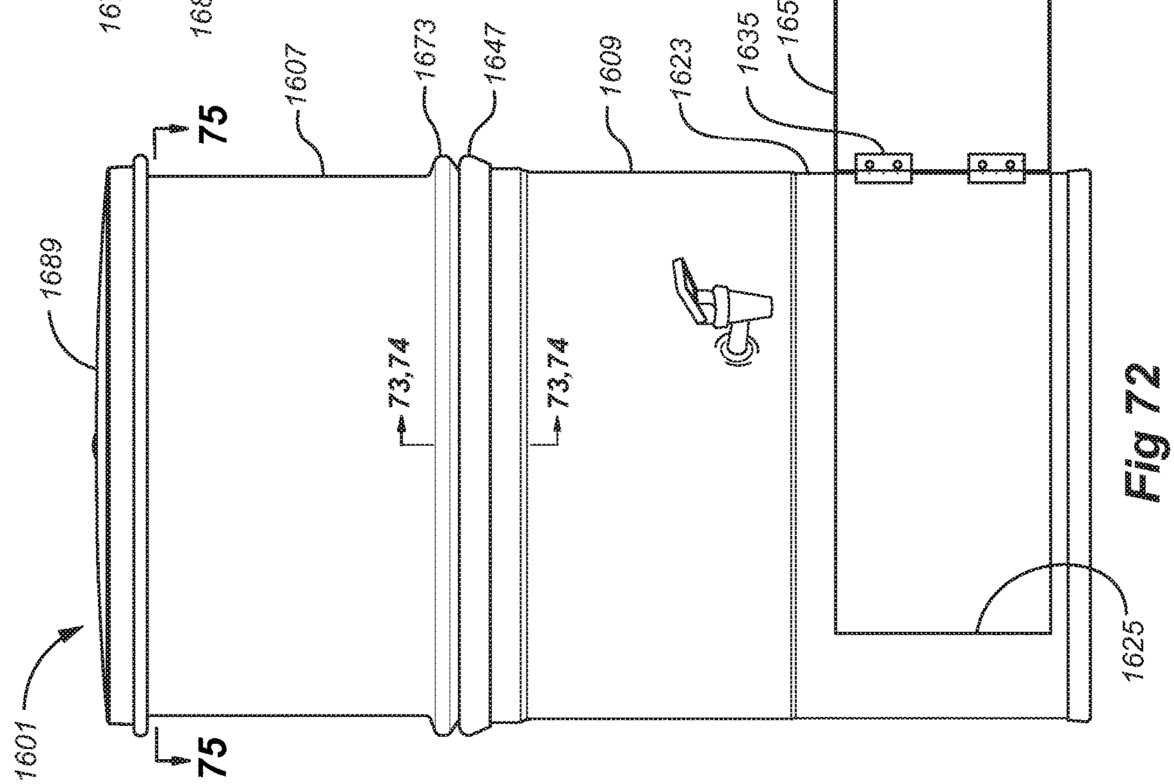
FIG. 72 is a front view of a compact filter system.

FIG. 72 shows filter system 1601. The front of stand 1623 may have an opening 1625. Door 1651 with a knob 1653 encloses opening 1625, and may be hinged 1635.

Figure 74:
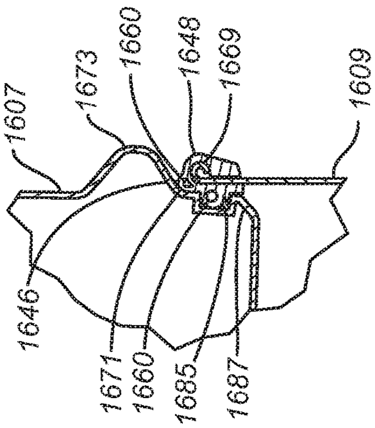
FIG. 74 is a detail view of FIG. 72.
Figure 73:
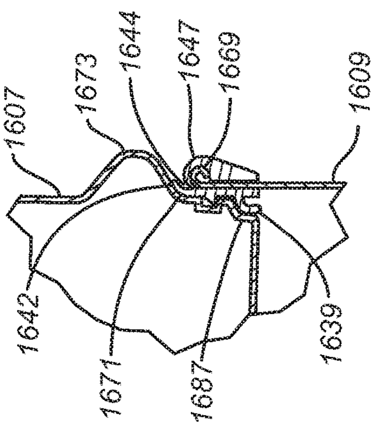
FIG. 73 is a detail view of FIG. 72.

FIGS. 73 and 74 are two embodiments of seals 1647 and 1648. Seals 1647 and 1648 have two possible seal contact points with upper chamber 1607. Lower seal flap 1685 forms the seal at the contact at point 1687. The other potential sealing point of contact is where seal bulge 1646 contacts upper chamber 1607 at point 1671. Contact point 1671 also acts as a structural support point which can support the weight of the upper chamber bearing on the lip of chamber 1609. The sealing function may be further enhanced by using annular cavities 1660 inside of seal bulges 1646 and 1685. FIG. 73 differs from 74 by replacing bulges 1646 and 1685 with J-shaped flaps 1642 and 1639 respectively. Both the hollow bulge and the flap features are intended to enhance the seal capability against the upper chamber 1607 allowing for greater dimensional tolerance variation between upper chamber 1607 and lower chamber 1609 and still create a good seal affect.

Figure 75:
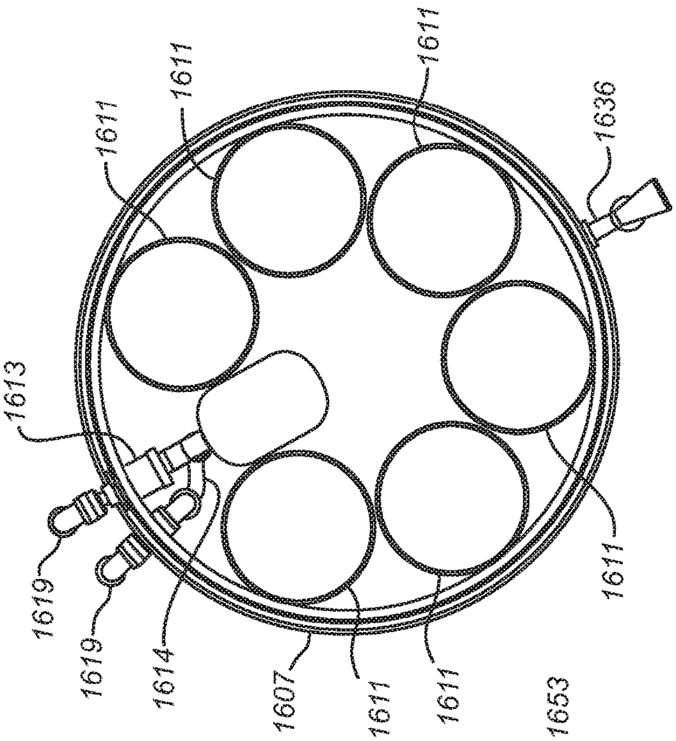
FIG. 75 is a top view of FIG. 72.

FIG. 75 is a top view of FIG. 72, showing 6 filters 1611. Note that although the filters 1611 use the maximum amount of space in upper chamber 1607, clean water availability is not hindered, because of the constant feed of water into upper chamber 1607 through float valve 1613.

Figure 77:
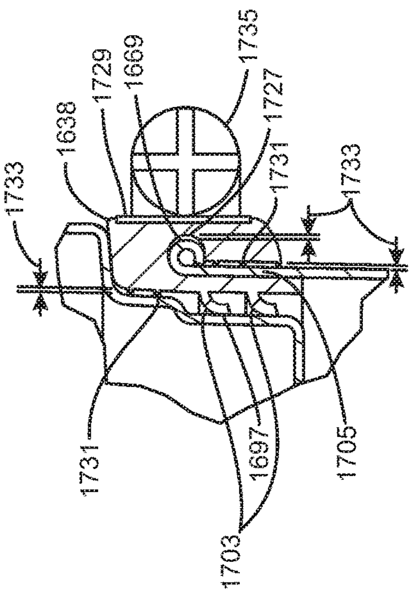
FIG. 77 is a section view of FIG. 76.
Figure 76:
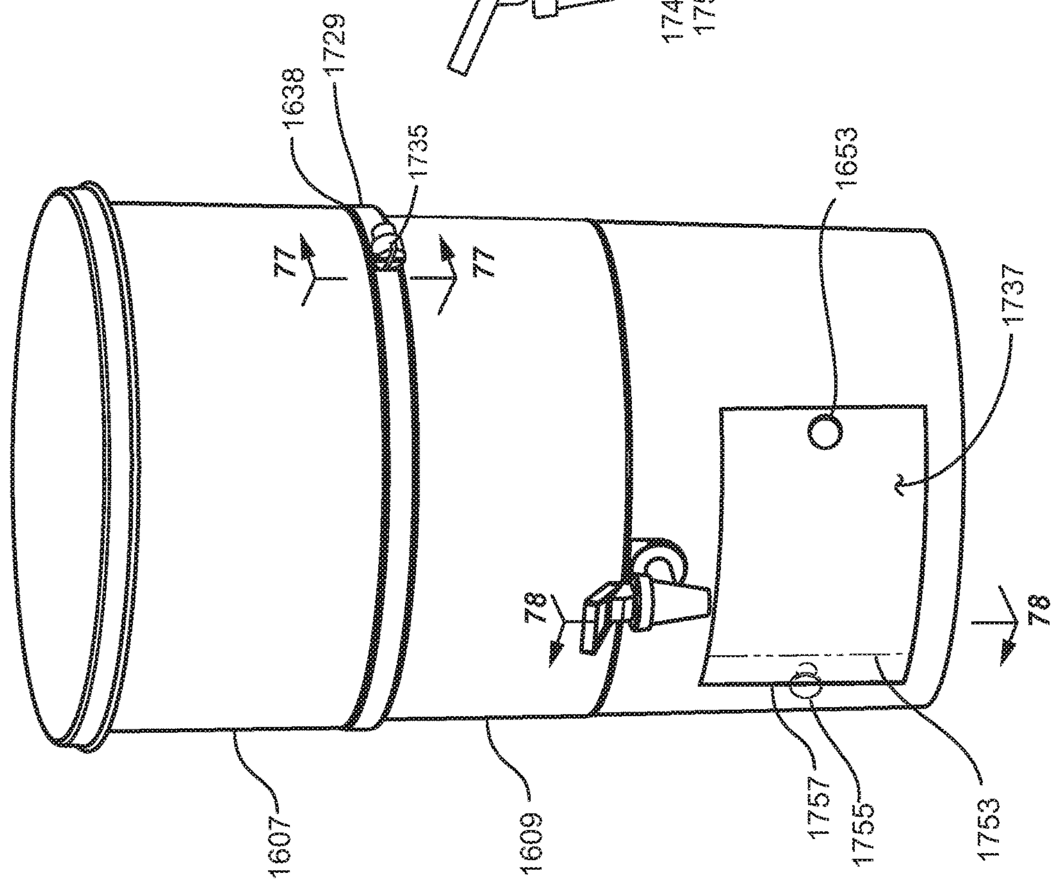
FIG. 76 is a perspective view of annular chamber seal and sliding cabinet stand door.

FIGS. 76, 77 show an embodiment of a seal 1638 containing a cavity 1727 and a gap 1705 that allows the seal to be wrapped over the rim of the lower chamber. The figures also show two arced flaps 1703 and the tip of the seal flap 1697 which is the point of contact of the seal. The contact is made when the upper chamber 1607 is set down into the opening of lower chamber 1609. A clamping band 1729 which might be made of a metal like stainless steel surrounds and may clamp down circumferentially around the outside of seal 1638. And may be tightened or loosened by adjustment screw 1735. As the clamp is tightened gaps 1733 may be compressed which allows barbs 1731 to be tightened down against both the outside of upper chamber 1607 and lower chamber 1609 thus both assuring the sealing of the chambers and prohibiting upper chamber 1607 from moving upward from being unseated from lower chamber 1609.

Figure 78:
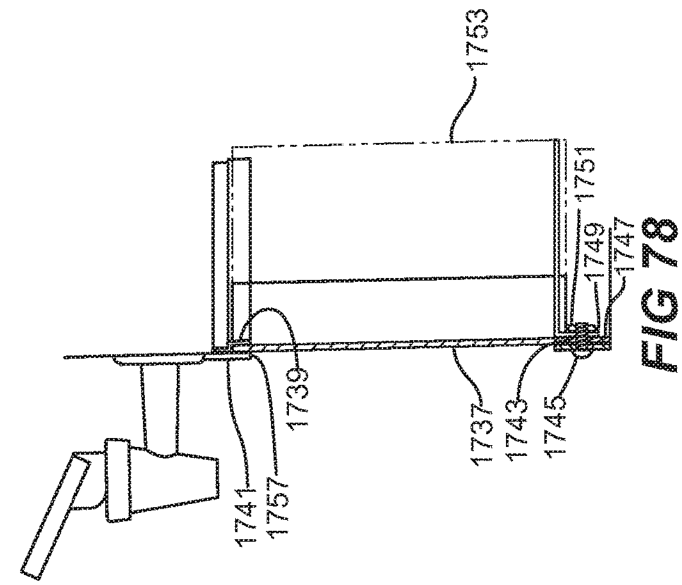
FIG. 78 is a detail view of FIG. 76.

FIGS. 76 and 78 show the sliding door 1737 in door opening 1757. The user may slide the door open by means of the door knob 1653 and the door may be opened to a position shown by the edge of the door 1753 and knob 1755. The door may be slid along a track created between bracket 1739 and stand wall 1741 at the top of door 1737 and slot 1743 at the bottom of door 1637 formed by spacer 1747 and stand tab 1749 of stand floor 1749. Fastener 1745 and nut 1751 couple these elements together as shown.

Figures 79, 80, 81, 82:
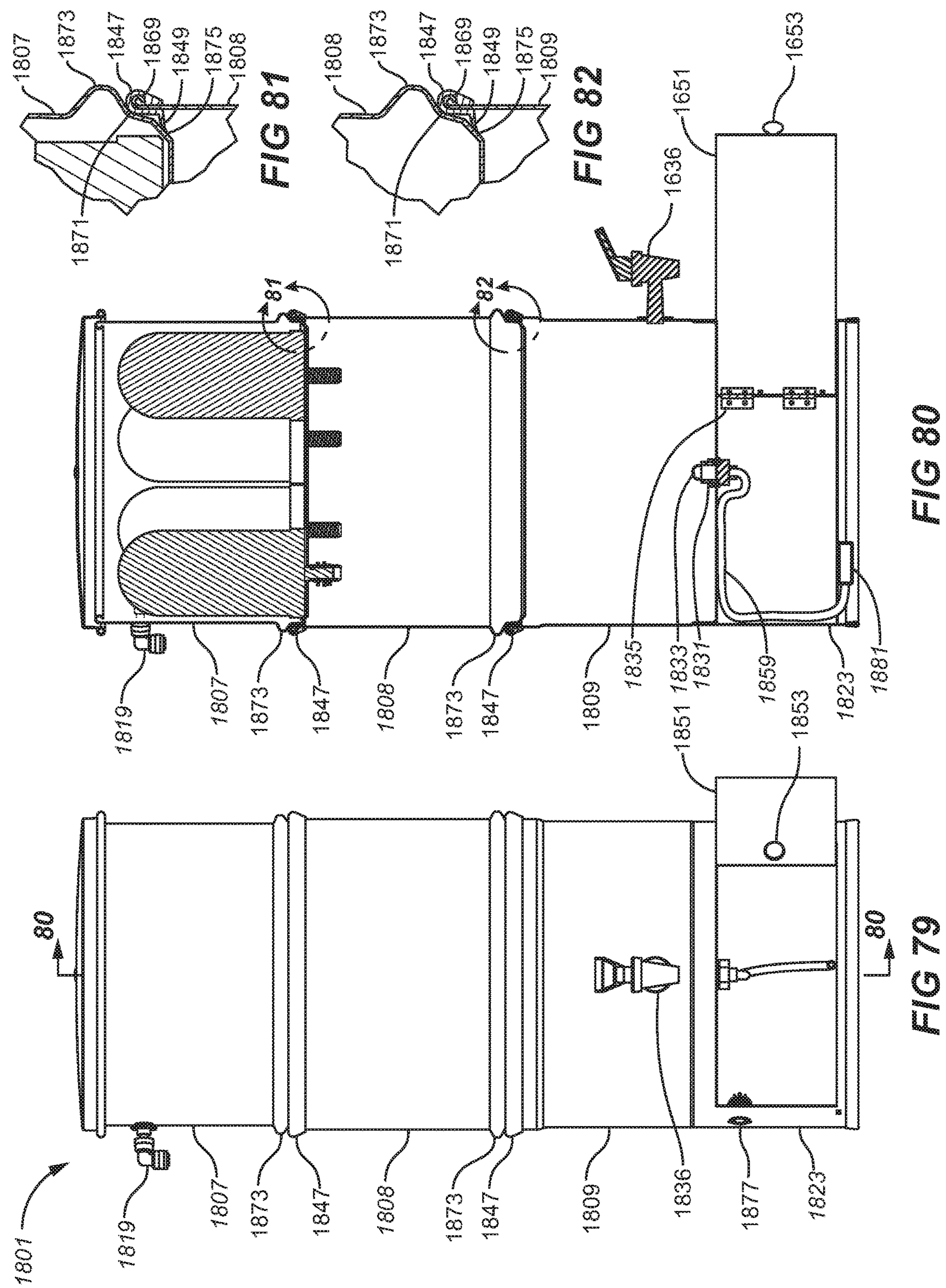
FIG. 79 is a front view of compact filter system with extension sleeve.
FIG. 80 is a side view of compact filter system with extension sleeve.
FIG. 81 is a detail view of FIG. 80.
FIG. 82 is a detail view of FIG. 80.

FIG. 79 shows another embodiment, filter system 1801, the same filter system as in previous figures, with an added extension sleeve 1808 inserted between upper chamber 1807 and lower chamber 1809. Seals 1847 may create the interfaces between chambers 1807, extension 1808 and lower chamber 1809.

FIG. 80 is a section view of FIG. 79 and shows the chamber 1807 and extension 1808 nested in the chambers below them. Extension 1808 is open on the bottom so that extension 1808 and lower chamber 1809 may constitute one large chamber of purified water. UVC LED light 1831 may be attached on the bottom of chamber 1809, and UVC wire 1859 may run inside the stand 1823, connecting through switch 1877 shown in FIG. 79, and then down under the floor of the stand to a junction box 1881.

FIGS. 81 and 82 are details of FIG. 80 depicting an embodiment of seal 1847. Seal 1847 may be stretched over rim 1869. Flap 1849 may bridge the gap between lower chamber 1809 and upper chamber 1807 with contact point 1875 creating seal against the bottom of chamber 1807. Bulge 1873 may rest on seal 1847 at contact point 1871, creating the structural support for the upper chamber 1807, but contact point 1875 may be flexed downward by the upper chamber, creating the seal.

Figure 83:
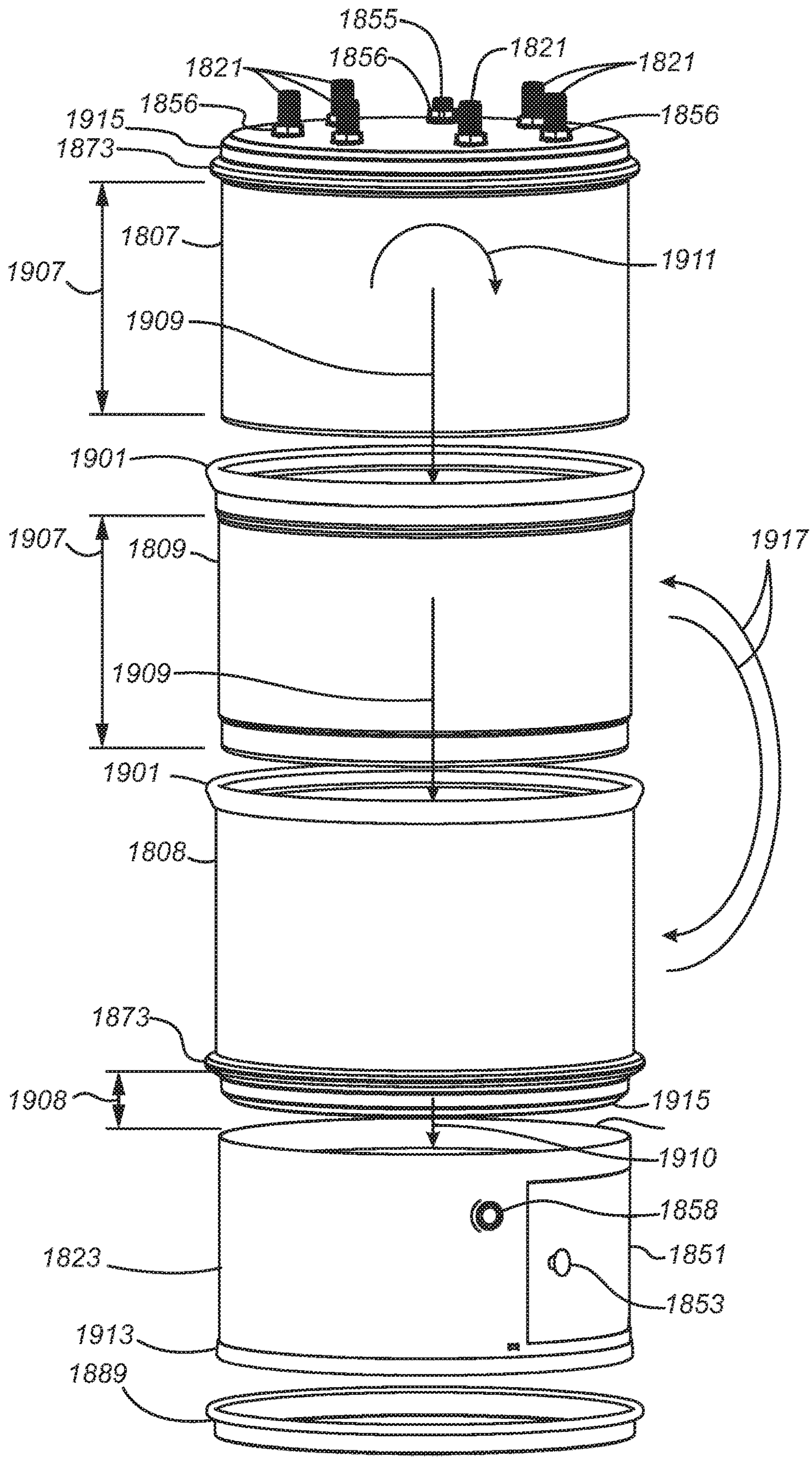
FIG. 83 is an exploded upper perspective view of compact filter system with extension sleeve.

FIG. 83 shows an exploded view of filter system 1801 with the orientation of the chambers changed to allow them to collapse into each other to optimize space for storage purposes. Upper chamber 1807 is flipped 180 degrees 1911 with filter stems 1821 pointing upward. Extension sleeve 1808 and chamber 1809 are swapped 1917. Thus chambers 1807 and 1809 may collapse in direction 1909 a distance of 1907, and extension 1808 may be inserted into 1910 a distance 1908.

Figure 84:
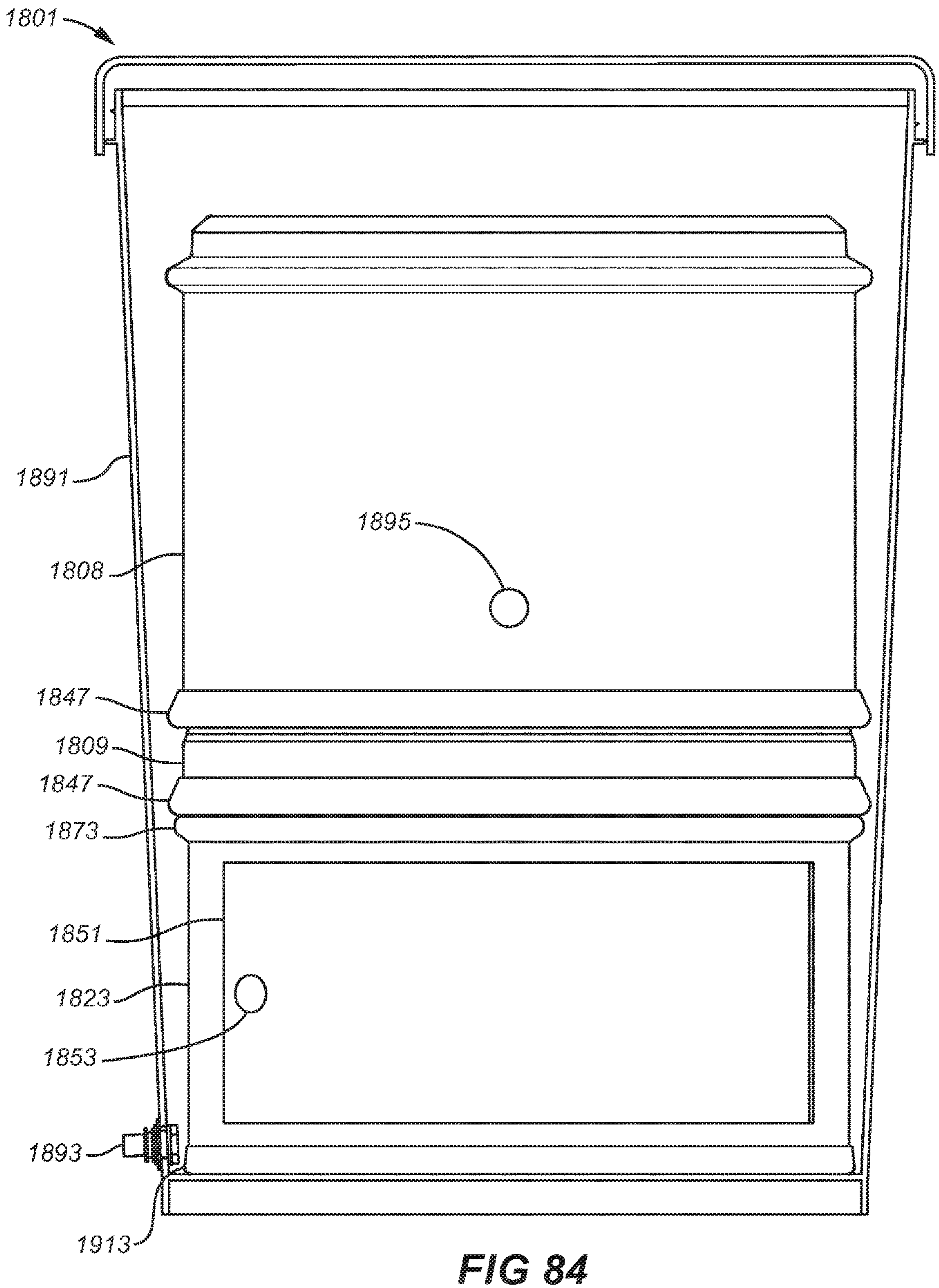
FIG. 84 is a section view depicting stored configuration of filter system in bucket.

FIG. 84 shows collapsed filter system 1801 that may be lowered into a tote bucket 1891. The spigot (not shown) may be removed in order to fit the system into the bucket 1891. Tote bucket 1891 has a second function in which a water line may be attached to fixture 1893 to be used as a water source to the filter system, similar to off grid water container 131 of FIGS. 4 and 5 above. The tote bucket may have a strap coupled to it, as with other containers described herein, or a handle or other carrying element to make it easy to carry.

Figure 85:
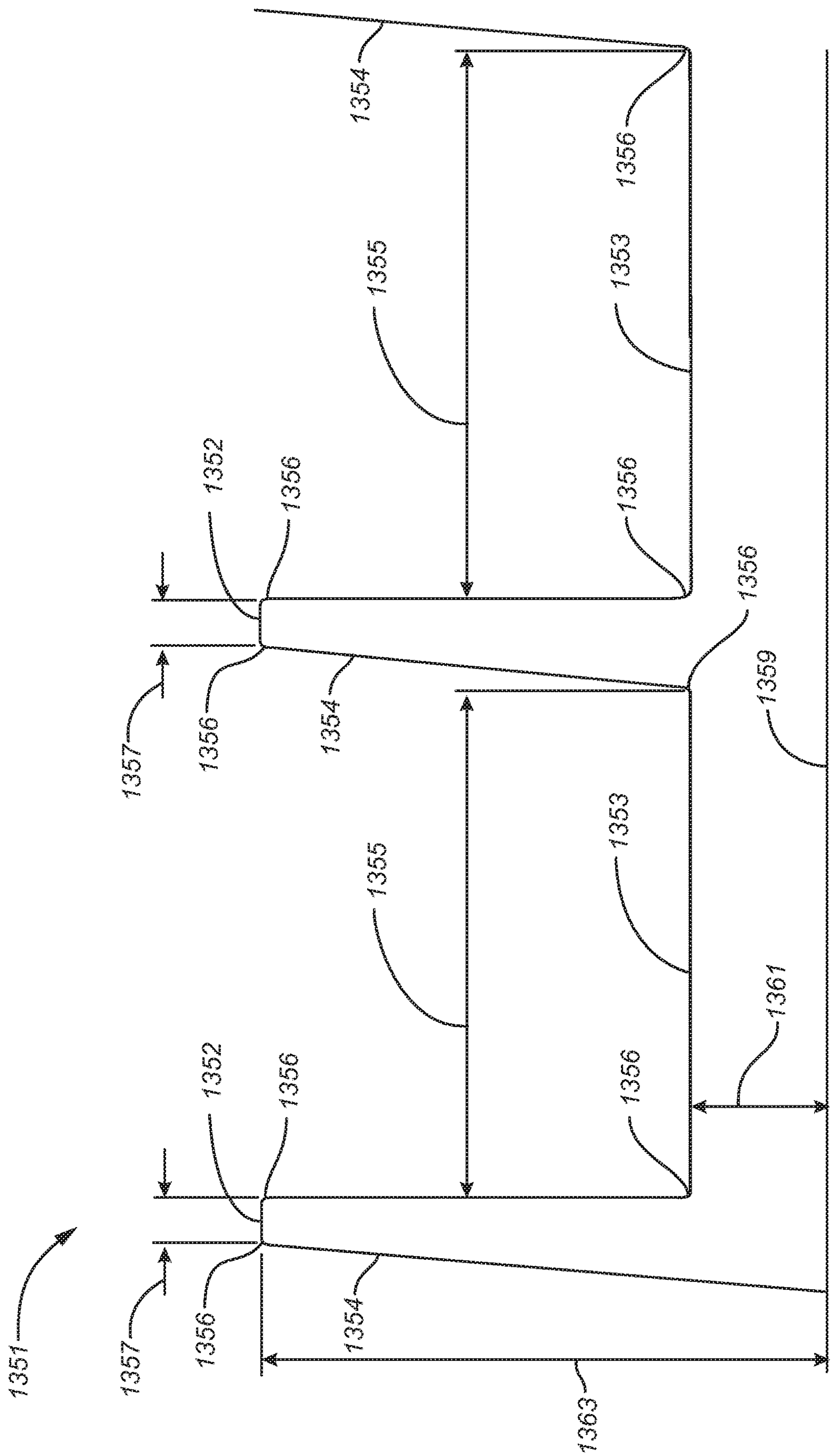
FIG. 85 is a diagram of UVC light square wave output cycle.

FIG. 85 is a diagram of UVC square wave light emission cycle 1351. The light emitted from UVC light source 1131 may cycle between longer intervals 1355 of low power emissions 1353 to short intervals 1357 of higher power emissions 1352, in order to allow a constant emission of light to radiate on to the helical quartz tube 1223, which may act as a conduit to bring new water into lower chamber 1109. The low emission light 1353 could be sufficient to sanitize the small amount of water in coil 1223 shown in FIG. 50, which is in close proximity to the UVC light source 1131. The short interval 1357 of higher power emission 1352 could emit an amount 1363 from UVC light source 1131 into the water that fills the lower chamber 1109 in order to catch any pathogens that may have either self-repaired or have been introduced into the chamber by other means. Ramps 1354 at the beginning of each cycle, and buffered corners 1356, may help to soften the transitions of the light emission cycle 1351, which could add life to the UVC light 1131. Note UVC light 1131 may or may not have a dome 1133 as shown in FIG. 50.

Figure 86:
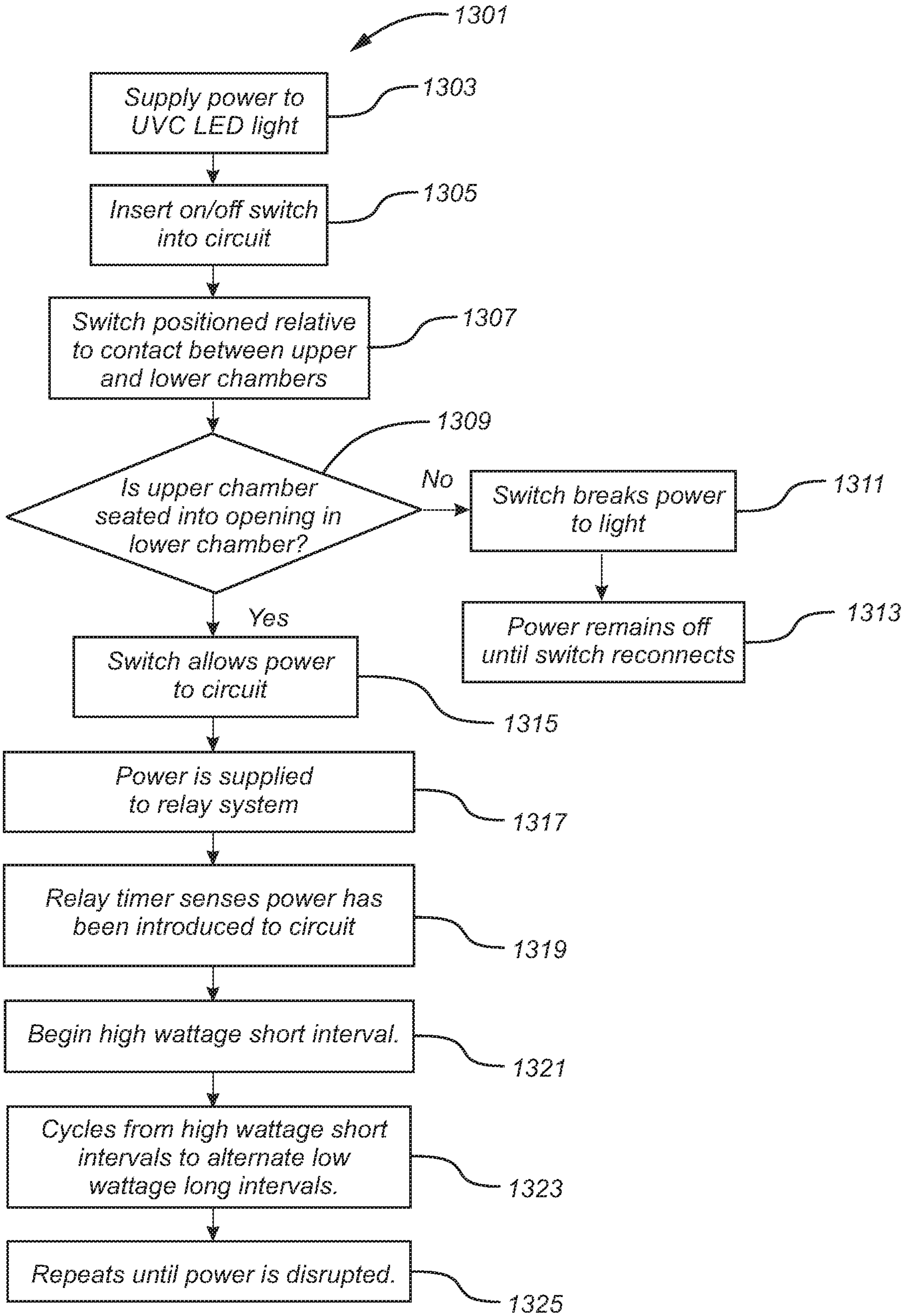
FIG. 86 is a logic flow diagram of an ultraviolet (UVC) circuit.

FIG. 86 is a flow diagram which depicts the logic of an ultraviolet light circuit 1301. The circuit 1301 supplies power to a UVC LED light 1303. An on/off switch is inserted in circuit 1305. The switch monitors contact between upper and lower chambers 1307. The switch determines the condition "Is the upper chamber seated in the opening of lower chamber 1309?" If it is not, the switch breaks power to light 1311 and the power remains off until the lower chamber is returned to seated position 1313. If the upper chamber is returned to its seated position, the switch closes, returning power to the circuit 1315. Once power is supplied to the circuit 1317, a relay timer senses power has been introduced 1319 to the circuit and begins high wattage short interval 1321. When the timer has finished that interval 1321, it runs through a low wattage, longer interval 1323, and then repeats the cycle 1321 to 1323 until the power is broken 1325.

FIGS. 87-91 depict an embodiment for a filter system 1401 consisting of 2 plastic buckets; one forming the upper chamber 1407 and the other forming lower bucket chamber 1409. The function of the bucket embodiment is the same as that of the steel chambers, however the buckets may be cheaper and less subject to damage than the stainless-steel types of gravity filters. This embodiment may use shorter, larger diameter filters 1411 that take up less vertical space in the upper bucket chamber 1407.

Figure 88:
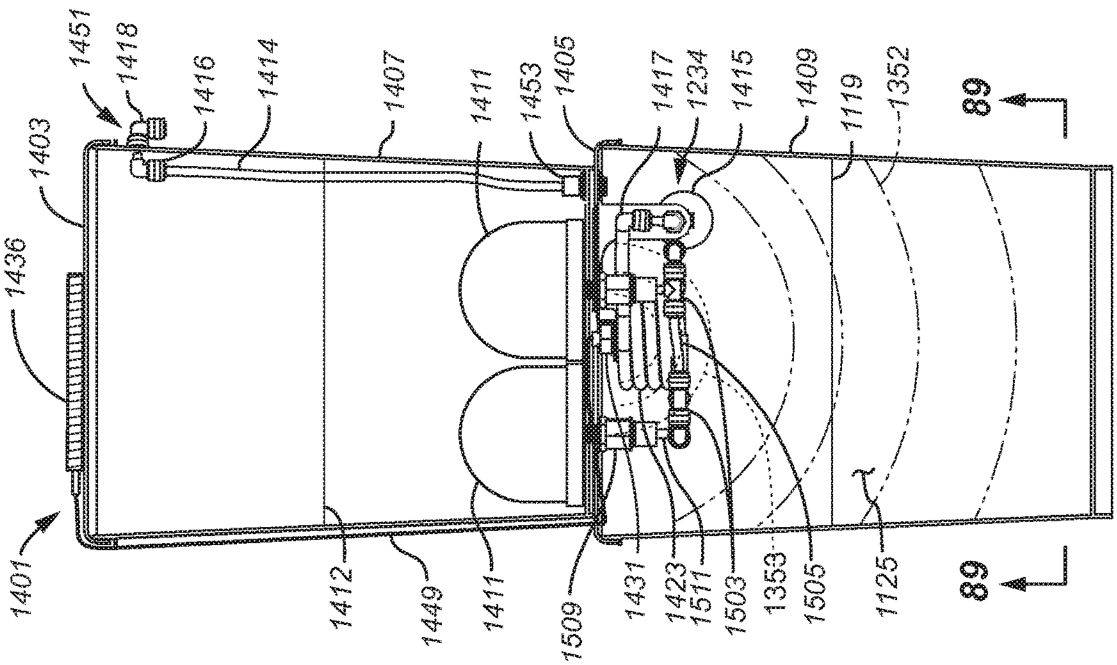
FIG. 88 is a section view of FIG. 87, showing a filtering mode of a water filtration bucket system.
Figure 87:
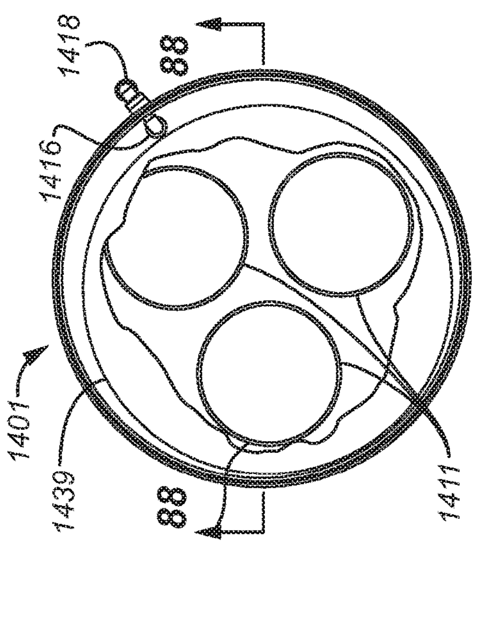
FIG. 87 is a top view of a bucket filter system.
Figure 89:
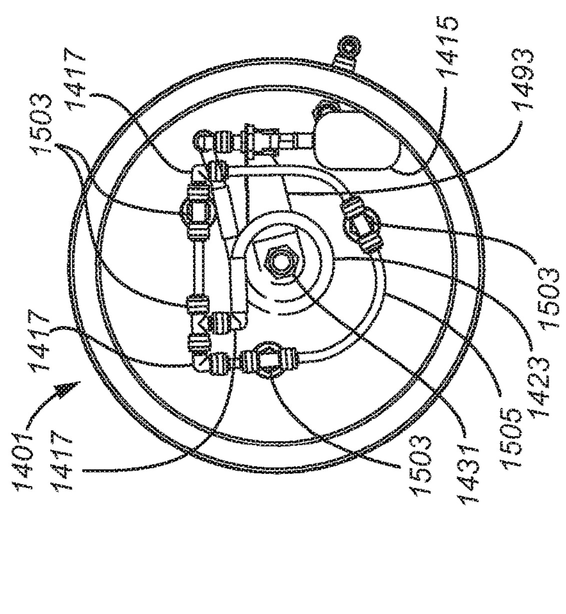
FIG. 89 is a bottom section view of a bucket filter system.

FIG. 88 depicts the filtration mode of the bucket filter system 1401 in which the filters 1411 filter water down through threaded fitting connectors 1509 (or may use vertical flexible silicone connectors 1154, as described in FIGS. 47 and 48).

FIG. 88 also shows how the connectors 1509 feed into vertical connector tubes 1511, then into tees, 1503, then into annular tubes 1505, elbows 1417 and into coil 1423. From coil 1423 the water flows into elbow 1417 and then to the float valve 1234 for controlling the flow of water into lower bucket chamber 1409.

FIG. 88 again shows how a solar power source 1436 may connect to UVC light 1431 via wire 1449. A conduit, not shown, but similar to conduit 1186 used in FIG. 53, may run inside the upper bucket chamber 1407.

Additionally, FIG. 88 depicts a vent system 1451 consisting of vent elbows 1416 and 1418, a vent tube 1414 and a vent bulkhead 1453 which may be incorporated into this filter system 1401.

Figure 90:
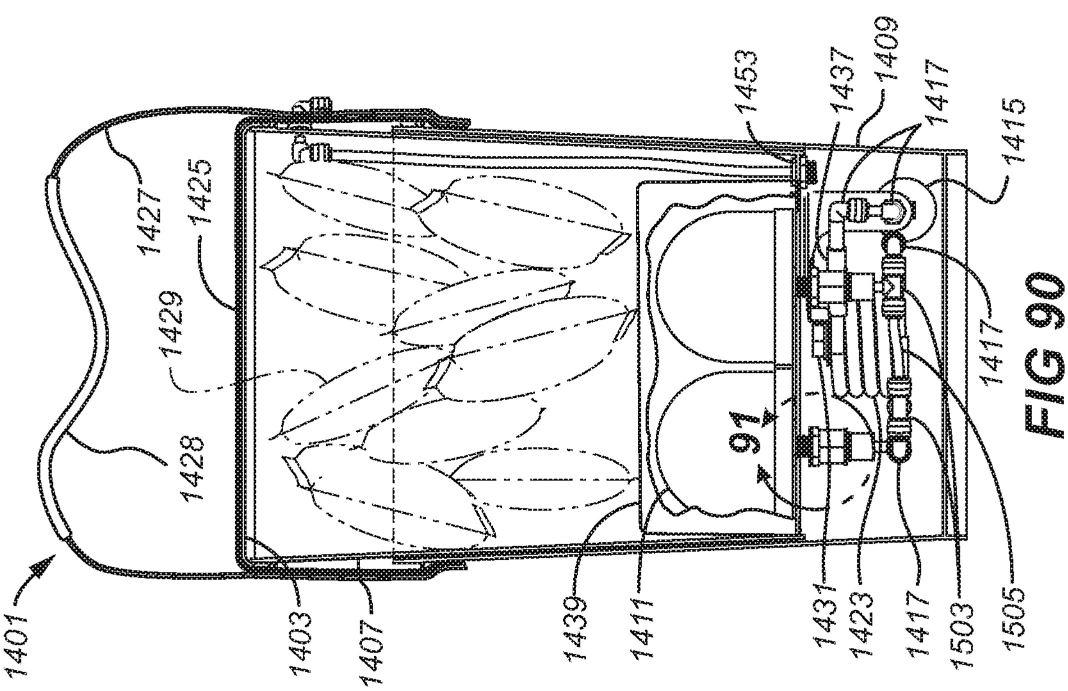
FIG. 90 is a front section view of a collapsed storage/travel mode of a bucket filter system.
Figure 96:
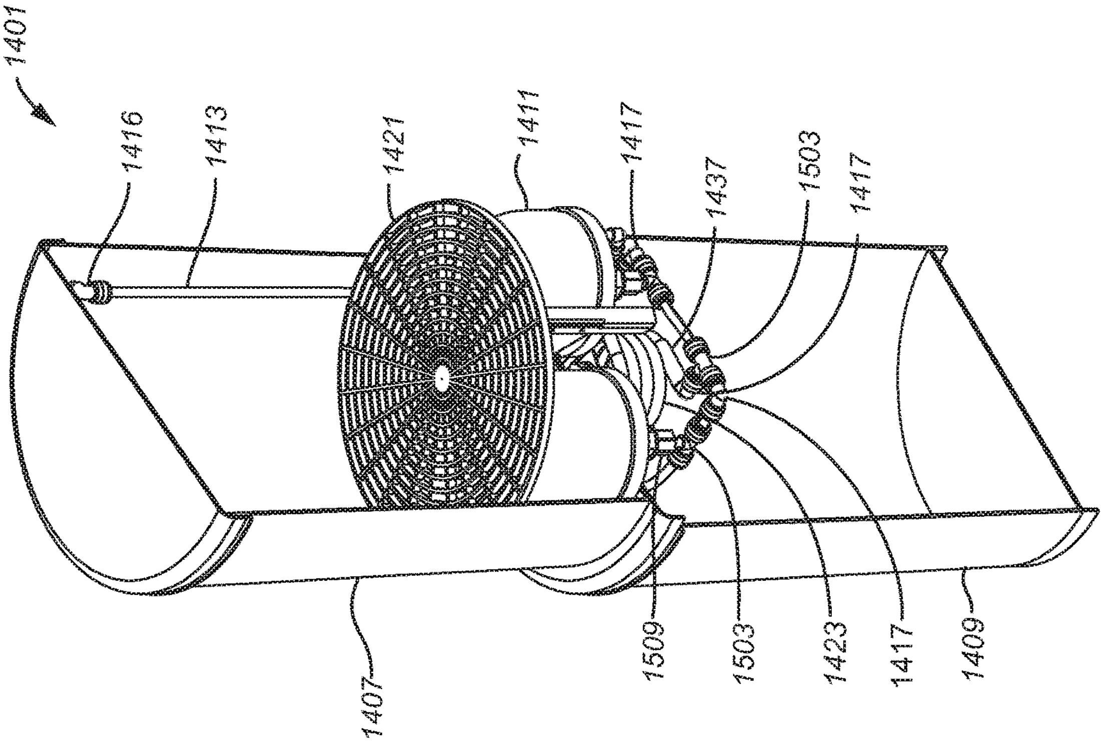
FIG. 96 is an upper front left perspective view of a bucket filter system with a grating platform.
Figure 95:
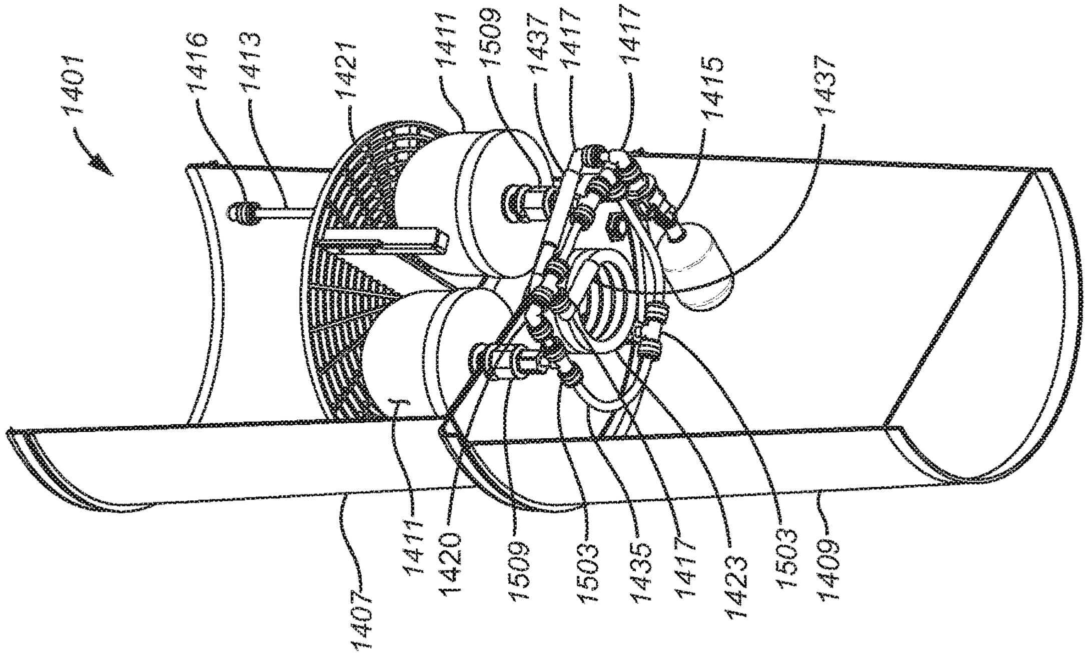
FIG. 95 is a lower front left perspective view of a bucket filter system with a grating platform.

FIG. 90 depicts the collapsed storage/transport mode of the bucket filter system 1401. In this scenario, the upper chamber 1407 may serve an alternate purpose in which the upper bucket chamber 1407 seen in FIG. 88 becomes a carrying case when there is no water in it, and can be used to hold or port non-water type items such as packaged food items 1429. When in the storage mode, as in FIG. 90, the lower bucket lid 1405 shown in FIG. 88 is removed and bucket 1407 is then collapsed down into lower chamber 1409. A platform, such as a tub/pan 1439, or a grated platform 1421 as seen in FIGS. 95 and 96, acts to protect filters 1411 from items such as food packets 1429 shown in FIG. 90 from damaging the filters.

When the user desires to set up the filter system 1401, shown in FIG. 88, he may change the upper bucket chamber 1407 from storage mode in FIG. 90 to filter mode in FIG. 88 by first removing any totable items such as food packet items 1429 and the platform 1439 from the upper bucket 1407, and then lifting upper bucket chamber 1407 out of chamber 1409. The lower bucket lid 1405 is then attached to the bottom of upper bucket chamber 1407 which is attached to the flow control plumbing for filtration system 1401. The lower bucket 1409 is then reattached to the lower bucket lid 1405. Now that the platform 1439 has been removed, the system is ready to receive water into the upper bucket 1407 for filtration.

A restraining strap 1425 as shown in FIG. 90 may be attached at each end to opposite sides of the bucket 1409 as a means of holding the buckets together during transporting/storage. A shoulder strap or back-pack style strap harness 1427 may be attached to the bucket 1409 for carrying purposes with a strap cushion 1428 to cushion the shoulder of the user carrying the filtration system 1401.

Figure 91:
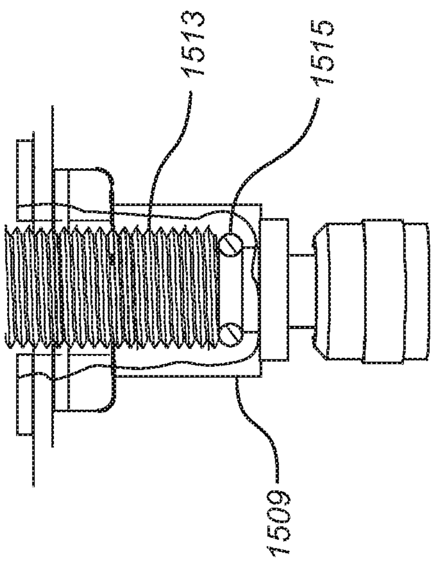
FIG. 91 is a detail of FIG. 90.

FIG. 91 is a detail of FIG. 90 where threaded fitting connectors 1509 may have an O-ring 1515 to seal the fitting 1509 and the straight thread of stems 1513. O-rings identified as 1515 are shown in detail FIG. 91, but apply to all embodiments that use a threaded fitting connector 1209/1509 when connecting to filter stems 1129/1513.

Figure 94:
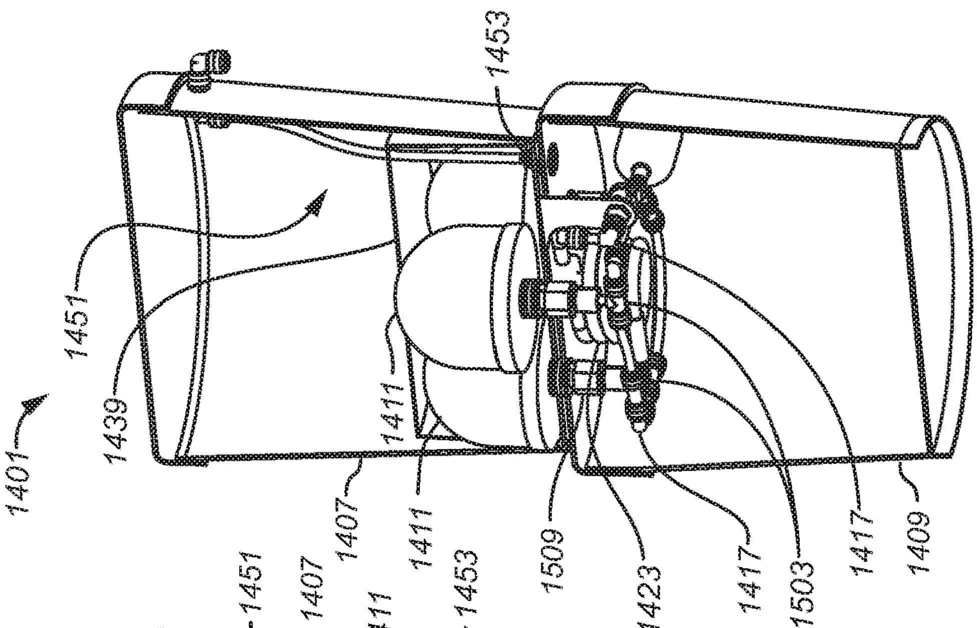
FIG. 94 is a lower front right perspective view of a bucket filter system.
Figure 93:
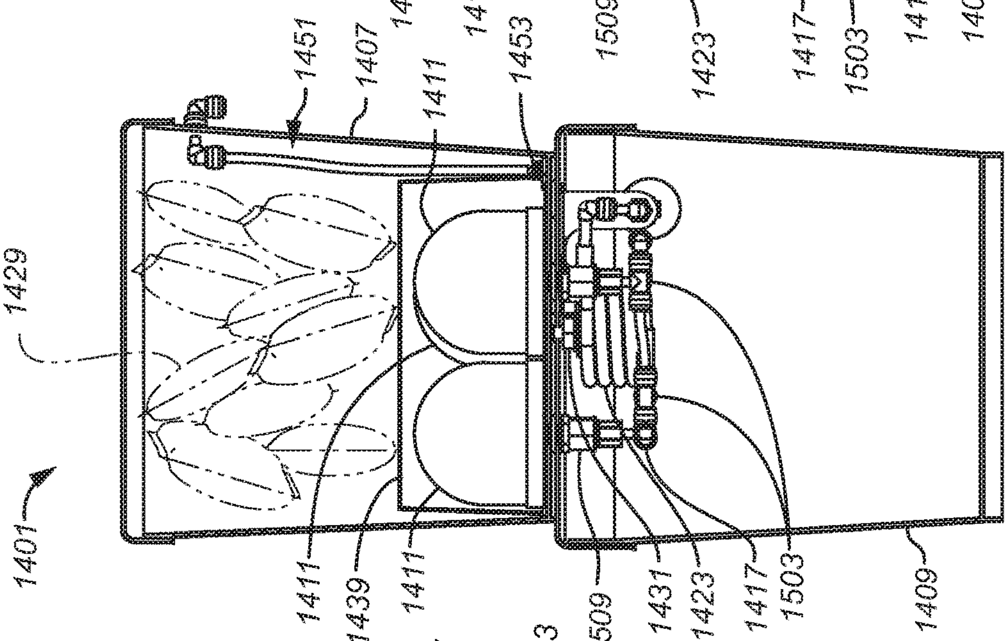
FIG. 93 is a front view of a bucket system with totable items.
Figure 92:
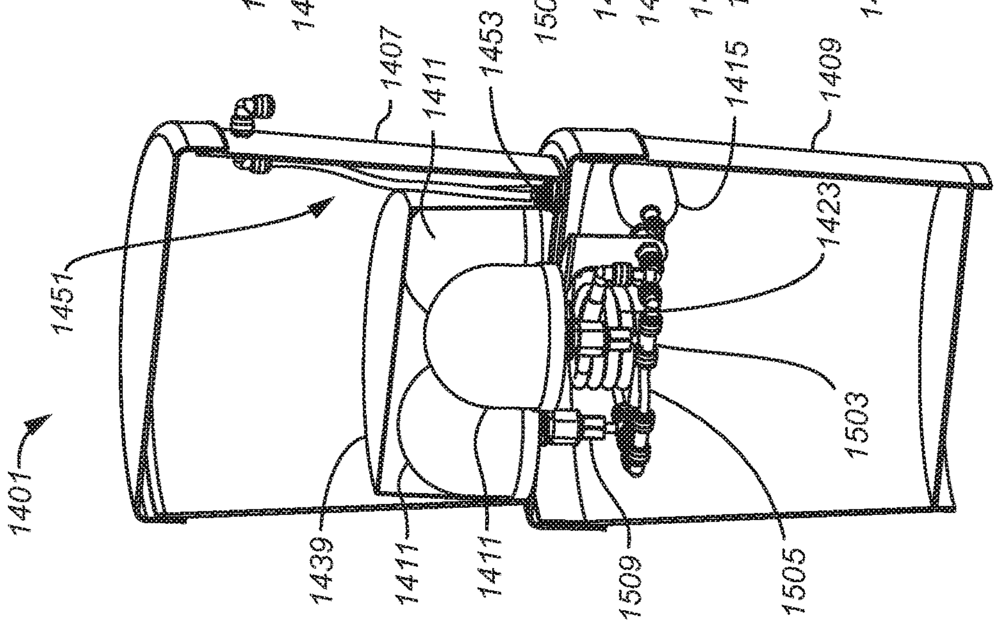
FIG. 92 is an upper front right perspective of a bucket filter system with a platform baking pan.

FIGS. 92-94 show different views of a bucket filter system with a platform baking pan turned upside down in the upper chamber to protect the filters while the system is used for storage (the food package elements 1429 shown being stored in the upper chamber in FIG. 93).

Figures 97, 98, 99, 100:
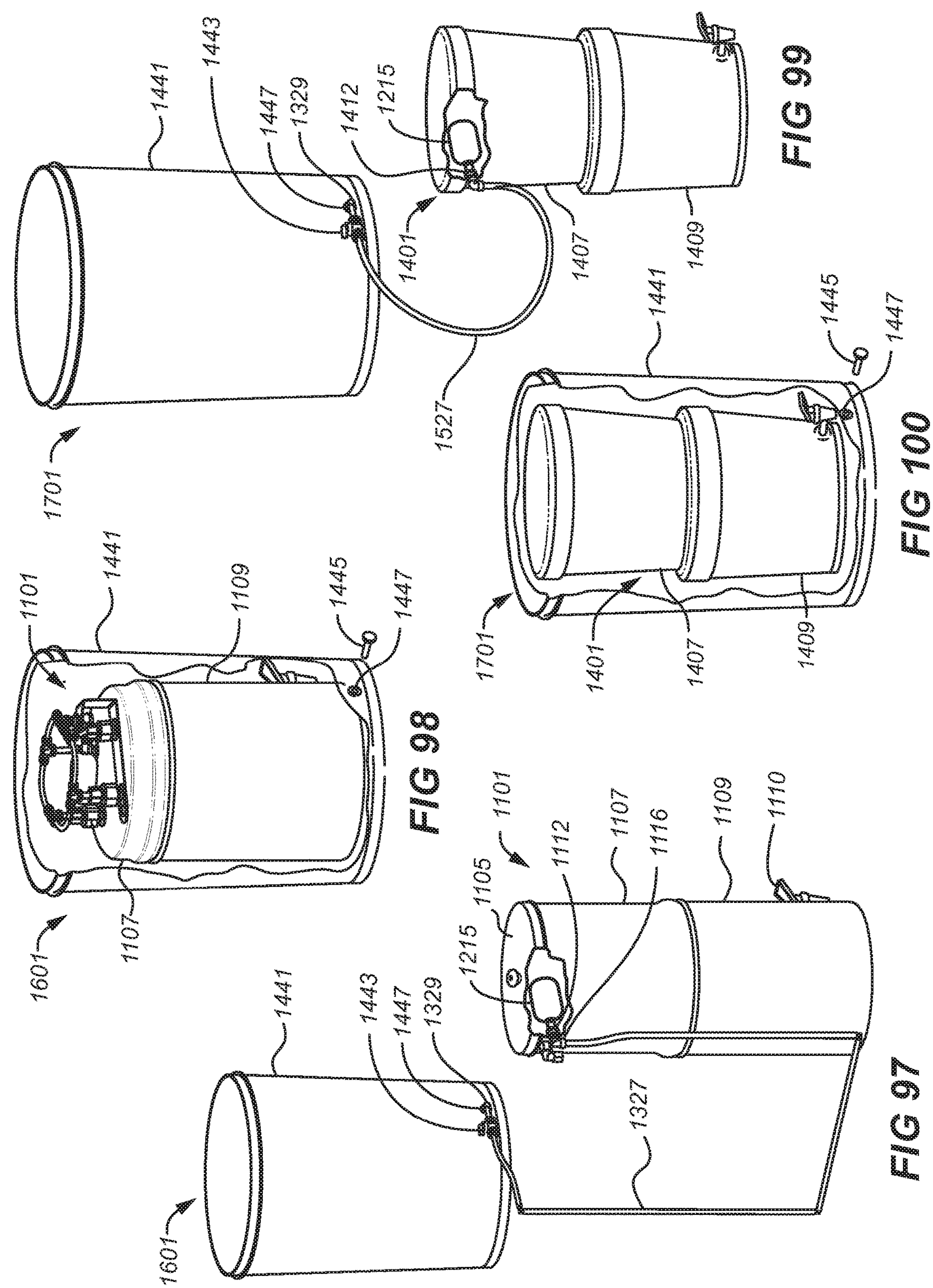
FIG. 97 is an upper right perspective view of a tote bucket as an external water supply for a stainless filter.
FIG. 98 is an upper right perspective of a filter inside of a tote bucket for storage and travel.
FIG. 99 is an upper right perspective view of a tote bucket as an external water supply for a bucket filter system.
FIG. 100 is an upper right perspective of a bucket filter inside of a tote bucket for storage and travel.

FIGS. 98 and 99 show a bucket tote system 1601 in which an additional bucket 1441 may act as a tote for the water system 1101 shown in FIG. 50 and bucket filter system 1401 in FIGS. 92, 93 and 94. FIG. 98 shows the filter system 1101 in its storage mode with the upper chamber 1107 flipped upside down and stored inside of lower chamber 1109. This is standard storing mode for gravity water filters. The tote bucket then holds the stored filter system 1101 until filtration mode is desired. At that time the filter system 1101 may be removed from tote bucket 1441 and set up as shown in FIG. 97. The tote 1441 may then be connected to the filter system 1101 by removing plug 1445 from bulkhead 1447, and attaching a quick connect fitting 1329 to bulkhead fitting 1447 in the side of tote bucket 1441. A shut off valve 1443, water feed line tubing 1327, and elbows 1116 make the water feed connections from the tote bucket 1441 to water feed port 1112, which connects to float valve 1234 of filter system 1101, thus allowing the tote bucket to act as an external water source to filter system 1101.

FIGS. 99 and 100 show a similar scenario system 1701, using a tote 1441 to hold bucket filter system 1401. FIG. 100 shows the stored tote system 1701 with bucket filter system 1401 stored inside of bucket 1441. When the filter is to be set up, the user may remove plug 1445 from bulkhead fitting 1447. Filter system 1401 is removed from tote bucket 1441. Quick connect fitting 1329 may be attached to bulkhead fitting 1447 and shutoff valve 1443. Then feed line tube 1527 connects shutoff valve 1443 to float valve 1215 through a port 1412 inside of upper bucket chamber 1407. This allows the tote 1441 to be filled with and to directly feed unpurified water into the gravity water filter system 1401, thus multiplying the amount of effective water available to the water purifier system 1401.

In implementations the continual filling of the upper and lower chambers reduces the need to access the chambers for manual filling and permits a much smaller ratio in the size of the two chambers. In other words, in implementations the continual filling may allow the upper chamber to have a smaller size than the lower chamber. This may allow the filter to fit into constricted spaces, for example on a kitchen counter directly under an upper cabinet situated above the counter. In implementations the ratio of volume of the upper chamber relative to the lower chamber may be, by non-limiting example, one of the following ratios or about one of the following ratios: 0.9; 0.8; 0.7; 0.6; 0.5; 0.4; 0.3; 0.2; or 0.1. The term "about" as used in the previous sentence means within +/−0.05 of the ratio.

In any of the systems herein disclosing one or more vents, the vent(s) may allow all of the air to be removed from the lower chamber by allowing the lower chamber to be completely filled with water. The vent(s) may also allow faster flow of water to the lower chamber due to pressure not building up inside the lower chamber with the introduction of water—the vent(s) maintaining ambient air pressure within the lower chamber by coupling the air inside the lower chamber with ambient air outside the filter assembly/system. Additionally, the vent(s) allow water to be dispensed from the lower chamber without reducing the pressure within the lower chamber to below ambient air pressure, and without creating a vacuum effect in the lower chamber whereby the dispense rate of water from the lower chamber slows or stops due to the vacuum.

In places where the description above refers to specific embodiments of filter systems and related methods, one or more or many modifications may be made without departing from the spirit and scope thereof. Details of any specific embodiment or implementation described herein may, wherever possible, be applied to any other specific implementations or embodiments described herein.

What is claimed is:

1. A water filter system, comprising:

an upper chamber having an open top;

a lower chamber fluidically coupled to said upper chamber for receiving water from said upper chamber;

a lid sized to cover said open top of said upper chamber;

a filter medium located at least partly within said upper chamber and positioned to filter water passing therethrough as it flows from said upper chamber to said lower chamber by gravity;

a removable rigid dispensing spigot;

a hose wand dispensing spigot in fluid communication with an interior of said lower chamber;

at least one opening proximate a bottom of the lower chamber for mounting and placing said rigid dispensing spigot in fluid communication with said interior of said lower chamber;

an ultraviolet light source situated at least partially within one of said upper or said lower chamber; and a container for providing water to said upper chamber and further sized to deceivingly store said upper chamber and said lower chamber therein in a portable configuration.

2. The water filter system of claim 1, wherein said hose wand dispensing spigot is fluidically coupled with a second opening proximate a bottom of said lower chamber placing said hose wand dispensing spigot in fluid communication with the interior of said lower chamber.

3. The water filter system of claim 1, wherein said hose wand dispensing spigot is fluidically coupled with a portion of a conduit of said removable rigid dispensing spigot placing said hose wand dispensing spigot in fluid communication with the interior of said lower chamber.

4. The water filter system of claim 1, further comprising: a silver antimicrobial piece within said lower chamber.

5. The water filter system of claim 4, wherein said silver antimicrobial piece comprises a grate.

6. The water filter of system claim 1, wherein said ultraviolet light source is a light emitting diode or LED, emitting short wavelength ultraviolet or UVC light.

7. The water filter system of claim 1, wherein said ultraviolet light source is mounted in a lower portion of said lower chamber.

8. The water filter system of claim 1, further comprising a switch capable of automatically turning said ultraviolet light source off when said upper chamber is removed from said lower chamber.

9. The water filter system of claim 1, further comprising a programmable power controlling circuit configured to facilitate one or more of: automatically cycle said ultraviolet light source between an on state and an off state on a predetermined schedule; and automatically cycle said ultraviolet light source between a high intensity on state and a low intensity on state on a predetermined schedule.

10. The water filter system of claim 1, further comprising a watertight seal situated between said upper chamber and said lower chamber, said watertight seal preventing water from exiting the filter system where the upper chamber is coupled to the lower chamber.

11. The water filter system of claim 10, further comprising a clamp coupled with said watertight seal and capable of biasing said watertight seal to compress said watertight seal.

12. The water filter system of claim 1, further comprising an inlet fluidically coupled with an interior of said upper chamber for providing a flow of water from an external water source to said upper chamber while said lid of said upper chamber is in a closed configuration.

13. The water filter system of claim 1, wherein said upper chamber and said lower chamber are sized and shaped to allow the filter system to collapse for storage by allowing one of said upper chamber and said lower chamber to be stored within the other.

14. The water filter system of claim 1, further comprising one or more vents placing an interior of said lower chamber in fluid communication with the ambient air pressure external of said lower chamber.

15. The water filter system of claim 1, further comprising an indicator light located on an outside surface of the filter system and configured to indicate whether the ultraviolet light source is turned on.

* * * * *